(12) United States Patent
Uehara et al.

(10) Patent No.: US 10,460,143 B2
(45) Date of Patent: Oct. 29, 2019

(54) SENSOR AND SENSOR-EQUIPPED DISPLAY DEVICE

(71) Applicant: Japan Display Inc., Tokyo (JP)

(72) Inventors: Toshinori Uehara, Tokyo (JP); Hiroshi Mizuhashi, Tokyo (JP); Toshio Soya, Tokyo (JP)

(73) Assignee: Japan Display Inc., Tokyo (JP)

( * ) Notice: Subject to any disclaimer, the term of this patent is extended or adjusted under 35 U.S.C. 154(b) by 310 days.

(21) Appl. No.: 15/464,642

(22) Filed: Mar. 21, 2017

(65) Prior Publication Data

US 2017/0277931 A1    Sep. 28, 2017

(30) Foreign Application Priority Data

Mar. 22, 2016    (JP) ................. 2016-056966

(51) Int. Cl.

| G06F 3/041 | (2006.01) |
| G06K 9/00 | (2006.01) |
| G02F 1/133 | (2006.01) |
| G02F 1/1333 | (2006.01) |
| G02F 1/1362 | (2006.01) |
| G02F 1/1368 | (2006.01) |
| G06F 3/044 | (2006.01) |
| G06K 9/20 | (2006.01) |

(52) U.S. Cl.
CPC ......... *G06K 9/0002* (2013.01); *G02F 1/1368* (2013.01); *G02F 1/13306* (2013.01); *G02F 1/13338* (2013.01); *G02F 1/136286* (2013.01); *G06F 3/044* (2013.01); *G06F 3/0412* (2013.01); *G06K 9/209* (2013.01); *G02F 2201/121* (2013.01); *G02F 2201/123* (2013.01); *G02F 2201/18* (2013.01); *G06F 2203/04107* (2013.01)

(58) Field of Classification Search
CPC ...... G02F 1/133; G02F 1/1362; G02F 1/1368; G06F 3/0412; G06F 3/044; G06F 2203/04107

See application file for complete search history.

(56) References Cited

U.S. PATENT DOCUMENTS

| 8,259,087 | B2 * | 9/2012 | Chen ................. G06F 3/044 |
| | | | 178/18.06 |
| 2013/0082936 | A1 * | 4/2013 | Islamkulov ....... H01L 27/14609 |
| | | | 345/173 |
| 2015/0002219 | A1 | 1/2015 | Araki |
| 2016/0172410 | A1 * | 6/2016 | Kurokawa ........ H01L 27/14643 |
| | | | 257/42 |
| 2016/0334902 | A1 * | 11/2016 | Li ...................... G06F 3/044 |
| 2016/0357299 | A1 * | 12/2016 | Liu .................... G06F 3/044 |
| 2017/0075495 | A1 * | 3/2017 | Roberson ............ G06F 3/0418 |

FOREIGN PATENT DOCUMENTS

JP    2015-12377 A    1/2015

* cited by examiner

*Primary Examiner* — Antonio Xavier
(74) *Attorney, Agent, or Firm* — Michael Best & Friedrich LLP

(57) ABSTRACT

According to one embodiment, a sensor-equipped display device includes a scanning line, a signal line, a pixel switch, a pixel electrode, a first common electrode, a detection electrode, a current mirror circuit, and an integrator. The integrator includes an operational amplifier including an inverting input terminal and a noninverting input terminal.

13 Claims, 29 Drawing Sheets

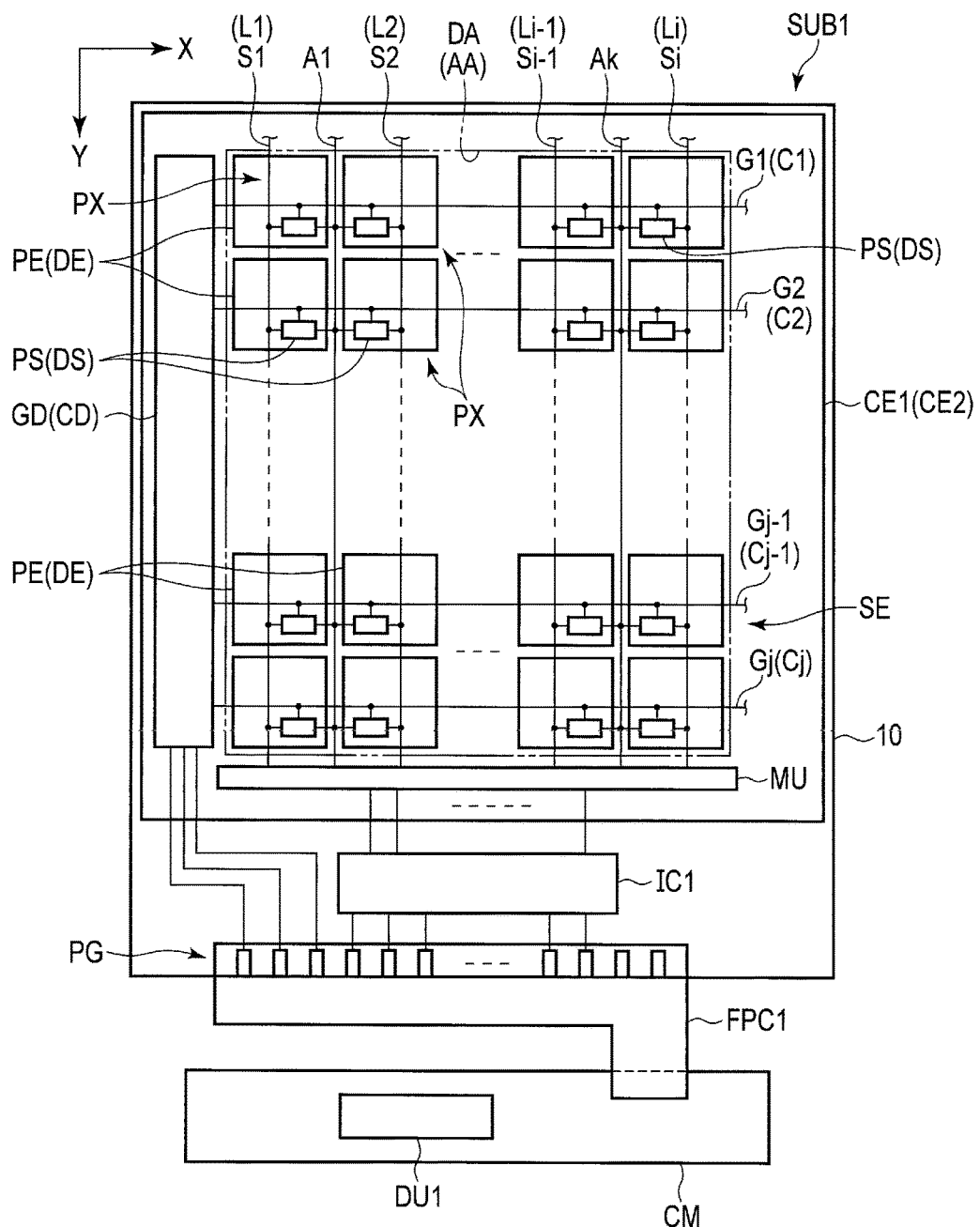
F I G. 2

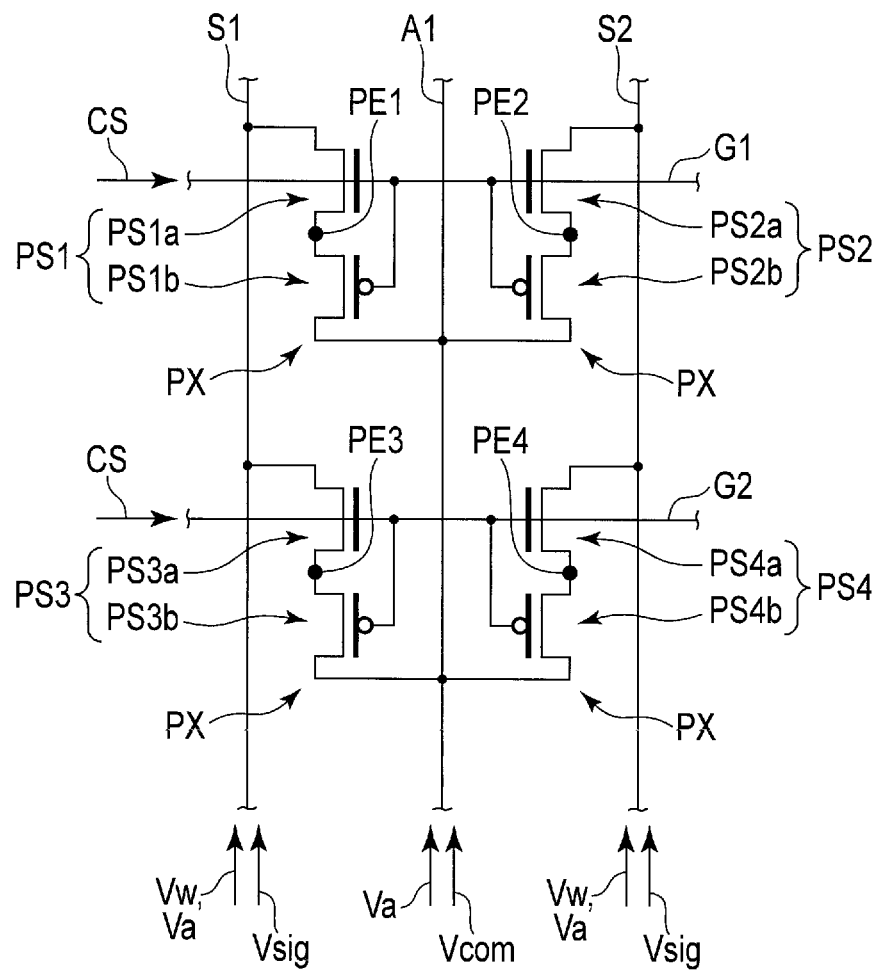
F I G. 3

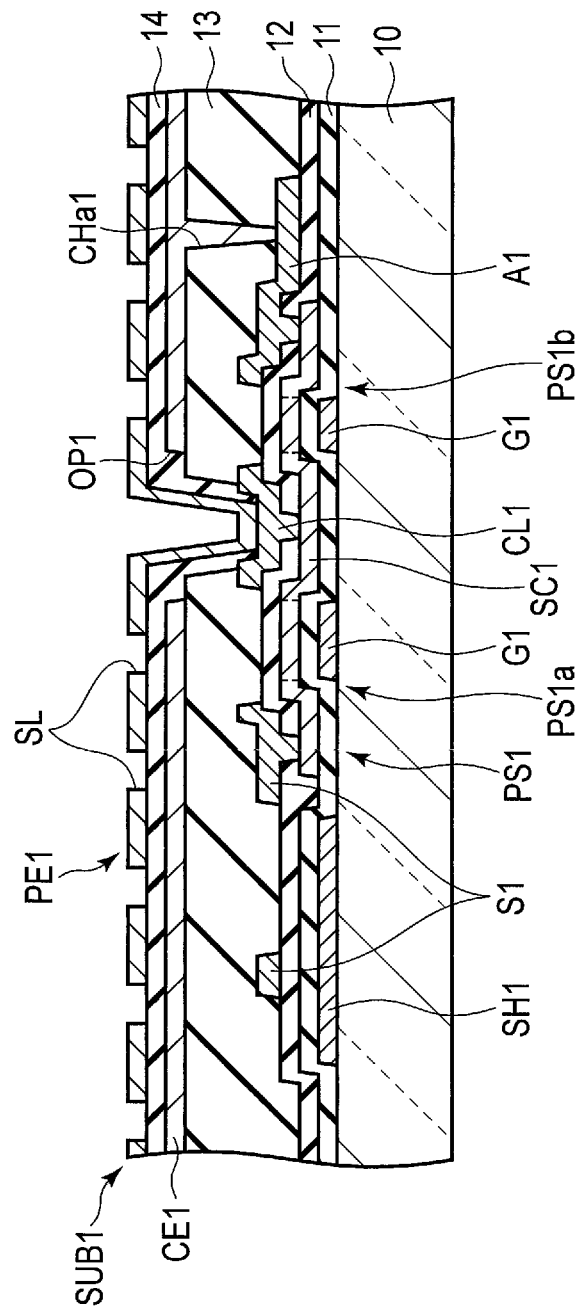
F I G. 5

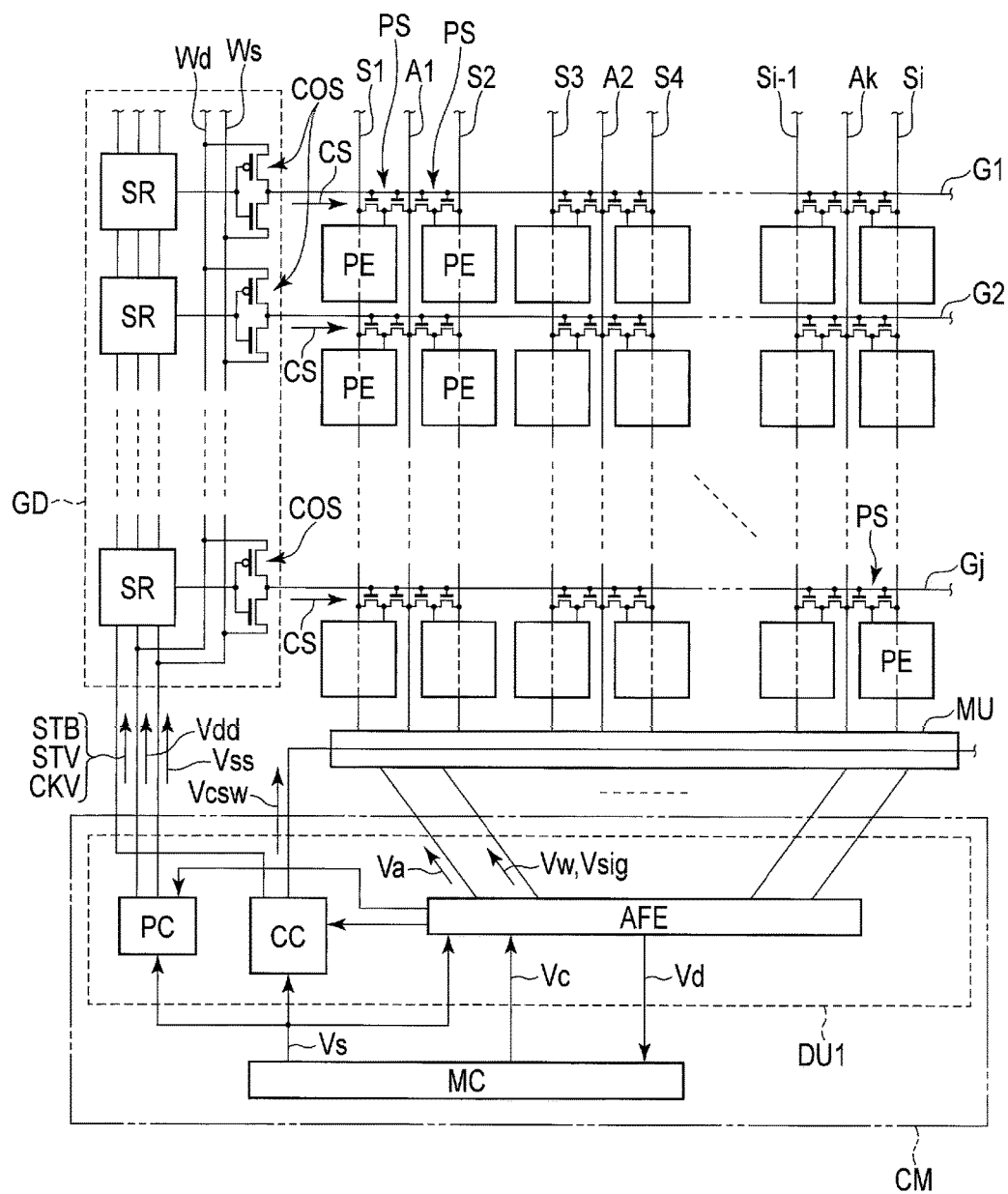
F I G. 7

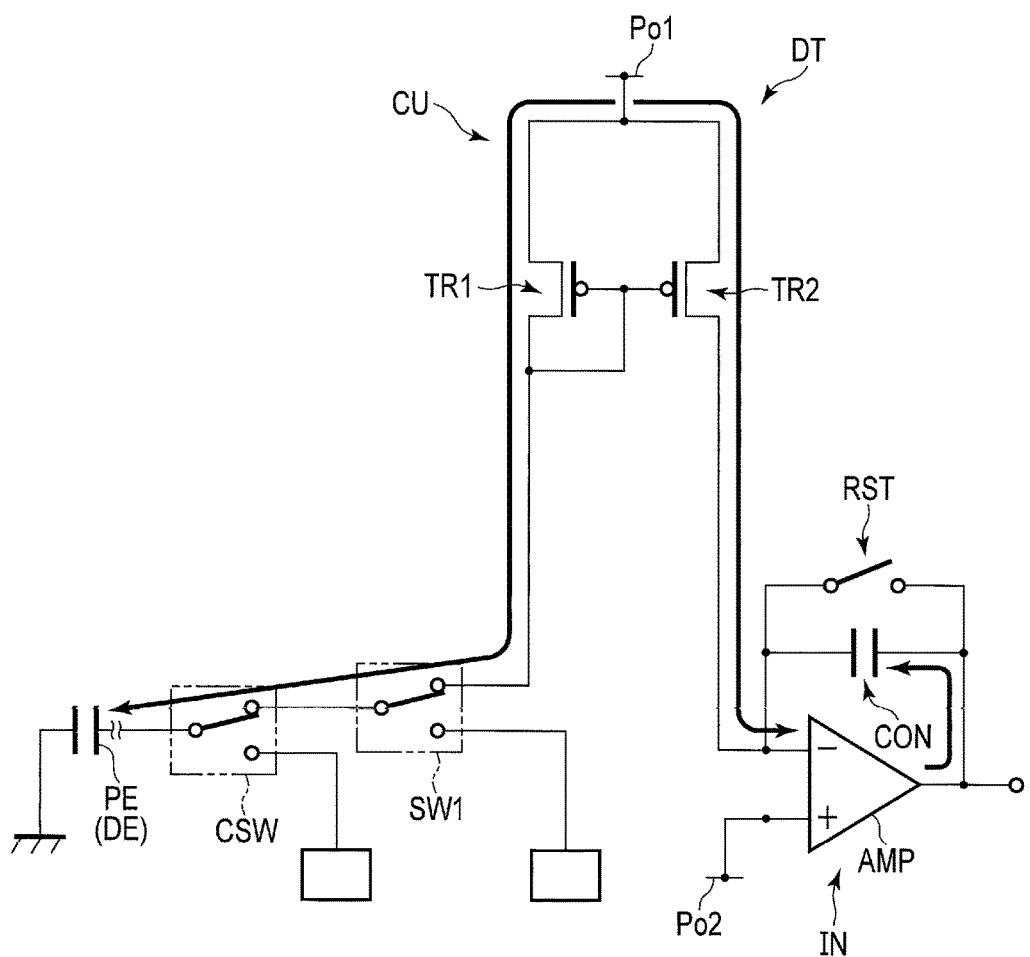
F I G. 10

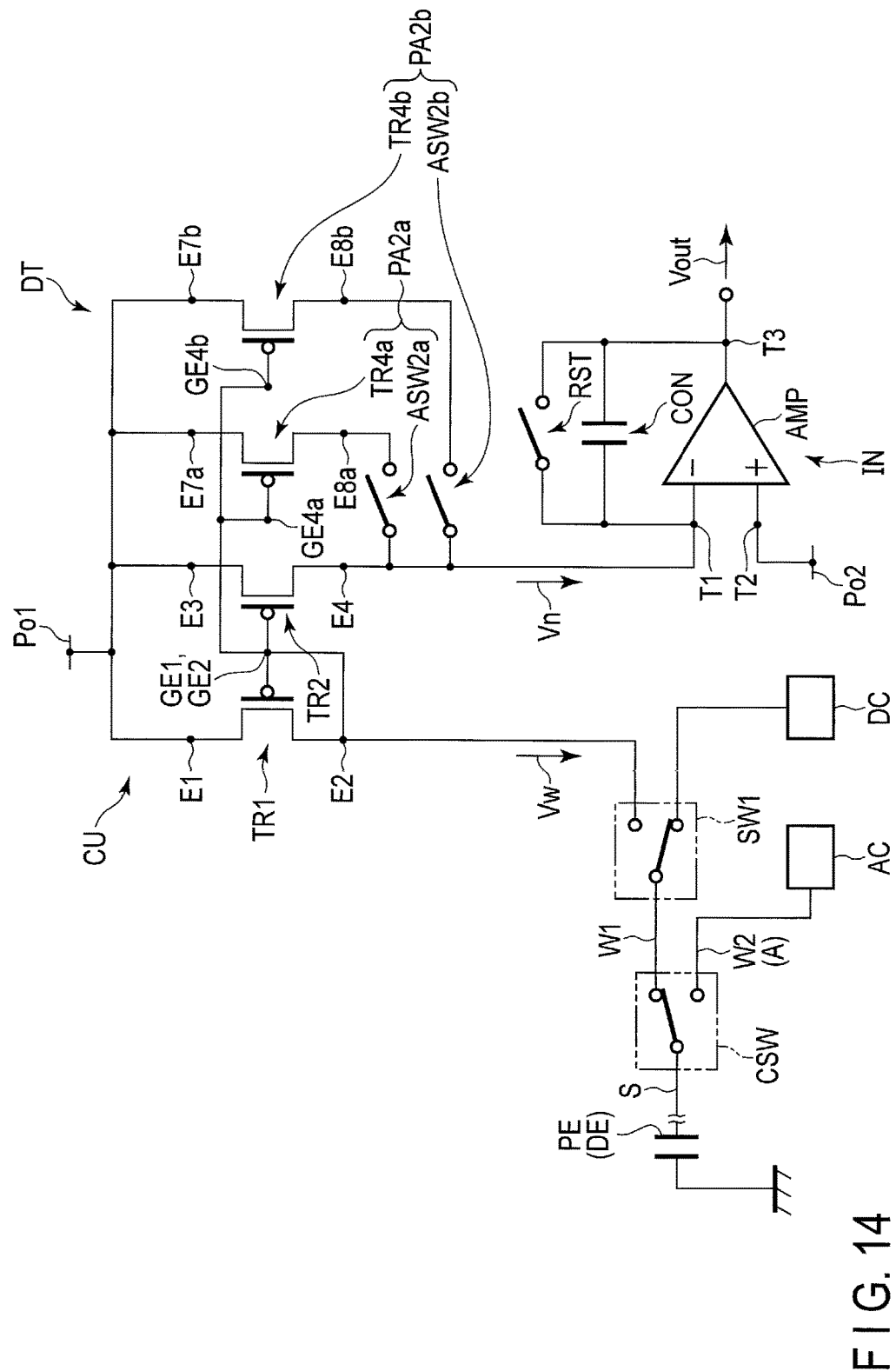
F I G. 14

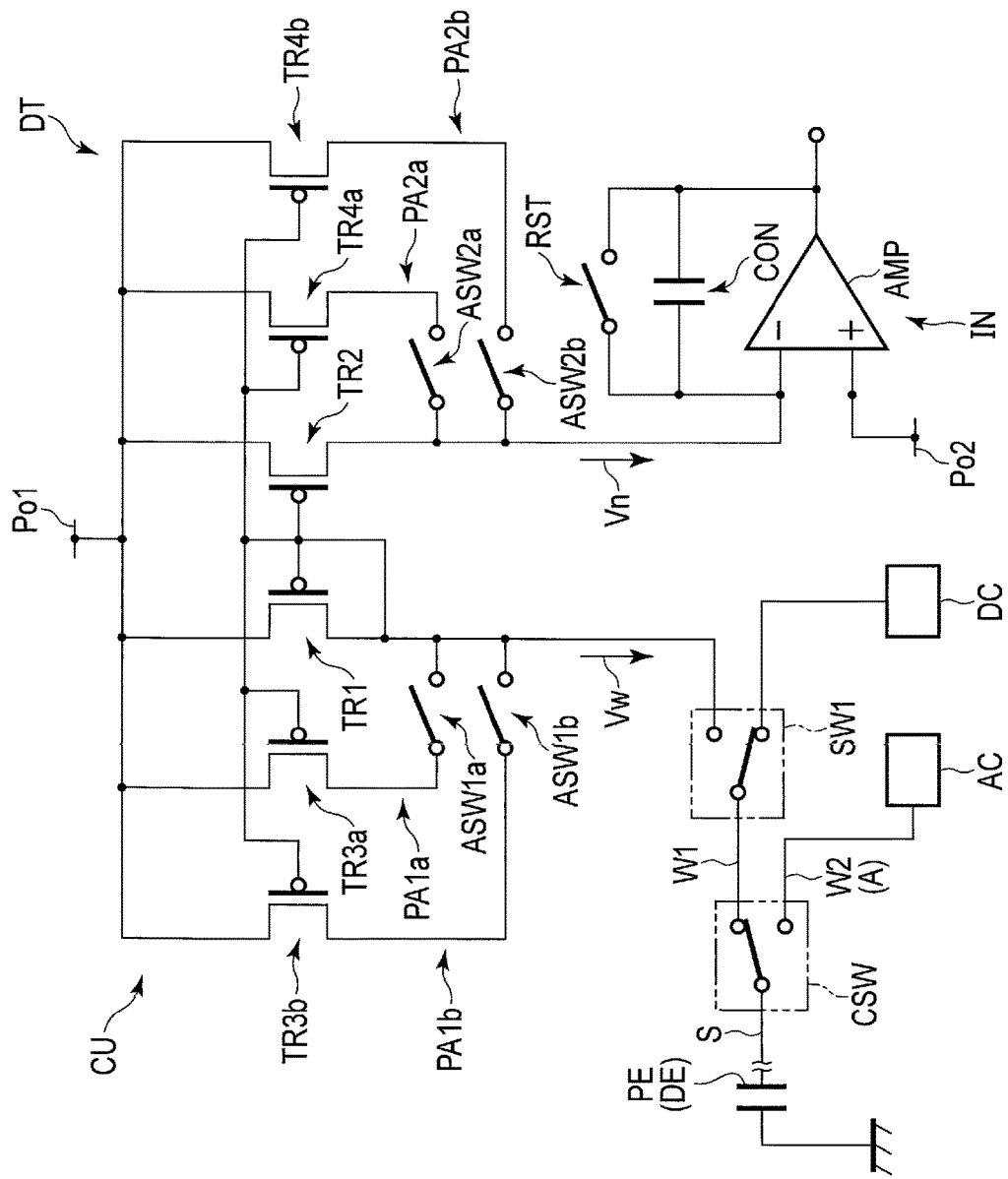
F I G. 15

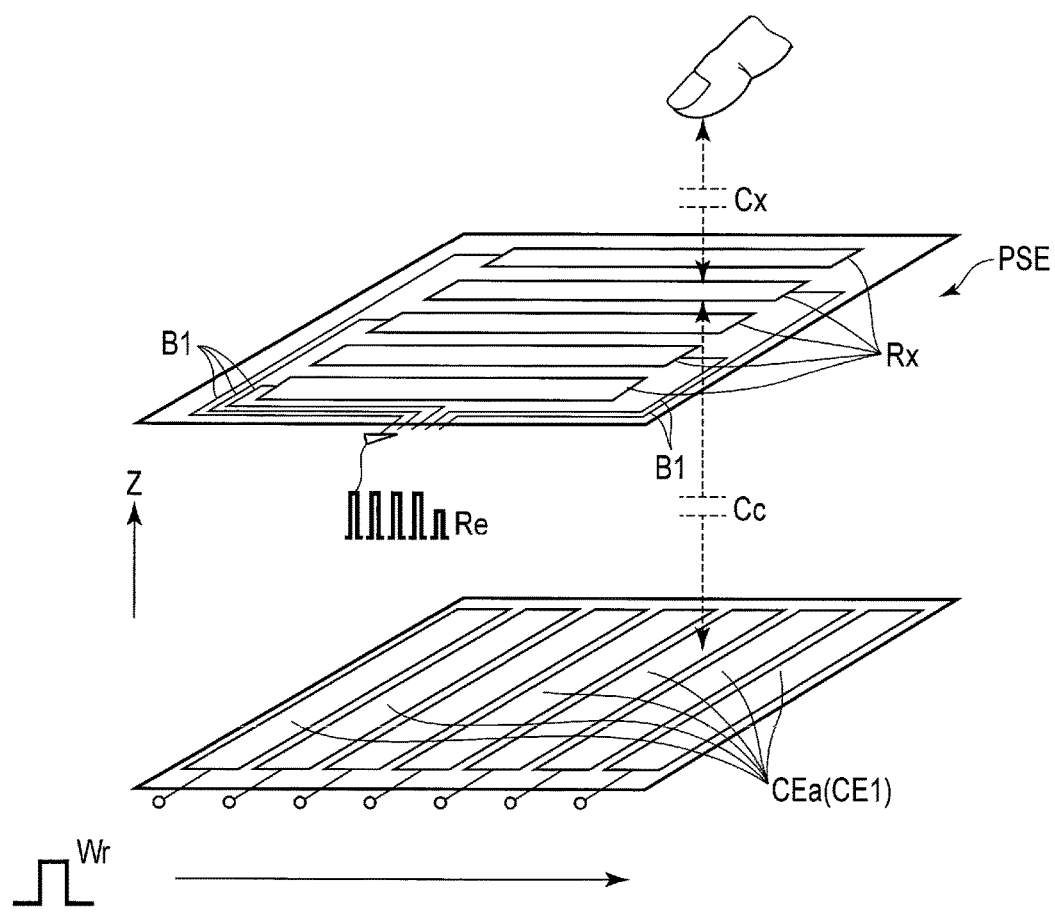
F I G. 17

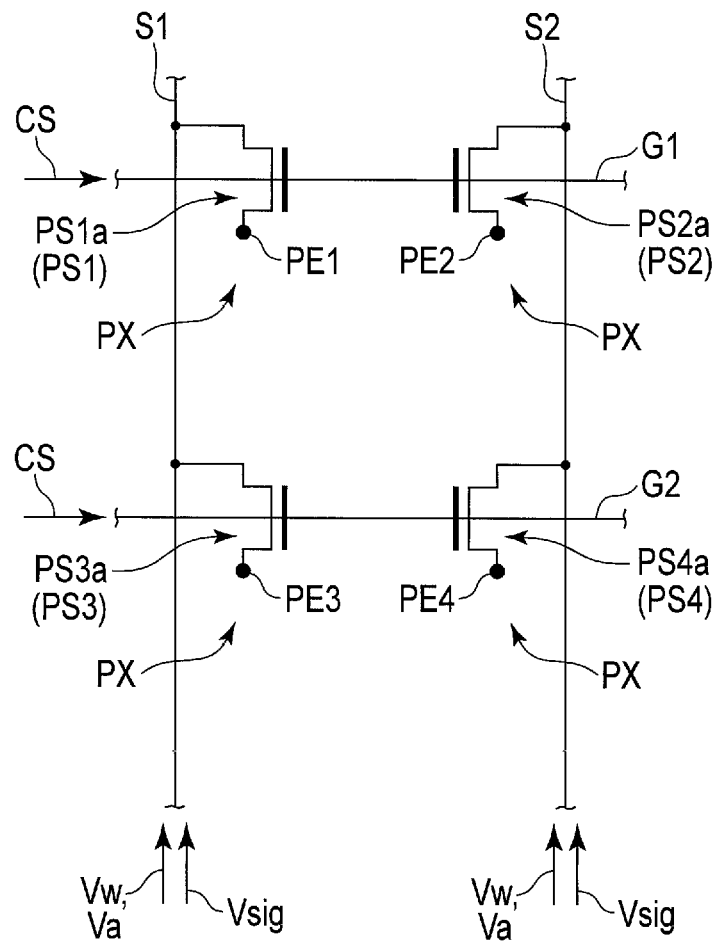
F I G. 19

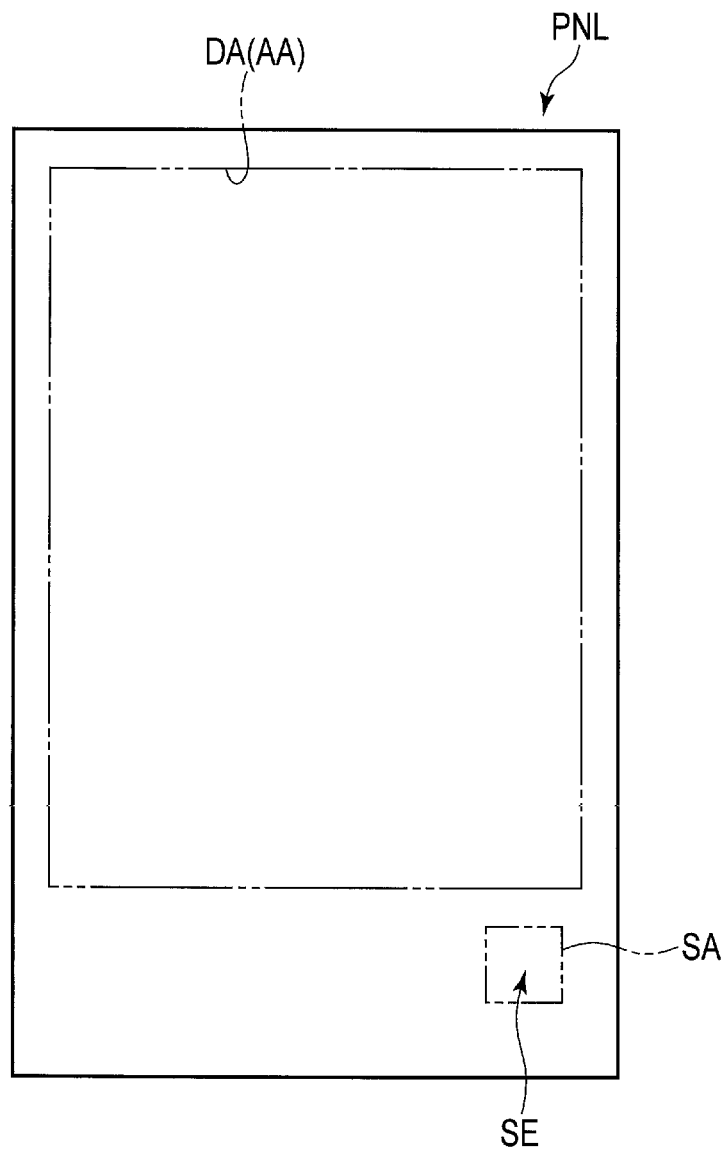
F I G. 20

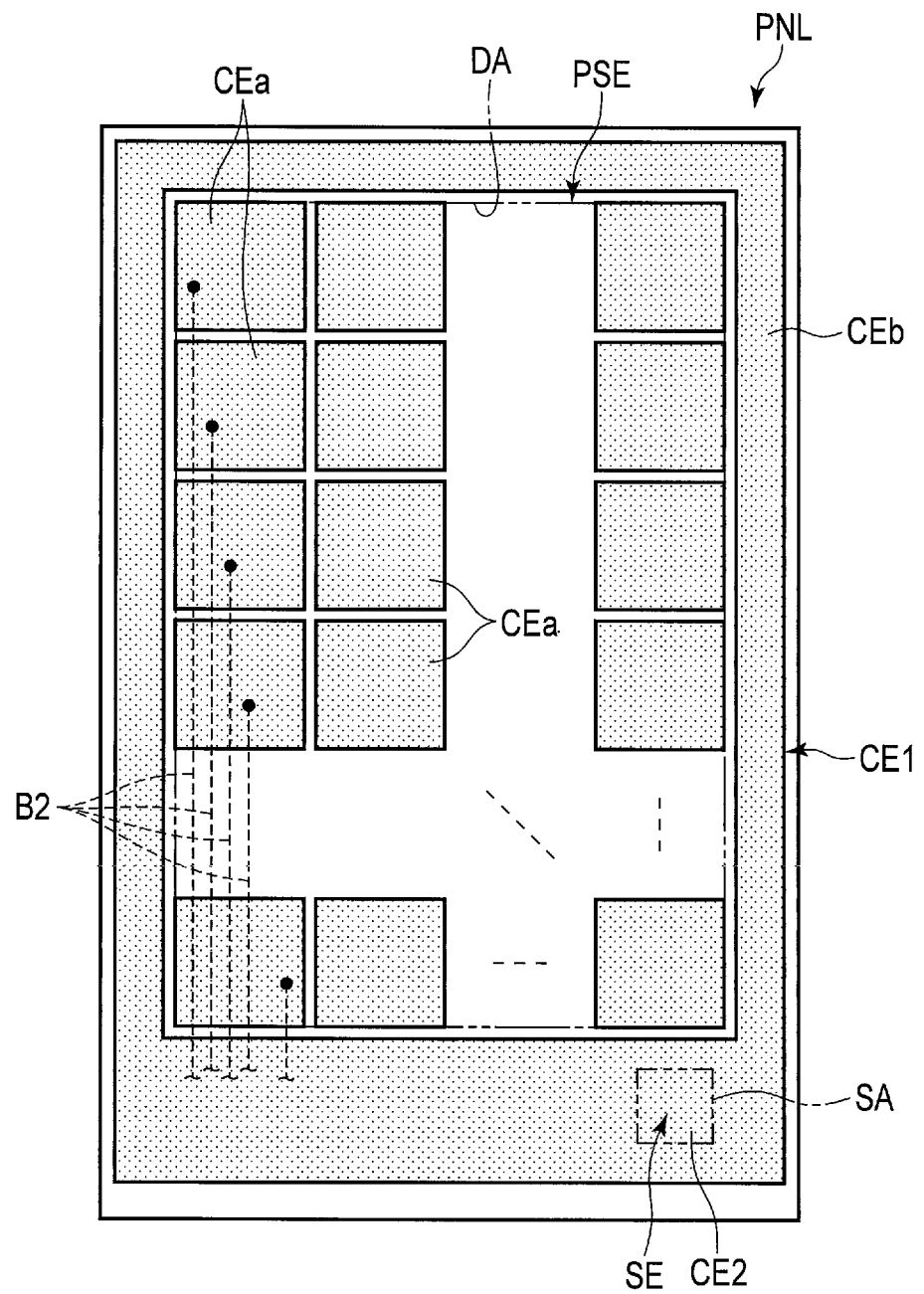
F I G. 22

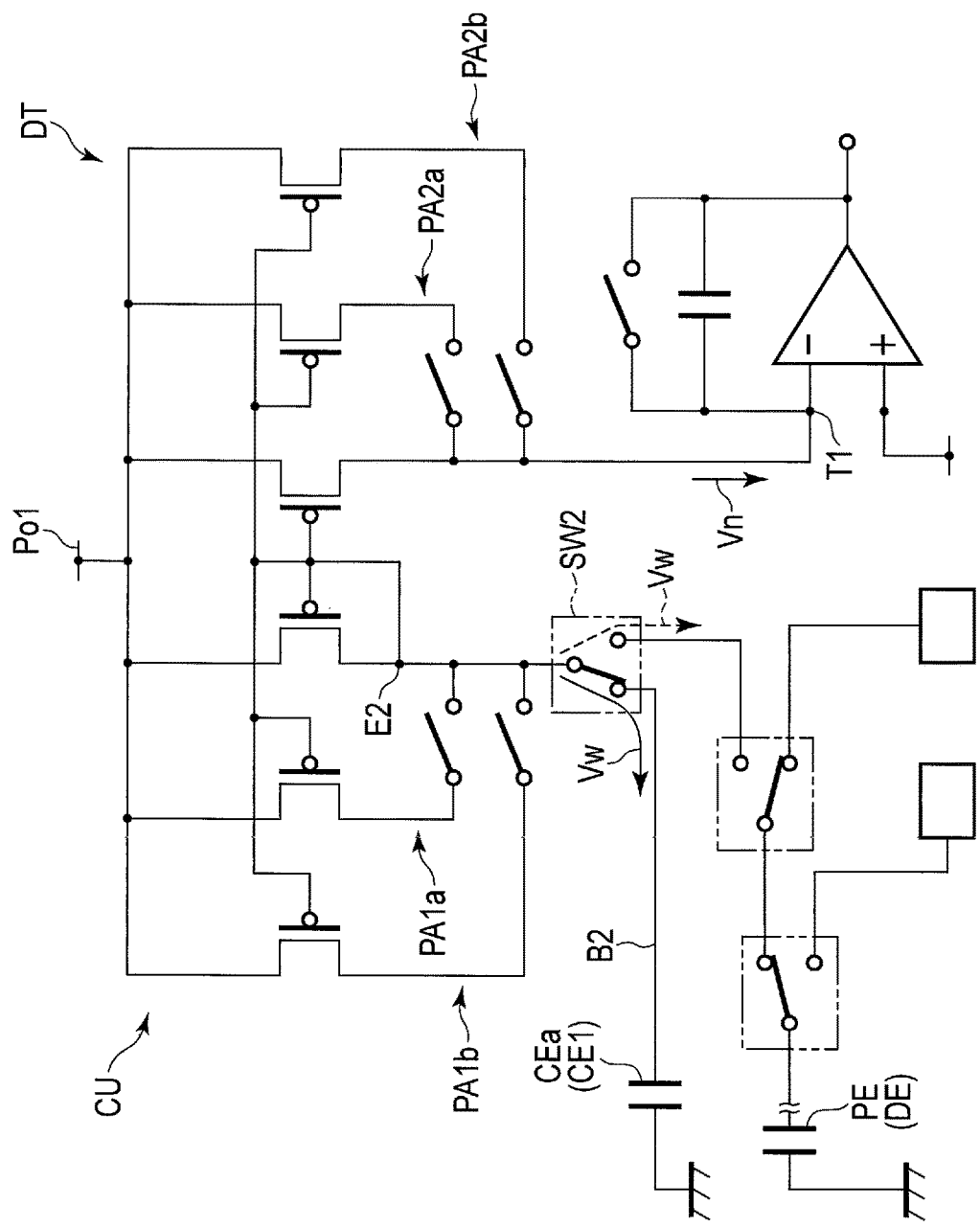
F I G. 23

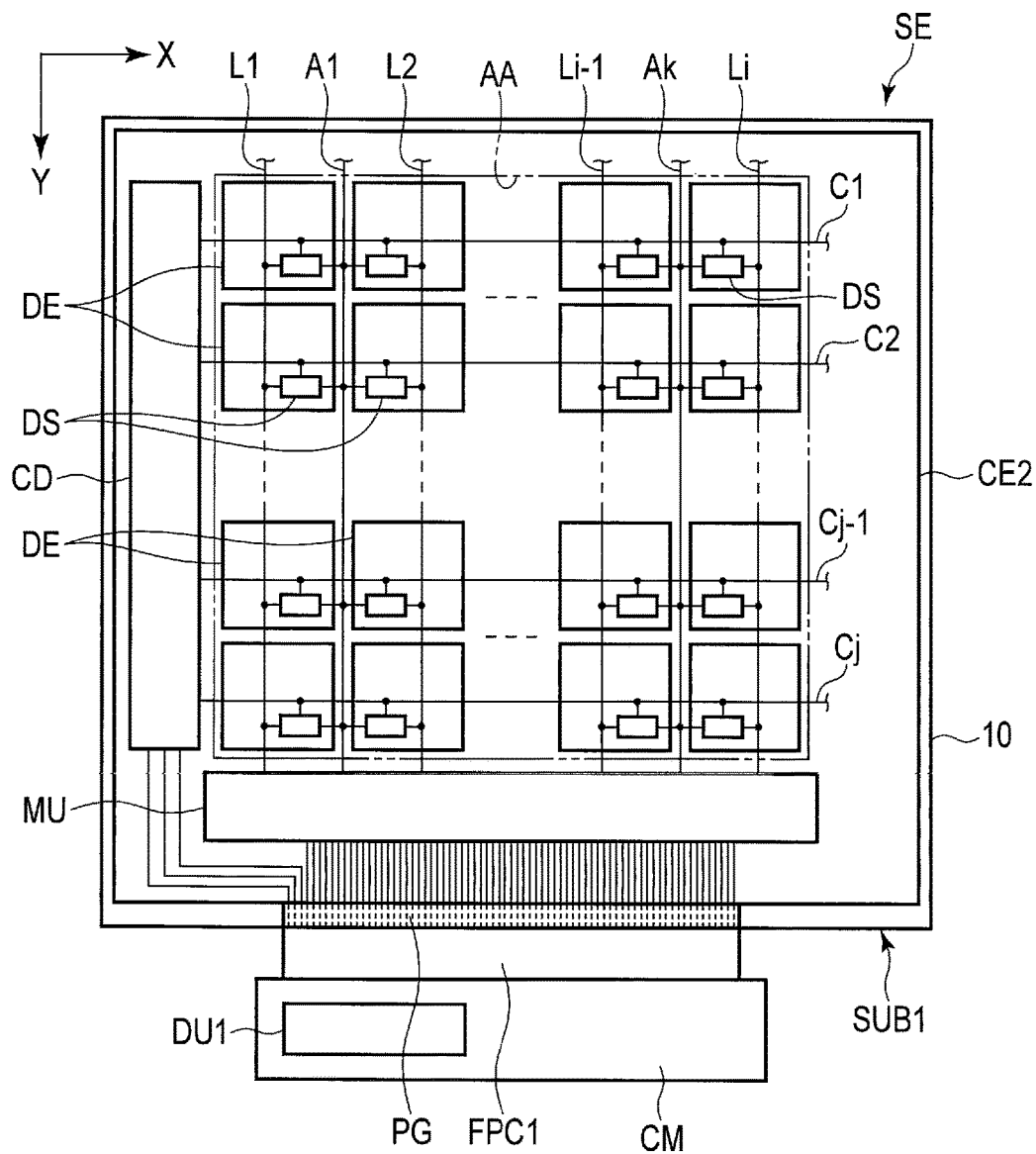
F I G. 25

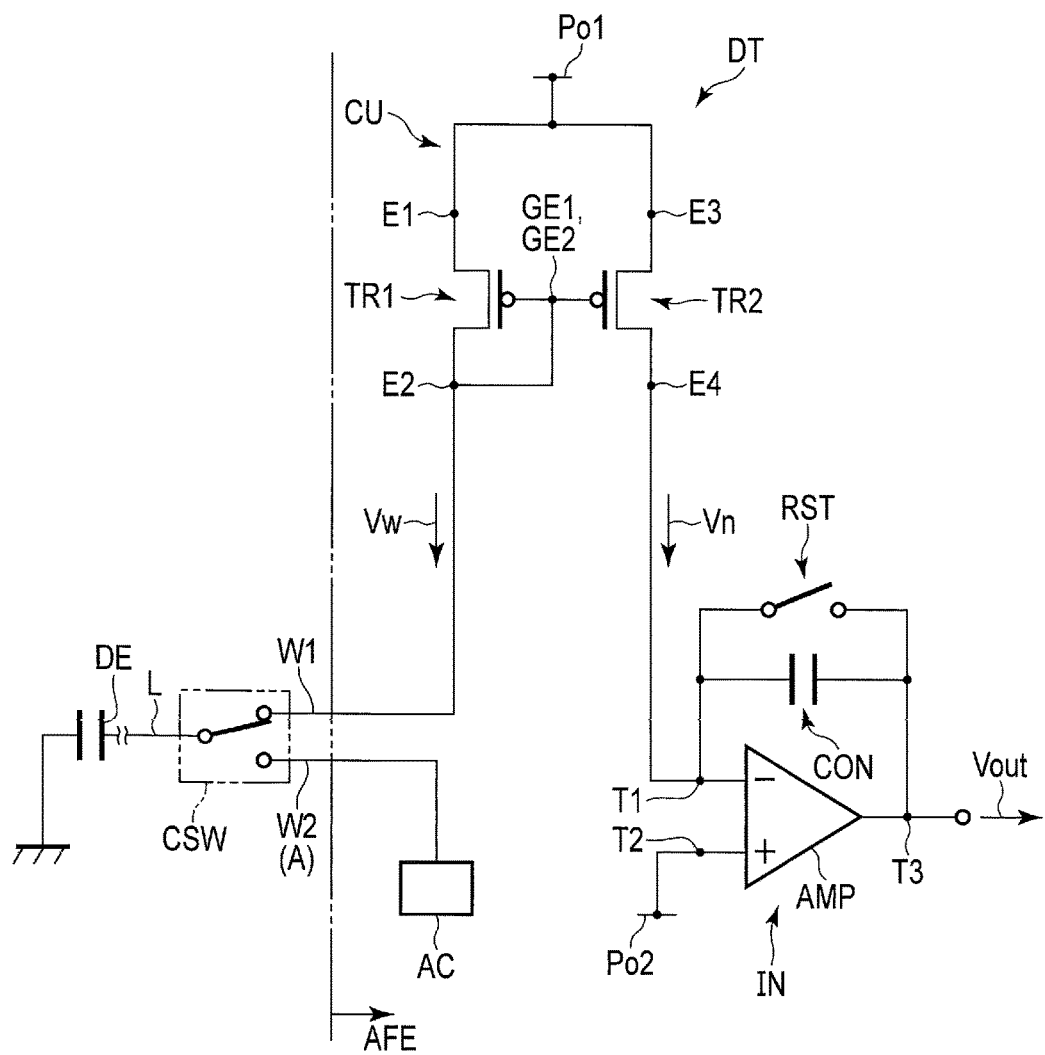
F I G. 26

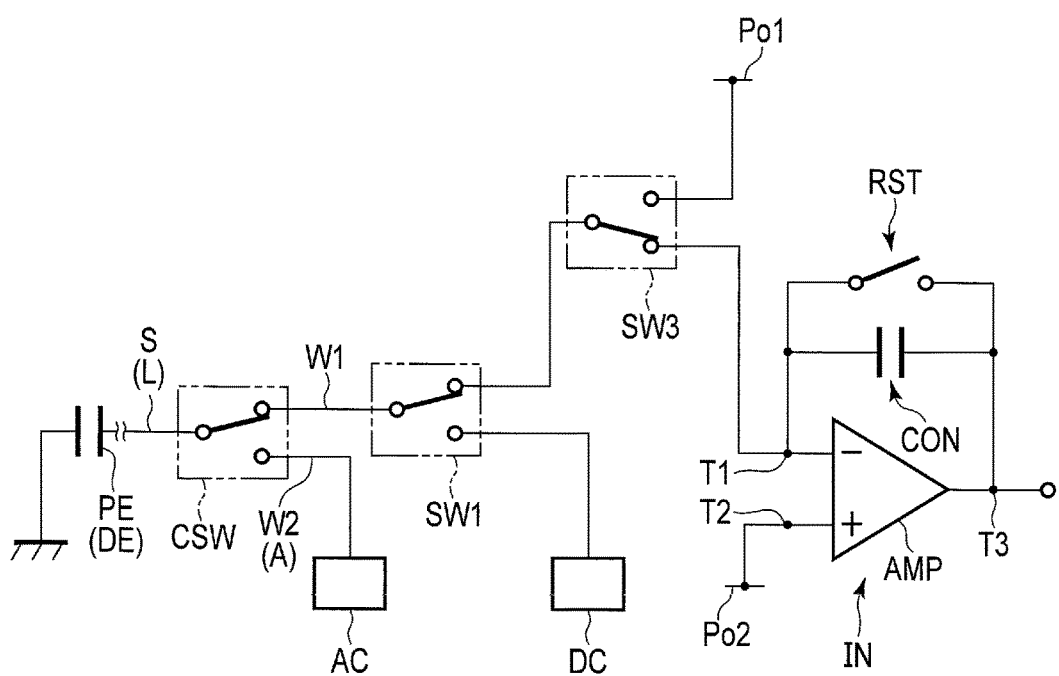
F I G. 27

SENSOR AND SENSOR-EQUIPPED DISPLAY DEVICE

CROSS-REFERENCE TO RELATED APPLICATIONS

This application is based upon and claims the benefit of priority from Japanese Patent Application No. 2016-056966, filed Mar. 22, 2016, the entire contents of which are incorporated herein by reference.

FIELD

Embodiments described herein relate generally to a sensor and a sensor-equipped display device.

BACKGROUND

In recent years, various kinds of sensors have been developed. For example, a sensor which detects a concavo-convex pattern (fingerprint) of a finger surface is known.

BRIEF DESCRIPTION OF THE DRAWINGS

FIG. 2 is a plan view illustrating part of the liquid crystal display device according to the first embodiment.

FIG. 3 is an equivalent circuit schematic illustrating a relationship in electrical connection between lines and four pixels in a first substrate as illustrated in FIGS. 1 and 2.

FIG. 5 is a cross-sectional view of the first substrate which is taken along line V-V in FIG. 4.

FIG. 7 is an equivalent circuit schematic illustrating a relationship in electrical connection between elements in the liquid crystal display device.

FIG. 10 is a view for explaining the driving method of the sensor as an equivalent circuit schematic associated with FIG. 8, and also illustrates how charge is accumulated in the pixel electrode and the capacitor, and the pixel electrode and the capacitor are charged.

FIG. 14 is an equivalent circuit schematic illustrating part of a liquid crystal display device according to modification 2 of the first embodiment, and also illustrating the detector, the pixel electrode, etc.

FIG. 15 is an equivalent circuit schematic illustrating part of a liquid crystal display device according to modification 3 of the first embodiment, and also illustrating the detector, the pixel electrode, etc.

FIG. 17 is a view for explaining a principle of an example of a position detection method.

FIG. 19 is an equivalent circuit schematic illustrating a relationship in electrical connection between lines and four pixels in a liquid crystal display device according to a third embodiment.

FIG. 20 is a plan view illustrating a configuration of a liquid crystal display panel of a liquid crystal display device according to a fourth embodiment.

FIG. 22 is a plan view illustrating a configuration of a liquid crystal display panel of a liquid crystal display device according to a fifth embodiment, and also illustrating a common electrode, etc.

FIG. 23 is an equivalent circuit schematic illustrating part of the liquid crystal display device according to the fifth embodiment, and also illustrating a detector, a pixel electrode, a divided electrode, etc.

FIG. 25 is a plan view illustrating a sensor according to a seventh embodiment.

FIG. 26 is an equivalent circuit schematic illustrating part of a sensor according to the seventh embodiment, and also a view illustrating a detector, a detection electrode, etc.

FIG. 27 is an equivalent circuit schematic illustrating a modification of the above detector, and also a view illustrating the detector, the detection electrode, etc.

DETAILED DESCRIPTION

Figure 1:
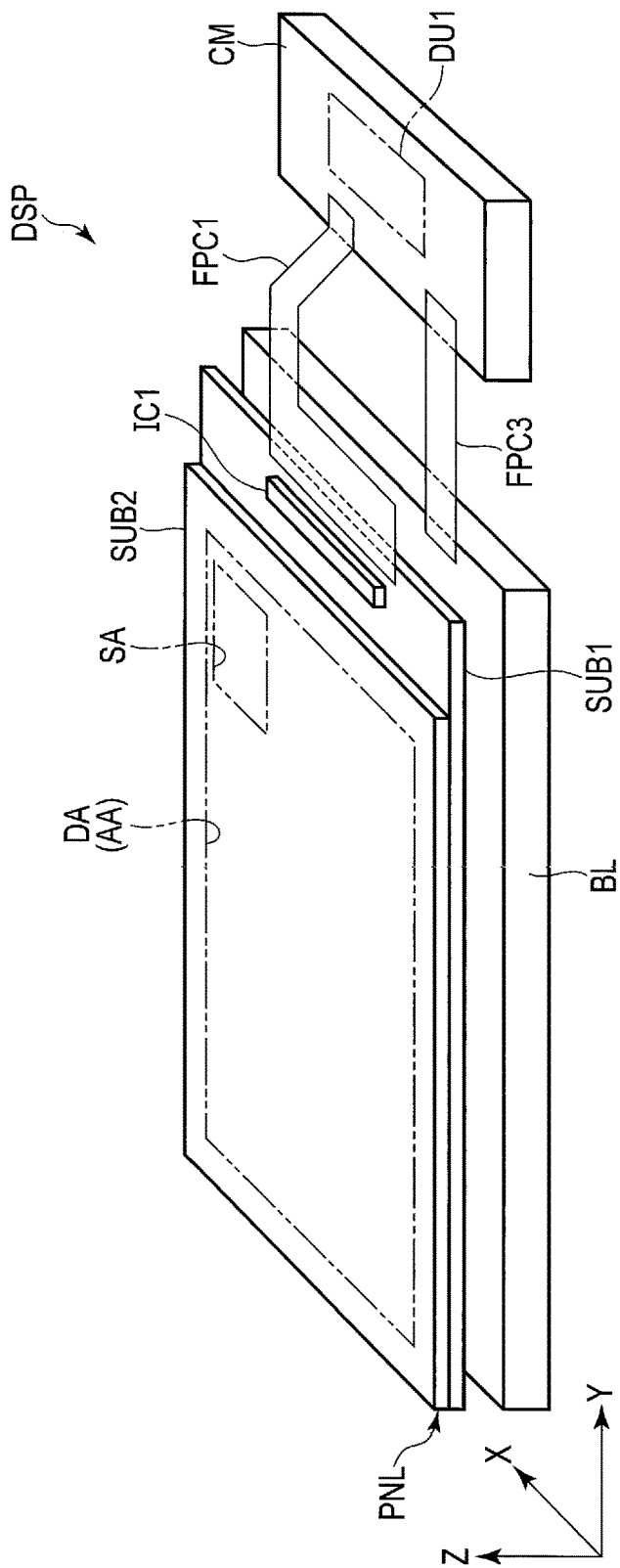
FIG. 1 is a perspective view illustrating a configuration of a liquid crystal display device according to a first embodiment.

In general, according to one embodiment, there is provided a sensor-equipped display device comprising: a scanning line; a signal line; a pixel switch connected to the scanning line and the signal line; a pixel electrode connected to the pixel switch; a first common electrode; a detection electrode; a current mirror circuit including a first transistors and a second transistor, the first transistor including a first gate electrode, a first electrode connected to a first power supply and a second electrode connected to the detection electrode and the first gate electrode, the second transistor including a second gate electrode connected to the first gate electrode, a third electrode connected to the first power supply, and a fourth electrode; and an integrator including an operational amplifier and a capacitor, the operational amplifier including an inverting input terminal connected to the fourth electrode and a noninverting input terminal connected to a second power supply, the capacitor being connected between an output terminal and the inverting input terminal of the operational amplifier.

According to another embodiment, there is provided a sensor-equipped display device comprising: a scanning line; a signal line; a pixel switch connected to the scanning line and the signal line; a pixel electrode connected to the pixel switch; a control line; a detection line; a detection switch connected to the control line and the detection line; a detection electrode connected to the detection switch; an integrator including an operation amplifier and a capacitor, the operational amplifier including an inverting input terminal and a non-inverting input terminal connected to a second power supply, the capacitor connected between an output terminal and the inverting input terminal of the operational amplifier; and a drive switch a state of which is switched to one of a write state in which the drive switch electrically connects the first power supply and the detection line and a read state in which the drive switch electrically connects the inverting input terminal and the detection line, wherein the state of the drive switch is repeatedly switched from the read state to the write state and from the write state to the read state, to thereby accumulate in the capacitor, charge an amount of which corresponds to that of charging performed a number of times, the state of the drive state being switched to the write state to charge the detection electrode, and being switched to the read state to discharge the detection electrode and charge the capacitor.

According to another embodiment, there is provided a sensor comprising: a control line; a detection line; a detection switch connected to the control line and the detection line; a common electrode provided above the control line, the detection line and the detection switch and opposite to the control line, the detection line and the detection switch, the common electrode including an opening; a detection electrode provided above the common electrode and opposite to the opening, and connected to the detection switch through the opening; a first circuit connected to the control line, and supplies the control line with a drive signal for causing a state of the detection switch to be switched to one of a first connection state and a second connection state, the first connection state being a state in which the detection switch electrically connects the detection line and the detection electrode, the second connection state being a state in which the detection switch electrically disconnects the detection line and the detection electrode from each other; a current mirror circuit including a first transistor and a second transistor, the first transistor including a first gate electrode, a first electrode connected to a first power supply and a second electrode connected to the detection electrode and the first gate electrode, the second transistor including a second gate electrode connected to the first gate electrode, a third electrode connected to the first power supply, and a fourth electrode; and an integrator including an operational amplifier and a capacitor, the operational amplifier including an inverting input terminal connected to the fourth electrode and a non-inverting input terminal connected to a second power supply, the capacitor connected between an output terminal and the inverting input terminal of the operational amplifier.

Embodiments will be hereinafter explained with reference to the accompanying drawings. The disclosure is a mere example, and arbitrary change of gist which can be easily conceived by a person of ordinary skill in the art naturally falls within the inventive scope. To better clarify the explanations, the drawings may pictorially show width, thickness, shape, etc., of each portion as compared with an actual aspect, but they are mere examples and do not restrict the interpretation of the invention. In the present specification and drawings, after structural elements are each explained once with reference to the drawings, there is a case where their explanations will be omitted as appropriate, and those identical to or similar to the explained structural elements will be denoted by the same reference numbers, respectively, as the explained structural elements.

In the following explanation, it is assumed that a direction from a first substrate SUB1 toward a second substrate SUB2 is an upward direction, and a direction from the second substrate SUB2 toward the first substrate SUB1 is a downward direction. Furthermore, in the following, the phrases "formed above" and "formed below" are present, and for example, in descriptions and recitations disclosing that element I is formed above or below element II, they suggest that element I is separated from element II; however, element I may be in contact with element II. Also, in structural features disclosed in the above descriptions and recitations, element III may be interposed between elements I and II. Also, in the following, the phrases "formed on" and "formed under" are present, and for example, in descriptions and recitations disclosing that element I is formed on or under element II, they suggest that element I is in contact with element II.

First Embodiment

A liquid crystal display device and a driving method thereof according to the first embodiment will be described. In the first embodiment, the liquid crystal display device is a sensor-equipped liquid crystal display device. FIG. 1 is a perspective view illustrating a configuration of a liquid crystal display device DSP according to the first embodiment.

As illustrated in FIG. 1, the liquid crystal display device DSP comprises an active-matrix liquid crystal display panel PNL, a driver IC (IC1) which drives the liquid crystal display panel PNL, a backlight unit BL which illuminates the liquid crystal display panel PNL, a control module CM, flexible printed circuits FPC1 and FPC3, etc.

The liquid crystal display panel PNL comprises a first substrate SUB1 formed in the shape of a flat plate, a second substrate SUB2 formed in the shape of a flat shape and located opposite to the first substrate SUB1, and a liquid crystal layer held between the first substrate SUB1 and the second substrate SUB2. In the first embodiment, the first substrate SUB1 and the second substrate SUB2 can be restated as an array substrate and a counter-substrate, respectively.

The liquid crystal display device DSP includes an active area AA. In the first embodiment, the active area AA is a display area DA which is provided to display an image. The display area DA is rectangular; however, it is not limited to this. For example, it may be circular. Furthermore, the liquid crystal display device DSP includes a sensing area SA which is superimposed on part of the display area DA or is entirely superimposed on the display area DA. The sensing area SA is an area provided to detect an object to be detected. In the example illustrated in FIG. 1, the sensing area SA is superimposed on part of the display area DA. The object to be detected is, for example, a conductive object such as a finger.

The backlight unit BL is provided on a rear surface of the first substrate SUB1. As the structure of the backlight unit BL, various structures can be applied. For example, a backlight unit BL employing a light-emitting diode (LED) as a light source can be applied. A detailed explanation of the structure of the backlight unit BL will be omitted.

The liquid crystal display panel PNL is a transmissive liquid crystal display panel having a transmission display function of selectively transmitting backlight emitted from the backlight unit BL to display an image. It should be noted that the liquid crystal display panel PNL may be a transreflective liquid crystal display panel having a reflection display function of selectively reflecting external light to display an image, in addition to the transmission display function. Alternatively, the liquid crystal display panel PNL may be a reflective liquid crystal display device having the reflection display function only. In this case, the liquid crystal display device DSP is formed without including a backlight unit BL.

The liquid crystal display device DSP may include a cover member not shown. For example, the cover member can be provided above an outer surface of a screen of the liquid crystal display panel PNL which displays an image. It should be noted that the outer surface is a surface of the second substrate SUB2 which is located on the opposite side of a surface of the second substrate SUB2 which faces the first substrate SUB1, and the outer surface includes a display surface which displays an image.

The driver IC (IC1) is mounted on the first substrate SUB1 of the liquid crystal display panel PNL. The flexible printed circuit FPC1 connects the liquid crystal display panel PNL and the control module CM to each other. The control module CM gives a signal or a voltage to the driver IC (IC1). The flexible printed circuit FPC3 connects the backlight unit BL and the control module CM to each other.

FIG. 2 is a plan view illustrating part of the liquid crystal display device DSP according to the first embodiment.

As illustrated in FIG. 2, the first substrate SUB1 includes a first insulating substrate 10 such as a glass substrate or a resin substrate. Above the first insulating substrate 10, a plurality of scanning lines G, a plurality of signal lines S and a plurality of auxiliary lines A are provided.

The plurality of scanning lines G include j scanning lines, i.e., a first scanning line G1, a second scanning line G2, . . . , a $j^{th}$ scanning line Gj. The scanning lines G extend in a first direction X, and arranged and spaced from each other in a second direction Y crossing the first direction X. Each of the scanning lines G is shared among pixels PX arranged in an associated row direction.

The plurality of signal lines S include i signal lines, i.e., a first signal line S1, a second signal line S2, . . . , an $i^{th}$ signal line S1. The signal lines S extend in the second direction Y, and are arranged and spaced from each other in the first direction X. The signal lines S cross the scanning lines G in the display area DA. Each of the signal lines S is shared among pixels PX arranged in a column direction.

The auxiliary lines A include k auxiliary lines, i.e., a first auxiliary line A1, . . . a $k^{th}$ auxiliary line Ak. The auxiliary lines A located in line with the signal lines S, extend in the second direction Y, and arranged and spaced from each other in the first direction X. The auxiliary lines A cross the scanning lines G in the display area DA. Each of the auxiliary lines A is shared among pixels PX arranged in two adjacent columns.

In the first embodiment, the first direction X and the second direction Y can be restated as a row direction and a column direction, respectively. The first direction X and the second direction Y are perpendicular to each other; however, they may intersect each other at an angle other than 90°. Each of the number of the scanning lines G, that of the signal lines S and that of the auxiliary lines A is not limited to a specific number; that is, they can be variously changed. In the first embodiment, the number of the auxiliary lines A is half that of the signal lines S.

Furthermore, pixel switches PS are provided close to intersections of the scanning lines G and the signal lines S. Each of the pixel switches PS is connected to an associated scanning line G, an associated signal line S and an associated auxiliary line A.

A common electrode CE1 provided as a first common electrode is located above the first insulating substrate 10, the scanning lines G, the signal lines S, the auxiliary lines A and the pixel switches PS, and is also located opposite to the scanning lines G, the signal lines S, the auxiliary lines A and the pixel switches PS. The common electrode CE1 is not only provided in the display area DA, but also extends to the outside of the display area DA. In the first embodiment, the common electrode CE1 is a single electrode. However, its shape and pattern are not limited to specific ones; that is, they can be variously changed. For example, the common electrode CE1 may include a plurality of divided electrodes arranged in the manner of stripes or a plurality of divided electrodes arranged in a matrix.

The plurality of pixel electrodes PE are located above the common electrode CE1. In the example illustrated in FIG. 2, the pixel electrodes PE are rectangular, and arranged in a matrix in the display area DA in the first direction X and the second direction Y. In other words, the display area DA is an area in which the pixel electrodes PE are provided. However, the above shape of the pixel electrodes PE is taken as an example; that is, it is not limited to a rectangle. The number of the pixel electrodes PE is i×j. The pixel electrodes PE are arranged at approximately 50-μm pitch in the first direction X and also at approximately 50-μm pitch in the second direction Y.

A scanning-line drive circuit GD serving as a first circuit is provided in a layer located between the first insulating substrate 10 and the common electrode CE1. The scanning-line drive circuit GD is located below the common electrode CE1 and opposite to the common electrode CE1. Outside the display area DA, the scanning-line drive circuit GD is connected to the scanning lines G. Also, outside the display area DA, the scanning-line drive circuit GD is connected to an outer lead bonding (OLB) pad group PG provided at one of end portions of the first insulating substrate 10. The scanning-line drive circuit GD supplies each of the scanning lines G with a drive signal for switching the states of associated pixel switches PS to either a first connection state or a second connection state. The first connection state is a state in which each of the associated pixel switches PS electrically connects an associated pixel electrode PE and an associated signal line S, and electrically disconnects the pixel electrode PE and an associated auxiliary line A from each other. The second connection state is a state in which each of the associated pixel switches PS electrically disconnects the pixel electrode PE and the signal line S from each other, and electrically connects the pixel electrode PE and the auxiliary line A to each other. Unlike the embodiment, the common electrode CE1 does not need to be expanded to the outside of the scanning-line drive circuit GD as seen in plan view.

A demultiplexer MU serving as a second circuit is provided in a layer located between the first insulating substrate 10 and the common electrode CE1. The demultiplexer MU is located below the common electrode CE1 and opposite to the common electrode CE1. Outside the display area DA, the demultiplexer MU is connected to the signal lines S. Also, outside the display area DA, the demultiplexer MU is connected to the OLB pad group PG. In the first embodiment, as the demultiplexer MU, a demultiplexer having a single input and four outputs is used. However, in the first embodiment, the demultiplexer MU is not limited to this; that is, it can be variously changed. For example, a single input three output demultiplexer can be used.

It should be noted that in the first embodiment, since the second circuit is the demultiplexer MU, the auxiliary lines A are connected to the driver IC (IC1) without extending through the demultiplexer MU. Unlike the embodiment, the common electrode CE1 does not need to be expanded to the outside of the demultiplexer MU as seen in plan view.

The driver IC (IC1) is connected to the demultiplexer MU and the scanning-line drive circuit GD. The common electrode CE1 is not located opposite to the driver IC (IC1). The common electrode CE1 extends to the outside of the display area DA and is located opposite to the demultiplexer MU and the scanning-line drive circuit GD.

The control module CM is connected through the flexible printed circuit FPC1 to the OLB pad group PG provided at the first insulating substrate 10. The control module CM can be an application processor. The control module CM is connected to the scanning-line drive circuit GD, the demultiplexer MU, etc., through the flexible printed circuit FPC1, etc. The control module CM can control driving of the scanning-line drive circuit GD, the demultiplexer MU, etc., and synchronize the scanning-line drive circuit GD and the demultiplexer MU with each other.

The liquid crystal display device DSP includes a sensor SE. The sensor SE includes control lines C, detection lines L, detection switches DS, a common electrode CE2 provided as a second common electrode, detection electrodes DE, a control-line drive circuit CD, etc. The common electrode included in the sensor SE, as described above, is referred to as the common electrode CE2, in order that it be distinguished from the above common electrode CE1. It should be noted that in the first embodiment, the common electrode CE2 is formed to include at least part of the common electrode CE1. Each of the detection switches DS is connected to an associated control line C and an associated detection line L. The common electrode CE2 is located above the control lines C, the detection lines L and the detection switches DS and opposite to the control lines C, the detection lines L and the detection switches DS, and includes openings located opposite to the detection switches DS. The detection electrodes DE are located above the common electrode CE2 and opposite to the openings of the common electrode CE2, and are connected to the detection switches DS through the openings. To the control-line drive circuit CD, the control lines C are connected.

In the first embodiment, the pixel electrodes PE provided in the sensing area SA are also used as the detection electrodes DE. Thus, the pixel electrodes PE provided in the sensing area SA are used for both a display drive and a sensing drive. The pixel electrodes PE are supplied with an image signal (for example, a video signal) at the time of performing the display drive, and with a drive signal at the time of performing the sensing drive to perform a detection operation for detecting an object which is located in proximity to the display panel. Furthermore, the scanning-line drive circuit GD, the scanning lines G, the signal lines S, the pixel switches PS and the common electrode CE1 are used in order that an image be displayed at a display time. On the other hand, at a detection time, in the first embodiment, the scanning-line drive circuit GD is used as the control-line drive circuit CD, associated scanning lines G are used as control lines C, associated signal lines S are used as detection lines L, associated pixel switches PS are used as detection switches DS, and the common electrode CE1 is used as the common electrode CE2.

As described above, the common electrode CE1 is not located opposite to the OLB pad group PG, but it is located opposite to the lines, switches, circuits, etc. which are located above the first insulating substrate 10. Alternatively, the common electrode CE1 covers the above lines, switches, circuits, etc. The above elements provided above the first insulating substrate 10 are located opposite to the common electrode CE1 without being located outward of the outer periphery of the common electrode CE1, except the driver IC (IC1), part of lines directly connected to the driver IC (IC1), the OLB pad group PG and part of lines directly connected to the OLB pad group PG. Thus, the common electrode CE1 can electrically shield the pixel electrodes PE (the detection electrodes DE) not only in the display area DA but in an area located outward of the display area DA. That is, by virtue of the above structure, a parasitic capacitance is not easily generated in the pixel electrodes PE, and lowering of the sensitivity of the sensor can thus be reduced.

FIG. 3 is an equivalent circuit schematic illustrating a relationship in electrical connection between lines and four pixels PX in the first substrate SUB1 as illustrated in FIGS. 1 and 2.

As illustrated in FIG. 3, each of the pixels PX includes a pixel switch PS, a pixel electrode PE, etc. The pixel switch PS includes a first switching element and a second switching element which are connected in series to each other. The first and second switching elements are formed of, for example, thin-film transistors of different conductive types. In the first embodiment, the first switching element is formed of an N-channel thin-film transistor, and the second switching element is formed of a P-channel thin-film transistor. The first and second switching elements may be of either a top-gate type or a bottom-gate type. Also, semiconductor layers of the first and second switching elements are formed, for example, polycrystalline silicon (poly-Si); however, they may be formed of amorphous silicon or an oxide semiconductor or the like.

To be more specific, a first pixel switch PS1 includes a first switching element PS1a and a second switching element PS1b. The first switching element PS1a includes a first electrode electrically connected to a first scanning line G1, a second electrode electrically connected to a first signal line S1 and a third electrode electrically connected to a first pixel electrode PE1. The second switching element PS1b includes a first electrode electrically connected to the first scanning line G1, a second electrode electrically connected to a first auxiliary line A1 and a third electrode electrically connected to the first pixel electrode PE1.

In each of the first switching element PS1a and the second switching element PS1b, the first electrode functions as a gate electrode, one of the second and third electrodes functions as a source electrode, and the other of the second and third electrodes functions as a drain electrode. The third electrode of the first switching element PS1a is electrically connected to the third electrode of the second switching element PS1b. It should be noted that with respect to the functions of the first to third electrodes, the same is true of a second pixel switch PS2 and a third pixel switch PS3, and a fourth pixel switch PS4, which will be described as follows; that is, first to third electrodes of each of the second pixel switch PS2, the third pixel switch PS3 and the fourth pixel switch PS4 have the same functions as the first to third electrodes of the first pixel switch PS1.

The second pixel switch PS2 includes a first switching element PS2a and a second switching element PS2b. The first switching element PS2a includes a first electrode electrically connected to the first scanning line G1, a second electrode electrically connected to a second signal line S2 and a third electrode electrically connected to a second pixel electrode PE2. The second switching element PS2b includes a first electrode electrically connected to the first scanning line G1, a second electrode electrically connected to the first auxiliary line A1 and a third electrode electrically connected to the second pixel electrode PE2.

The third pixel switch PS3 includes a first switching element PS3a and a second switching element PS3b. The first switching element PS3a includes a first electrode electrically connected to a second scanning line G2, a second electrode electrically connected to the first signal line S1 and a third electrode electrically connected to a third pixel electrode PE3. The second switching element PS3b includes a first electrode electrically connected to the second scanning line G2, a second electrode electrically connected to the first auxiliary line A1 and a third electrode electrically connected to the third pixel electrode PE3.

The fourth pixel switch PS4 includes a first switching element PS4a and second switching element PS4b. The first switching element PS4a includes a first electrode connected to the second scanning line G2, a second electrode electrically connected to the second signal line S2 and a third electrode electrically connected to a fourth pixel electrode PE4. The second switching element PS4b includes a first electrode electrically connected to the second scanning line G2, a second electrode electrically connected to the first auxiliary line A1 and a third electrode electrically connected to the fourth pixel electrode PE4.

It should be noted that the relationship in electrical connection between the pixel switches PS and the signal lines S and the relationship in electrical connection between the pixel switches PS and auxiliary lines A are not limited to the above. For example, it may be set that the second electrode of the first switching element of each of the pixel switches PS is electrically connected to an associated auxiliary line A, and the second electrode of the second switching element of each pixel switch PS is electrically connected to an associated signal line S.

The plurality of scanning lines G, i.e., the first scanning line G1, the second scanning line G2, etc., are driven by the scanning-line drive circuit GD, and each of the scanning lines G is supplied with a drive signal CS from the scanning-line drive circuit GD. In each of the pixel switches PS, one of the first switching element and the second switching element is turned on (on-state) and the other is turned off (off-state) by the drive signal CS. From the above, the connection state of each pixel switch PS is switched to either the first connection state or the second connection state.

The plurality of signal lines S, i.e., the first signal line S1, the second signal line S2, etc., can be driven by the control module CM using the demultiplexer MU.

For example, in a display drive period, a common voltage Vcom is applied to the auxiliary lines A such as the first auxiliary line A1, etc., and an image signal Vsig is sent to signal lines S such as the first signal line S1, the second signal line S2, etc. Thereby, the image signal Vsig can be supplied to pixel electrodes PE to be applied to the display drive. It should be noted that in the display drive period, the common voltage Vcom is also applied to the common electrode CE1.

In a sensing drive period, potential adjustment signals Va are supplied to the auxiliary lines A such as the first auxiliary line A1, etc., and a detection signal Vw is supplied to signal lines S (detection lines L) to be applied to the sensing drive. For example, in the case where the first pixel electrode PE1 (detection electrode DE) is a pixel electrode to be applied to the sensing drive, the detection signal Vw is sent to the first signal line S1. In this case, by switching the connection state of the first pixel switch PS1 to the first connection state in which the first switching element PS1a is closed (turned on), the detection signal Vw can be supplied to the first pixel electrode PE1, that is, the first pixel electrode PE can be charged. Although it will be described later, after the first pixel electrode PE is charged, it can be discharged by switching the connection state of the first pixel switch PS1 to the second connection state in which the second switching element PS1b is closed (turned on).

Figure 4:
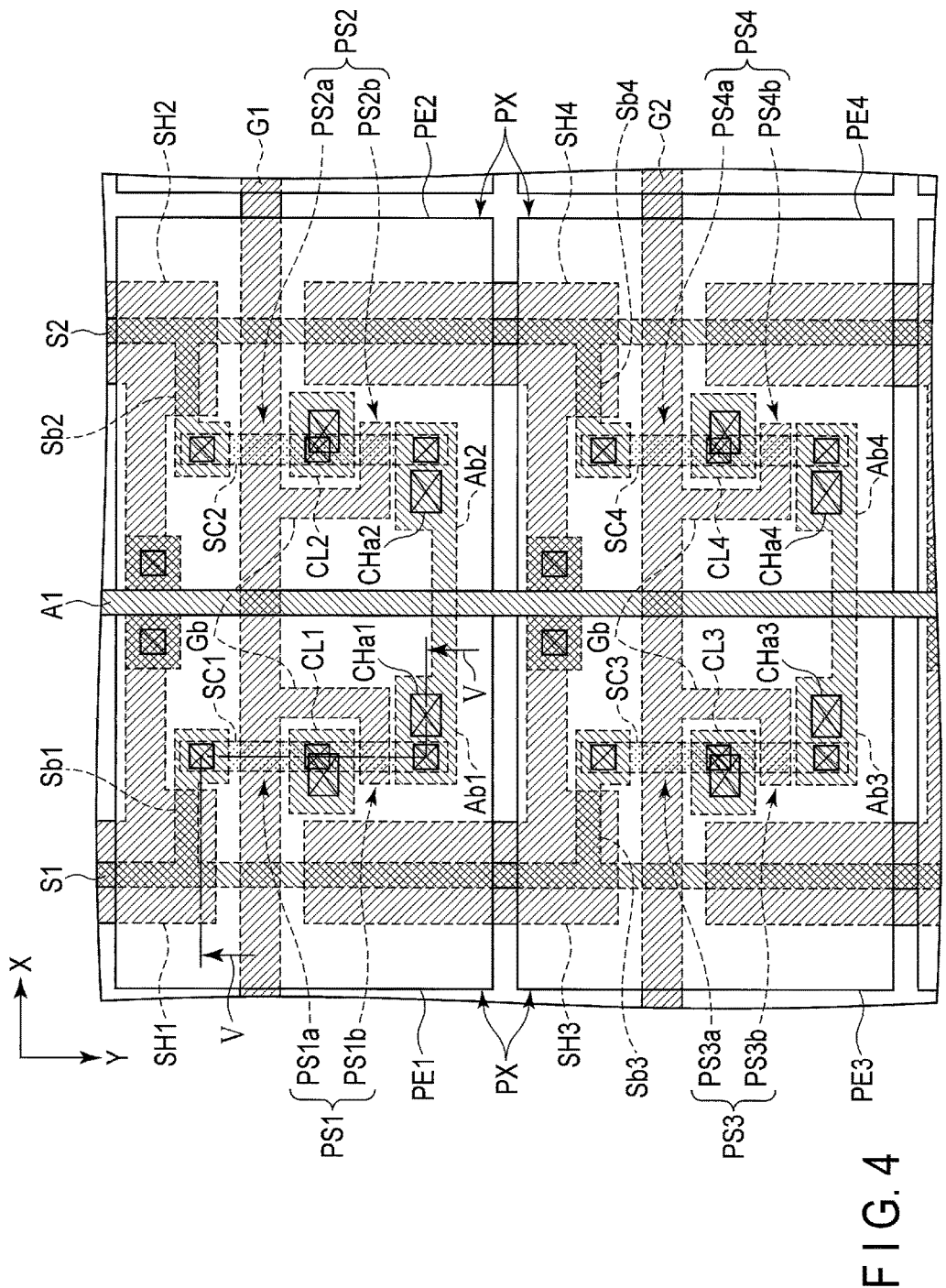
FIG. 4 is an enlarged plan view illustrating part of the first substrate and also illustrating the four pixels and lines as illustrated in FIG. 3.

FIG. 4 is an enlarged plan view illustrating part of the first substrate SUB1 and also illustrating the four pixels PX and the lines as illustrated in FIG. 3. To be more specific, FIG. 4 illustrates the first scanning line G1, the second scanning line G2, a first semiconductor layer SC1, a second semiconductor layer SC2, a third semiconductor layer SC3, a fourth semiconductor layer SC4, the first signal line S1, the second signal line S2, the first auxiliary line A1, a first conductive layer CL1, a second conductive layer CL2, a third conductive layer CL3, a fourth conductive layer CL4, a first shield electrode SH1, a second shield electrode SH2, a third shield electrode SH3, a fourth shield electrode SH4, the first pixel electrode PE1, the second pixel electrode PE2, the third pixel electrode PE3, the fourth pixel electrode PE4, etc. It should be noted that in FIG. 4, the common electrode CE1 is omitted.

As illustrated in FIG. 4, in each of the first scanning line G1 and the second scanning line G2, a plurality of branch portions Gb are provided. These branch portions Gb each project from on of a side edge of the first scanning line G1 and a side edge of the second scanning line G2 in the second direction Y. In the first embodiment, as seen in the view of an X-Y plane in which the first scanning line G1 is located on an upper side and the second scanning line G2 is located on a lower side, the branch portions Gb are each L-shaped or laterally inverted L-shaped.

The first to fourth semiconductor layers SC1 to SC4 extend in the second direction Y. The first and second semiconductor layers SC1 and SC2 each intersect the first scanning line G1 in two positions, and the third and fourth semiconductor layers SC3 and SC4 each intersect the second scanning line G2 in two positions. Each of the semiconductor layers SC includes channel regions in two positions in which each semiconductor layer SC intersects an associated scanning line G. In the first embodiment, each semiconductor layer SC includes channel regions at main part of the associated scanning line G which intersects each semiconductor layer SC and the branch portion Gb of the associated scanning line G that intersects each semiconductor layer SC. It should be noted that the first pixel switch PS1 includes the first semiconductor layer SC1; the second pixel switch PS2 includes the second semiconductor layer SC2; the third pixel switch PS3 includes the third semiconductor layer SC3; and the fourth pixel switch PS4 includes the fourth semiconductor layer SC4.

In each of the first and second signal lines S1 and S2, a plurality of branch portions Sb are provided. These branch portions Sb each project from one of side edges of the first signal line S1 in the first direction X or from one of side edges of the second signal line S2 in the opposite direction to the first direction X. For example, the first signal line S1 includes a branch portion Sb1 which extends toward an end portion of the first semiconductor layer SC1 and which is connected to the end portion thereof, and a branch portion Sb3 which extends toward an end portion of the third semiconductor layer SC3 and which is connected to the end portion thereof. The second signal line S2 includes a branch portion Sb2 which extends toward an end portion of the second semiconductor layer SC2 and which is connected to the end portion thereof, and a branch portion Sb4 which extends toward an end portion of the fourth semiconductor layer SC4 and which is connected to the end portion thereof.

In the first auxiliary line A1, a plurality of branch portions Ab are provided. Of the branch portions Ab of the first auxiliary line A1, a first branch portion Ab1 projects from one of side edges of the first auxiliary line A1 in the opposite direction to the first direction X toward another end portion of the first semiconductor layer SC1, and is connected to the other end portion thereof. The second branch portion Ab2 projects from the other of the side edges of the first auxiliary line A1 in the first direction X toward another end portion of the second semiconductor layer SC2, and is connected to the other end portion thereof. The third branch portion Ab3 projects from the above one of the side edges of the first auxiliary line A1 in the opposite direction to the first direction X toward another end portion of the third semiconductor layer SC3, and is connected to the other end portion thereof. The fourth branch portion Ab4 projects from the above other of the side edges of the first auxiliary line A1 in the first direction X toward another end portion of the fourth semiconductor layer SC4, and is connected to the other end portion thereof.

The first conductive layer CL1 is, between the channel regions of the first semiconductor layer SC1, located opposite to the first semiconductor layer SC1 and connected thereto. The second conductive layer CL2 is, between the channel regions of the second semiconductor layer SC2, located opposite to the second semiconductor layer SC2 and connected thereto. The third conductive layer CL3 is, between the channel regions of the third semiconductor layer SC3, located opposite to the third semiconductor layer SC3 and connected thereto. The fourth conductive layer CL4 is, between the channel regions of the fourth semiconductor layer SC4, located opposite to the fourth semiconductor layer SC4 and connected thereto.

It should be noted that a plurality of portions of the common electrode CE1 are connected to the auxiliary lines A. For example, portions of the common electrode CE1 are connected to the first to fourth branch portions Ab1 to Ab4 of the first auxiliary line A1 through contact holes CHa (contact holes CHa1, CHa2, CHa3 and CHa4), respectively. In such a manner, at the pixels PX, respective portions of the common electrode CE1 may be connected to the auxiliary lines A. This structure can cause the common electrode CE1 to have a uniform potential in the entire area of the common electrode CE1.

The first to fourth shield electrodes SH1 to SH4 extend in the second direction Y, and are connected to the first auxiliary line A1. In the first embodiment, the first to fourth shield electrodes SH1 to SH4 are located opposite to the branch portions Ab of the first auxiliary line A1, and connected to the branch portions Ab. The first shield electrode SH1 is located opposite to part of main portion of the first signal line S1 and also to the branch portion Sb1 of the first signal line S1, which projects toward the first semiconductor layer SC1. The second shield electrode SH2 is located opposite to part of main portion of the second signal line S2 and also to the branch portion Sb2 of the second signal line S2, which projects toward the second semiconductor layer SC2. The third shield electrode SH3 is located opposite to another part of the main portion of the first signal line S1 and also to the branch portion Sb3 of the first signal line S1, which projects toward the third semiconductor layer SC3. The fourth shield electrode SH4 is located opposite to another part of the main portion of the second signal line S2 and also to the branch portion Sb4 of the second signal line S2, which projects toward the fourth semiconductor layer SC4.

The first to fourth pixel electrodes PE1 to PE4 are rectangular, and arranged in a matrix in the first direction X and the second direction Y.

The first pixel electrode PE1 is located opposite to the first scanning line G1, the first semiconductor layer SC1, the first signal line S1, the branch portion Ab1 of the first auxiliary line A1, the first conductive layer CL1, the first shield electrode SH1, the third shield electrode SH3, etc., and is connected to the first conductive layer CL1.

The second pixel electrode PE2 is located opposite to the first scanning lines G1, the second semiconductor layer SC2, the second signal line S2, the branch portion Ab2 of the first auxiliary line A1, the second conductive layer CL2, the second shield electrode SH2, the fourth shield electrode SH4, etc., and are connected to the second conductive layer CL2.

The third pixel electrode PE3 is located opposite to the second scanning lines G2, the third semiconductor layer SC3, the first signal line S1, the branch portion Ab3 of the first auxiliary line A1, the third conductive layer CL3, the third shield electrode SH3, etc, and is connected to the third conductive layer CL3.

The fourth pixel electrode PE4 is located opposite to the second scanning lines G2, the fourth semiconductor layer SC4, the second signal line S2, the branch portion Ab4 of the first auxiliary line A1, the fourth conductive layer CL4, the fourth shield electrode SH4, etc., and is connected to the fourth conductive layer CL4.

As seen in the view of the X-Y plane in which the first scanning line G1 is located on the upper side and the second scanning line G2 is located on the lower side, the first auxiliary line A1 is located between pixels on the left side and pixels on the right side. It should be noted that the first auxiliary line A1 is located between adjacent pixels. The pixels on the left side and the pixels on the right side as described above share the first auxiliary line A1 with each other. Furthermore, the pixels on the left side and the pixels on the right side can be arranged symmetrical with respect to the first auxiliary line A1, thus contributing to achieving a higher-definition display.

FIG. 5 is a schematic cross-sectional view of the first substrate SUB1 which is taken along line V-V in FIG. 4.

As illustrated in FIG. 4, the first scanning line G1 and the first shield electrode SH1 are located above the first insulating substrate 10. In the first embodiment, the first scanning line G1 and the first shield electrode SH1 are located on the first insulating substrate 10; however, their locations are not limited to the above. For example, the first scanning line G1 and the first shield electrode SH1 may be provided on an insulating film provided on the first insulating substrate 10. The first scanning line G1 and the first shield electrode SH1 are located opposite to the first pixel electrode PE1 with respect to the common electrode CE1. Furthermore, the first scanning line G1 and the first shield electrode SH1 are formed of the same conductive material, for example, metal.

A first insulating film 11 is provided on the first insulating substrate 10, the first scanning line G1 and the first shield electrode SH1. The first semiconductor layer SC1 is located on the first insulating film 11. The first semiconductor layer SC1 includes two channel regions which are opposite to the first scanning line G1. The first semiconductor layer SC1 is located opposite to the first pixel electrode PE1 with respect to the common electrode CE1. The first semiconductor layer SC1 is formed of, for example, poly-Si. A second insulating film 12 is provided on the first insulating film 11 and the first semiconductor layer SC1.

The first signal line S1, the first conductive layer CL1 and the first auxiliary line A1 are provided on the second insulating film 12. The first signal line S1, the first conductive layer CL1 and the first auxiliary line A1 are located opposite to the first pixel electrode PE1 with respect to the common electrode CE1. The first signal line S1, the first conductive layer CL1 and the first auxiliary line A1 are formed of the same conductive material, for example, metal.

The first signal line S1 is located above the first shield electrode SH1 and opposite to the first shield electrode SH1. Thus, the first shield electrode SH1 is located opposite to the common electrode CE1 with respect to the first signal line S1. Furthermore, the first signal line S1 is connected to an end portion of the first semiconductor layer SC1 through a contact hole formed in the second insulating film 12.

Above the first signal line S1, the common electrode CE1 is provided, and below the first signal line S1, the first shield electrode SH1 is provided. Provision of the first shield electrode SH1 can further electrically shield the pixel electrode PE. It is therefore possible to reduce, for example, lowering of the sensitivity of the sensor.

A first detection unit DU1 can supply a potential adjustment signal Va to the first shield electrode SH1 through the first auxiliary line A1. Since variation of the difference between the potential of the first shield electrode SH1 and that of the common electrode CE1 can be reduced, lowering of the sensitivity of the sensor can be further reduced.

The first conductive layer CL1 is connected between the channel regions of the first semiconductor layer SC1 through the contact hole formed in the second insulating film 12. The first auxiliary line A1 is connected to the other end portion of the first semiconductor layer SC1 through the contact hole formed in the second insulating film 12.

A third insulating film 13 is provided on the second insulating film 12, the first signal line S1, the first conductive layer CL1 and the first auxiliary line A1. The third insulating film 13 includes a contract hole which is located opposite to the first conductive layer CL1, and opened to the first conductive layer CL1.

It should be noted that as described above, the first insulating substrate 10 is a glass substrate or a resin substrate, not a silicon substrate. The first insulating film 11, the second insulating film 12 and a fourth insulating film 14 to be described later are each formed of an inorganic material, whereas the third insulating film 13 is formed of an organic material. The organic material is a material suitable for formation of a thicker film. For example, acrylic resin can be applied as the organic material. In the case where the third insulating film 13 is formed of the organic material, it can be to have a great thickness, and it is possible to reduce a parasitic capacitance between conductive members (i.e., the common electrode CE1, the first pixel electrode PE1, etc.) located above the third insulating film 13 and conductive members (i.e., the first shield electrode SH1, the first scanning line G1, the first signal line S1, etc.) located below the third insulating film 13, as compared with the third insulating film 13 is formed of an inorganic material.

The common electrode CE1 is provided on the third insulating film 13. The common electrode CE1 is connected to the first auxiliary line A1 through a contact hole CHa1 formed in the third insulating film 13. The common electrode CE1 is located opposite to the first pixel switch PS1, and includes a first opening OP1 which surrounds the contact hole formed in the third insulating film 13. The common electrode CE1 includes a plurality of openings in addition to the first opening OP1. For example, the common electrode CE1 includes a second opening opposite to the second pixel switch PS2, a third opening opposite to the third pixel switch PS3, a fourth opening opposite to the fourth pixel switch PS4, etc.

The common electrode CE1 is formed of a transparent conductive material such as indium tin oxide (ITO), indium zinc oxide (IZO) or zinc oxide (ZnO). However, the material of the common electrode CE1 is not limited to the transparent conductive material. The common electrode CE1 may be formed of metal instead of the transparent conductive material.

The fourth insulating film 14 is provided on the first conductive layer CL1, the third insulating film 13 and the common electrode CE1. The fourth insulating film 14 includes a contract hole which is located opposite to the first conductive layer CL1, and opened to the first conductive layer CL1.

The first pixel electrode PE1 is located on the fourth insulating film 14 and opposite to the first opening OP1. The first pixel electrode PE1 is connected to the first conductive layer CL1 through the first opening OP1 and a contact hole formed in the fourth insulating film 14. The first pixel electrode PE1 may be formed of a transparent conductive material such as ITO, IZO or ZnO, as well as the common electrode CE1, or may be formed of metal.

Although it is not illustrated, an alignment film is provided on the fourth insulating film 14 and the pixel electrodes PE.

The liquid crystal display panel PNL has a structure adapted for an in-plane-switching (IPS) mode such as an FFS mode, which primarily uses a lateral electric field substantially parallel to main surfaces of the substrates. It should be noted that each of the main surfaces of the substrates is a surface parallel to an X-Y plane defined in the first direction X and the second direction Y. In the first embodiment, the pixel electrodes PE and the common electrode CE1 are provided in the first substrate SUB1. In order to produce the lateral electric field, for example, the pixel electrodes PE include slits SL in positions which are opposite to the common electrode CE1. It should be noted that in the case where as in a sixth embodiment to be described later, in the case where the detection electrodes DE are provided in the display area DA, and do not function as pixel electrodes PE, they need not to include slits SL.

Furthermore, as in a fourth embodiment to be described later, in an area located outward of the display area DA, detection electrodes DE provided in the same layer as pixel electrodes PE may be provided. The detection electrodes DE provided in the area located outward of the display area DA may form a proximity sensor. In the example illustrated in FIG. 5, the first pixel electrode PE1 is connected to the first pixel switch PS1 including the first switching element PS1a and the second switching element PS1b. It is therefore possible to form the liquid crystal display panel PNL by applying a generally known TFT liquid crystal process as it is.

Figure 6:
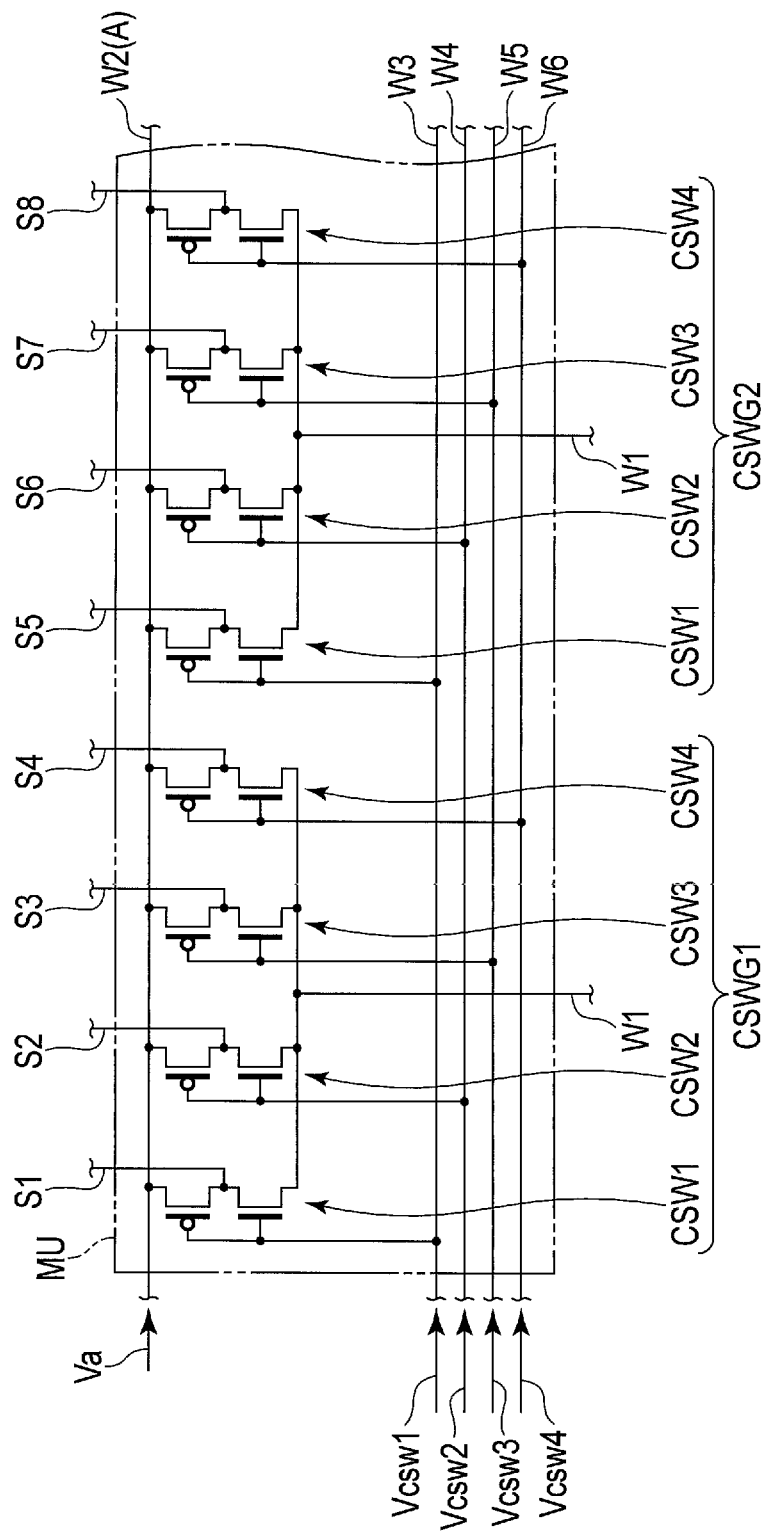
FIG. 6 is an enlarged plan view illustrating part of an area located outward of a display area DA of the first substrate, and also a circuit diagram illustrating a demultiplexer.

FIG. 6 is an enlarged plan view illustrating part of the area located outward of the display area DA of the first substrate SUB1, and also a circuit diagram illustrating the demultiplexer MU.

As illustrated in FIG. 6, the demultiplexer MU includes a plurality of control switch groups CSWG. As the control switch groups CSWG, a first control switch group CSWG1, a second control switch group CSWG2, etc., are provided. The control switch groups CSWG each comprise a plurality of control switches CSW. In the first embodiment, the demultiplexer MU is a demultiplexer having a single input and four outputs, and each of the control switch groups CSWG comprises four control switches, i.e., a first switch CSW1, a second control switch CSW2, a third control switch CSW3 and a fourth control switch CSW4.

The demultiplexer MU is connected to the signal lines S. Also, the demultiplexer MU is connected to the control module CM by a plurality of connection lines W1, a single connection line W2 and four control lines W3, W4, W5 and W6. It should be noted that the number of the connection lines W1 is one fourth that of the signal lines S.

Each of the control switches CSW includes two switching elements connected in series to each other. The two switching elements are formed of, for example, thin-film transistors of different conductive types. In the first embodiment, each of the control switches CSW comprises a P-channel thin-film transistor and an N-channel thin-film transistor which are connected in series to each other.

A first electrode of each of the thin-film transistors of the first control switch CSW1 is connected to a control line W3; a first electrode of each of the thin-film transistors of the second control switch CSW2 is connected to a control line W4; a first electrode of each of the thin-film transistors of the third control switch CSW3 is connected to a control line W5; and a first electrode of each of the thin-film transistors of the fourth control switch CSW4 is connected to a control line W6.

A second electrode of the P-channel thin-film transistor of each of the control switches CSW is connected to the connection line W2.

Second electrodes of the N-channel thin-film transistors of the control switches CSW of the first control switch group CSWG1 are connected to the same connection line W1, and second electrodes of the N-channel thin-film transistors of the control switches CSW of the second control switch group CSWG2 are connected to the same connection line W1.

Third electrodes of the thin-film transistors of the first control switch CSW1 in the first control switch group CSWG1 are connected to the first signal line S1. Third electrodes of the thin-film transistors of the second control switch CSW2 in the first control switch group CSWG1 are connected to the second signal line S2. Third electrodes of the thin-film transistors of the third control switch CSW3 in the first control switch group CSWG1 are connected to a third signal line S3. Third electrodes of the thin-film transistors of the fourth control switch CSW4 in the first control switch group CSWG1 are connected to a fourth signal line S4.

Similarly, in the second control switch group CSWG2, third electrodes of the thin-film transistors of the first control switch CSW1 are connected to a fifth signal line S5; third electrodes of the thin-film transistors of the second control switch CSW2 are connected to a sixth signal line S6; third electrodes of the thin-film transistors of the third control switch CSW3 are connected to a seventh signal line S7; and third electrodes of the thin-film transistors of the fourth control switch CSW4 are connected to an eighth signal line S8.

In each of thin-film transistors in the demultiplexer MU, the first electrode functions as a gate electrode, one of the second and third electrodes functions as a source electrode, and the other of the second and third electrodes functions as a drain electrode.

The control lines W3, W4, W5 and W6 are given control signals Vcsw1, Vcsw2, Vcsw3 and Vcsw4 from the first detection unit DU1. In response to the control signal Vcsw1, the state of the first control switch CSW1 is switched to one of a first switch state and a second switch state. In response to the control signal Vcsw2, The state of the second control switch CSW2 is switched to one of the first switch state and the second switch state. In response to the control signal Vcsw3, the state of the third control switch CSW3 is switched to one of the first switch state and the second switch state. In response to the control signal Vcsw4, The state of the fourth control switch CSW4 is switched to one of the first switch state and the second switch state.

With respect to the above first and second switch states of each of the above control switches CSW, it should be noted that when a control switch CSW is in the first switch state, it electrically connects an associated connection line W1 and an associated signal line S to each other, and when it is in the second switch state, it electrically connects an associated connection line W2 and the associated signal line S to each other. Therefore, when the state of the control switch CSW is switched to the first switch state, an image signal Vsig or a detection signal Vw can be sent to the signal line S. In the first switch state, an associated pixel electrode PE can be charged. Also, when the state of the control switch CSW is switched to the second switch state, a potential adjustment signal Va can be supplied to the signal line S. In the second switch state, the pixel electrode PE can be discharged.

The timings at which the states of the control switches CSW in the demultiplexer MU are each switched to either the first switch state or the second switch state are controlled with the control signals Vcsw1, Vcsw2, Vcsw3 and Vcsw4, and the timings at which the states of the pixel switches PS are each switched to either the first connection state or the second connection state are controlled with drive signals CS, whereby charging of the pixel electrodes PE and discharging of the pixel electrodes PE can be performed in a time-sharing manner.

Furthermore, by using such a demultiplexer MU as described above, it is possible to supply the first signal line S1 and the fifth signal line S5 with a detection signal Vw in the same period, and supply the second to fourth signal lines S2 to S4 and the sixth to eighth signal lines S6 to S8 with potential adjustment signals Va. It is possible to reduce variation of the difference in potential between all the signal lines S and the common electrode CE1, and thus further reduce lowering of the sensitivity of the sensor.

It should be noted that in the sensor SE, any of various kinds of conventional well-known demultiplexers (distribution circuits) can be used as a second circuit in place of the above demultiplexer MU. For example, in the sensor SE, a demultiplexer having a single input and three outputs can be used in place of the demultiplexer MU.

FIG. 7 is an equivalent circuit schematic illustrating a relationship in electrical connection between elements in the liquid crystal display device DSP.

As illustrated in FIG. 7, the control module CM comprises a main controller MC and the first detection unit DU1. The main controller MC is a central processor.

The main controller MC supplies a control signal Vc to an analog front end AFE to control driving of the analog front end AFE. Furthermore, the main controller MC receives a data signal Vd from the analog front end AFE. As the data signal Vd, a signal based on the amount of charge accumulated in a capacitor CON of an integrator IN to be described later can be supplied. In this case, the data signal Vd is a digital signal into which an analog signal is converted. Furthermore, the main controller MC supplies a synchronization signal Vs to the analog front end AFE, a circuit-control signal source CC and a power controller PC, and synchronizes driving of the analog front end AFE, of the circuit-control signal source CC and of the power controller PC with each other. As the synchronization signal Vs, a vertical synchronization signal TSVD or a horizontal synchronization signal TSHD can be applied.

The analog front end AFE sends a potential adjustment signal Va, a detection signal Vw and an image signal Vsig to the demultiplexer MU. For example, A/D conversion for producing the data signal Vd is performed by the analog front end AFE. Also, the analog front end AFE supplies the circuit-control signal source CC and the power controller PC with a pulse signal (detection pulse signal) to be superimposed. The pulse signal synchronizes with the potential adjustment signal Va, and is the same as the potential adjustment signal Va in phase and amplitude.

The circuit-control signal source CC supplies the demultiplexer MU with a control signal Vcsw (Vcsw1, Vcsw2, Vcsw3, Vcsw4), and also supplies the scanning-line drive circuit GD with a reset signal STB, a start pulse signal STV and a clock signal CKV.

The power controller PC applies a power supply voltage Vdd and a power supply voltage Vss which is lower than the power supply voltage Vdd to the scanning-line drive circuit GD.

The scanning-line drive circuit GD includes a plurality of shift registers SR and a plurality of control switches COS which are connected to the shift registers SR, respectively. Furthermore, in the scanning-line drive circuit GD, a high-potential power supply line Wd and a low-potential power supply line Ws extend. To the high-potential power supply line Wd and the low-potential power supply line Ws, the power supply voltage Vdd and the power supply voltage Vss are applied, respectively. The control switches COS are successively controlled by the shift registers SR, respectively. In this case, in the case where a control switch COS is controlled by an associated shift register SR, the state of the control switch COS is switched to either a state in which the control switch COS electrically connects the high-potential power supply line Wd and an associated scanning line G or a state in which the control switch COS electrically connects the low-potential power supply line Ws and the associated scanning line G. In the first embodiment, the drive signal CS is the power supply voltage Vdd or the power supply voltage Vss.

Figure 8:
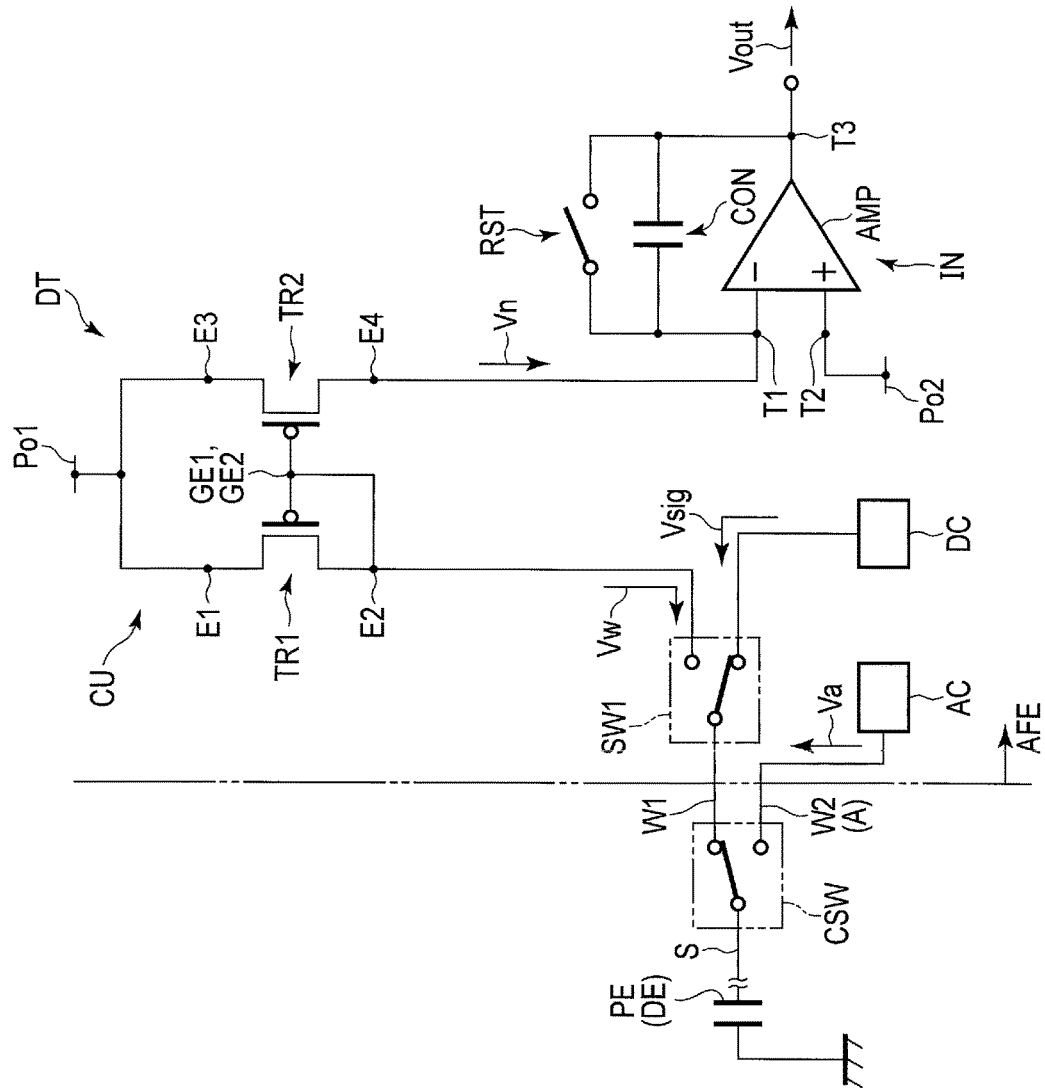
FIG. 8 is an equivalent circuit schematic illustrating part of the liquid crystal display device, and also a view illustrating a detector, a pixel electrode, etc.

FIG. 8 is an equivalent circuit schematic illustrating part of the liquid crystal display device DSP, and also a view illustrating a detector DT, a pixel electrode PE, etc.

As illustrated in FIG. 8, the liquid crystal display device DSP comprises a plurality of detectors DT, a plurality of switches SW1, a display drive circuit DC and an auxiliary circuit AC in addition to the pixel electrodes PE, the signal lines S, the control switches CSW, the connection lines W1 and W2, etc. The pixel electrodes PE are also used as the detection electrodes DE. In the first embodiment, the plurality of detectors DT, the plurality of switches SW1, the display drive circuit DC and the auxiliary circuit AC are provided in the analog front end AFE. In such a manner, the plurality of detectors DT are provided in the analog front end AFE, and the number of the detectors DT is the same as, for example, that of the connection lines W1. In this case, the detectors DT are connected to the connection lines W1, respectively. The detectors DT each comprise a current mirror circuit CU, an integrator IN and a reset switch RST.

The current mirror circuit CU includes a first transistor TR1 and a second transistor TR2. The first transistor TR1 and the second transistor TR2 are field-effect transistors. In the first embodiment, the first transistor TR1 and the second transistor TR2 are P-channel transistors. Thus, a first power supply Po1 to be described later is a high-potential power supply fixed to a high potential, for example, +3V, and a second power supply Pot is a low-potential power supply fixed to a low potential, for example, −3V.

The first transistor TR1 includes a first gate electrode GE1, a first electrode E1 connected to the first power Supply Po1 and a second electrode E2 connected to an associated pixel electrode PE and the first gate electrode GE1. The second transistor TR2 includes a second gate electrode GE2 connected to the first gate electrode GE1, a third electrode E3 connected to the first power supply Po1 and a fourth electrode E4.

The first transistor TR1 and the second transistor TR2 may have the same structure, i.e., the same electrical characteristic, or they may have different structures, i.e., different electrical characteristics. In the first embodiment, the first transistor TR1 and the second transistor TR2 have the same structure. For example, they have the same channel width. Thereby, the amount of current flowing from the first electrode E1 of the first transistor TR1 to the second electrode E2 thereof and that of current flowing from the third electrode E3 of the second transistor TR2 to the fourth electrode E4 thereof can be equalized to each other. A detection signal Vw output from the current mirror circuit CU to an associated switch SW1, and a write signal Vn output from the current mirror circuit CU to the above integrator IN are signals having the same characteristic. It should be noted that unlike the first embodiment, the amount of current flowing from the first electrode E1 of the first transistor TR1 to the second electrode E2 thereof and that of current flowing from the third electrode E3 of the second transistor TR2 to the fourth electrode E4 thereof may be different from each other. If a mirror ratio is changed, the amount of current is changed in accordance with the changed mirror ratio.

The integrator IN includes an operational amplifier AMP and a capacitor CON. The operational amplifier AMP includes an inverting input terminal T1 connected to the fourth electrode E4, a noninverting input terminal T2 connected to the second power supply Po2 and an output terminal T3. The capacitor CON is connected between the output terminal T3 and the inverting input terminal T1 of the operational amplifier AMP. The reset switch RST is connected in parallel with the capacitor CON. It is possible to zero the charge in the capacitor CON by turning on the reset switch RST. In other words, charge can be also, accumulated in the capacitor CON until the reset switch RST is turned on. The integrator IN applies as an output signal Vout, a voltage proportional to the amount of charge accumulated in the capacitor CON.

The state of the switch SW1 is switched to either a state in which the switch SW1 electrically connects an associated connection line W1 and the second electrode E2 of the above detector DT or a state in which the switch SW1 electrically connects the connection line W1 and the display drive circuit DC. In the display drive period, the switch SW1 electrically connects the connection line W1 and the display drive circuit DC to allow an image signal Vsig to be sent to the connection line W1. In the sensing drive period, the switch SW1 can electrically connects the connection line W1 and the second electrode E2 to allow a detection signal Vw to be sent to the connection line W1. The switch SW1 is used to selectively send the image signal Vsig and the detection signal Vw to the connection line W1.

The state of the control switch CSW, as described above, is switched to either the first switch state in which the control switch CSW electrically connects an associated signal line S and the connection line W1 or the second switch state in which the control switch CSW electrically connects the signal line S and the connection line W2. In the display drive period or the sensing drive period, the control switch CSW is switched to be in the first switch state to allow the image signal Vsig or the detection signal Vw to be sent to the signal line S. Furthermore, in the sensing drive period, the control switch CSW is switched to be also in the second switch state to allow the potential adjustment signal Va to be sent the signal line S. The control switch CSW is used to selectively send the image signal Vsig, the detection signal Vw and the potential adjustment signal Va to the signal line S.

Next, sensing of a first mode will be explained. In some cases, the first mode is referred to as a self-capacitive sensing mode. In the first mode, the control module CM can control the sensor SE to perform sensing. To be more specific, the sensing is performed in the first detection unit DU1 of the control module CM. In the first embodiment, by the above sensing, it is possible to detect, for example, proximity or contact of an external object to or with the display panel, and also detect a minute concavo-convex pattern. For example, the above minute concavo-convex pattern is a fingerprint (a concavo-convex pattern of the surface of a finger). In the following, it is assumed that the sensing area SA is set to a target area to be applied the sensing drive, and a person's finger is in contact with the sensing area SA of the screen of the liquid crystal display device DSP and is also in proximity to the pixel electrode PE (detection electrode DE).

In the first mode, when the state of the control switch CSW is switched to the first switch state, and the state of the switch SW1 is switched to the state in which the switch SW1 electrically connects the connection line W1 and the second electrode E2, capacitors CON and pixel electrodes PE to be subjected to sensing can be charged. In this charging, the amount of current corresponding to signals (detection signal Vw and write signal Vn) in the case where convex portions of the fingerprint are located opposite to the pixel electrodes PE to be subjected to the sensing is different from that of current corresponding to the above signals in the case where concave portions of the fingerprint are located opposite to the above pixel electrodes PE.

Thus, by reading an output signal Vout after charging the capacitors CON, the fingerprint can be detected based on the output signal Vout, or it can be detected based on a signal (for example, the above data signal Vd) produced using the output signal Vout.

In the first embodiment, with the above pixel electrodes PE (to be subjected to the sensing) fixed, charging of the pixel electrodes PE and the capacitors CON and discharging the pixel electrodes PE which is carried out by switching the state of the control switch CSW to the second switch state are repeated, whereby charge the amount of which corresponds to that of charging performed a plurality of times can be accumulated in the capacitors CON. That is, the charging and discharging are repeated, with the reset switch RST being in off state, whereby write signals Vn can be added up. The level of the output signal Vout based on the result of adding write signals Vn a number of times is higher than that of the output signal Vout based on a single write signal Vn. For example, it is possible to increase the difference between the value of the output signal Vout in the case where the convex portions of the fingerprint are located opposite to the pixel electrodes PE to be subjected to the sensing and the value of the output signal Vout in the case where the concave portions of the fingerprint are located opposite to the pixel electrodes PE to be subjected to the sensing. Thereby, it is possible to perform sensing in a further detail on an object to be detected, such as the fingerprint.

Furthermore, since the common electrode CE1 is provided between the pixel electrodes PE and conductive members such as the scanning lines G and the signal lines S, the common electrode CE1 can electrically shield the pixel electrodes PE, thus reducing lowering of the sensitivity of the sensor.

Furthermore, in the first mode and the sensing drive period, the auxiliary lines A are supplied with the potential adjustment signals Va. The common electrode CE1 can be supplied with the potential adjustment signal Va through, for example, the auxiliary lines A. It is preferable that the potential adjustment signal Va synchronize with the detection signal Vw, the phase of the potential adjustment signal Va be same as that of the detection signal Vw, and the amplitude of the potential adjustment signal Va be the same as or substantially the same as that of the detection signal Vw.

Therefore, the potentials of the detection signal Vw and the potential adjustment signal Va are each changed to either a high potential or a low potential at the same timing. It should be noted that the high potential or low potential of the potential adjustment signal Va is not limited to a specific one. For example, where Vp[V] is the amplitude of the detection signal Vw (the difference between the high potential and low potential of the write signal Vw), the low potential of the potential adjustment signal Va can be set to 0[V], and the high potential of the potential adjustment signal Va can be set to +Vp[V]. Furthermore, giving of the potential adjustment signal Va to the common electrode CE1 can be restated as giving of variation of the potential of the detection signal Vw to the common electrode CE1. The potential adjustment signal Va may be a predetermined static voltage or a signal which synchronizes with the variation of the potential of the detection electrode DE. In the case where the potential adjustment signal Va is the signal which synchronizes with the variation of the potential of the detection electrodes DE, it is possible to reduce the influence of a parasitic capacitance between the detection electrode DE and the common electrode CE2.

For example, the timing at which the potential of the pixel electrode PE is raised by 3V by the detection signal Vw can be made to be same as that at which the potential of the common electrode CE1 is raised by 3V by the potential adjustment signal Va, and the timing at which the potential of the pixel electrode PE is lowered by 3V by the detection signal Vw can be made to be same as that at which the potential of the common electrode CE1 is lowered by 3V by the potential adjustment signal Va.

It is possible to reduce the variation of the difference in potential between the common electrode CE1 and the pixel electrode PE supplied with the detection signal Vw. Also, it is possible to reduce the variation of the difference in potential between the common electrode CE1 and the signal line S supplied with the detection signal Vw. It is therefore possible to further reduce lowering of the sensitivity of the sensor.

Referring to the circuit diagram of FIG. 3 by way of example, in a period in which the state of the first pixel switch PS1, etc., connected to the first scanning line G1, is switched to the first connection state, when the states of the third and fourth pixel switches PS3 and PS4, etc., connected to the second scanning line G2, are switched to the second connection state, the third pixel electrode PE3, the fourth pixel electrode PE4, etc., can be supplied with the potential adjustment signal Va. It is possible to reduce variation of the difference in potential between the common electrode CE1 and the pixel electrode PE supplied with the potential adjustment signal Va. The value of a parasitic capacitance which can be coupled to the pixel electrode PE can be reduced, and lowering of the sensitivity of the sensor can be further reduced.

Furthermore, in the sensing in the first mode, the first detection unit DU1 can adjust a signal and a power supply voltage which are applied to the first substrate SUB1.

For example, the first detection unit DU1 applies the power supply voltage to the scanning-line drive circuit GD; however, in a sensing drive time, it may superimpose superimposition signals on the power supply voltage and the drive signal CS, respectively. Furthermore, the first detection unit DU1 supplies a control signal to the demultiplexer MU; however, in the sensing drive time, it may superimpose a superimposition signal on the control signal. The superimposition signal synchronizes with the potential adjustment signal Va, and is the same as the potential adjustment signal Va in phase and amplitude.

Thus, the timing at which the potential of the potential adjustment signal Va is changed to a high potential or a low potential is the same as that at which the potential of the superimposition signal is changed to a high potential or a low potential. It should be noted that superimposition of the superimposition signal can be restated as superimposition of variation of the potential of the potential adjustment signal Va.

For example, the timing at which the potential of the common electrode CE1 is raised by 3V by the potential adjustment signal Va can be made to be same as that at which the potential of the scanning line G is raised by 3V by the drive signal CS, and the timing at which the potential of the common electrode CE1 is lowered by 3V by the potential adjustment signal Va can be made to be same as that at which the potential of the scanning line G is lowered by 3V by the drive signal CS.

In the sensing period, when the detection electrode DE is driven, the scanning line G, the common electrode CE2, etc. are varied in the same phase and the same amplitude as a drive pulse for the detection electrode DE, thereby to reduce the influence of the parasitic capacitances among the detection electrode DE, the scanning line G, the common electrode CE2, etc., and also reduce lowering of the sensitivity of the sensor. It should be noted that the power supply of the scanning-line drive circuit GD and GND may also be driven in the same phase and amplitude in order to drive the scanning lines G.

Next, an example of the driving method of the sensor SE will be explained.

Figure 9:
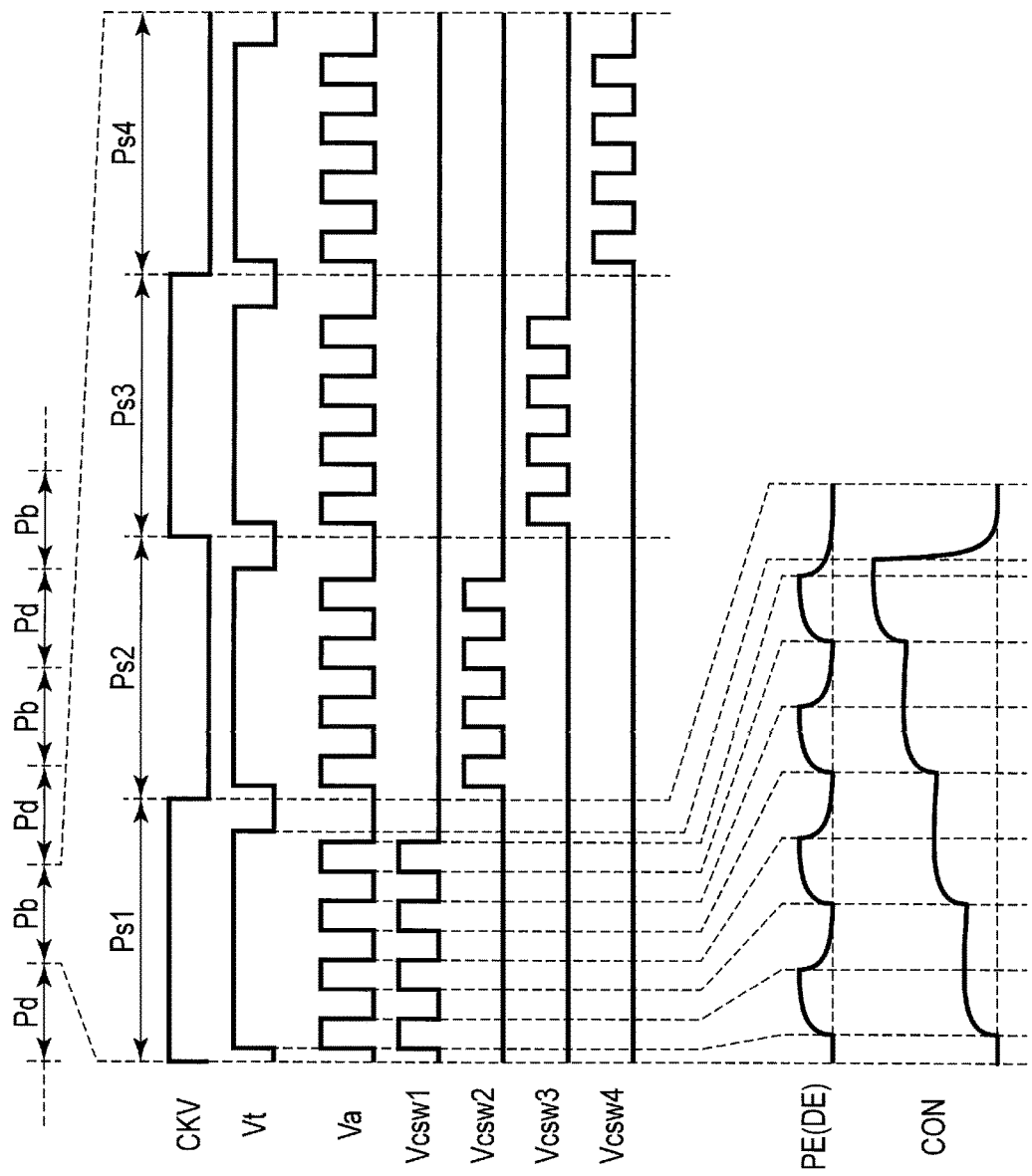
FIG. 9 is a timing chart for explaining a method for driving a sensor, and also a view showing a clock signal, a timing signal, a potential adjustment signal, control signals, the variation of the potential of the pixel electrode and the variation of the capacitance of a capacitor in an arbitrary sensing period.

FIG. 9 is a timing chart for explaining the driving method of the sensor SE according to the first embodiment, and also a view showing a clock signal CKV, a timing signal Vt, the potential adjustment signal Va, the control signals Vcsw1, Vcsw2, Vcsw3 and Vcsw4, the variation of the potential of the pixel electrode PE and the variation of the capacitance of the capacitor CON in an arbitrary sensing period.

As indicated in FIG. 9, in the liquid crystal display device DSP, a display drive period Pd in which a display drive is performed and a blanking period Pb in which the display drive is stopped are alternately repeated. Each of blanking periods Pb corresponds to four successive sensing drive periods Ps1, Ps2, Ps3 and Ps4. The blanking periods Pb (sensing drive periods Ps) are independent of the display drive periods. The length of each of the sensing drive period Ps and the timing of transition from one sensing drive period Ps to another sensing drive period Ps are determined based on the clock signal CKV.

Furthermore, in each of the sensing drive periods Ps, pixel electrodes PE to be subjected to sensing are fixed, and periods in which charging and discharging are actually performed on the same pixel electrode PE are determined by the timing signal Vt. In the example illustrated in FIG. 9, at the timing at which the timing signal Vt changes to high level, charging of a pixel electrode PE and a capacitor CON is started, and while the timing signal Vt is at high level, charging and discharging of the pixel electrode PE are repeated. Then, at the timing at which the timing signal Vt changes to low level, an output signal Vout is extracted, and the capacitor CON is electrically reset.

For example, in sensing drive period Ps1, control signals Vcsw1, Vcsw2, Vcsw3 and Vcsw4 are supplied from the first detection unit DU1 to the demultiplexer MU. Thereby, the second control switch CSW2, the third control switch CSW3 and the fourth control switch CSW4 are kept in the second switch state (in which the connection line W2 and the signal line S are electrically connected to each other), and the state of the first control switch CSW1 is switched alternately to the first switch state (in which the connection line W1 and the signal line S are electrically connected to each other) and the second switch state. As a result, in sensing drive period Ps1, signal lines S connected to the second to fourth control switches CSW2 to CSW4 are supplied with potential adjustment signals Va only, and the signal line S connected to the first control switch CSW1 is supplied alternately with a detection signal Vw and a potential adjustment signal Va.

In the first embodiment, in sensing drive period Ps1, the signal line S connected to the first control switch CSW1 is supplied with the detection signal Vw four times. Thus, an associated pixel electrode PE and an associated capacitor CON are each charged four times.

As illustrated in FIG. 10, in charging, current flows from the first power supply Po1 toward the pixel electrode PE through the first transistor TR1, the switch SW1, the control switch CSW, etc., and on another side, current flows from the first power supply Po1 toward the capacitor CON through the second transistor TR2, the operational amplifier AMP, etc. The amount of current flowing into the pixel electrodes PE is the same as that of current flowing into the capacitor CON.

As shown in FIG. 9, each time the associated pixel electrode PE is charged, the potential thereof is raised. However, after charging, the pixel electrode PE is connected to the connection line W2, and the potential adjustment signal Va changes to low level. Thus, the pixel electrode PE is discharged, and the potential of the pixel electrodes PE is reset.

Figure 11:
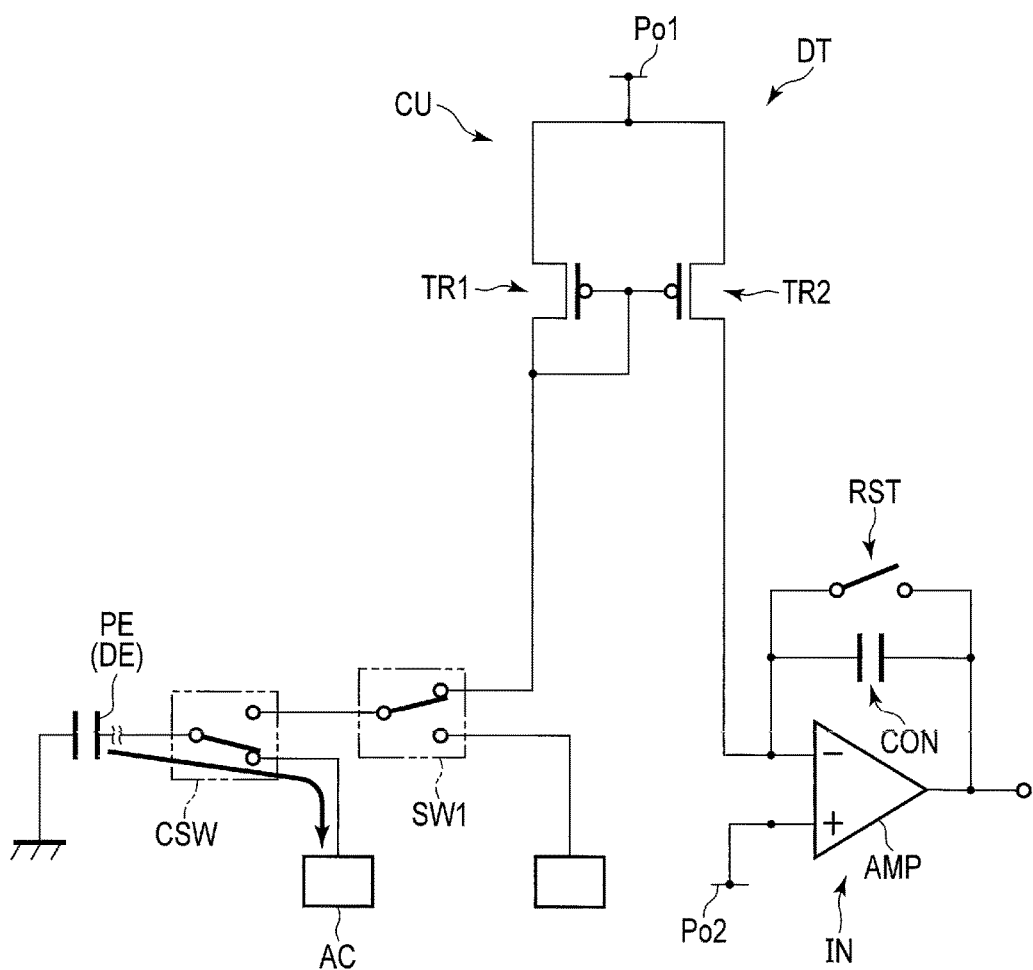
FIG. 11 is a view for explaining the driving method of the sensor as an equivalent circuit schematic associated with FIG. 8, and also illustrates how charge is discharged from the pixel electrode, and the pixel electrode is discharged.

As illustrated in FIG. 11, in discharging, current flows from the pixel electrode PE toward an auxiliary circuit AC through the control switch CSW, etc.

As illustrated in FIG. 9, each time the capacitor CON is charged, the amount of charge therein is raised. However, in the first embodiment, unlike the pixel electrode PE, the capacitor CON is not discharged after charged. It is therefore possible to accumulate in the capacitor CON, charge corresponding to charging performed a number of times. It should be noted that in a sensing drive period Ps1, when the reset switch RST is in off state, leak current can generate in the reset switch RST. Thus, as indicated by a waveform indicating the change of the amount of charge in the capacitor CON as illustrated in FIG. 9, in a period in which the capacitor CON is not charged (in a period in which the pixel electrode PE is discharged), the amount of charge in the capacitor CON can decrease. Furthermore, if leak current generates, a loss caused by the leak current may be reflected in the result of detection to improve the accuracy of the detection.

Thereby, in the sensing drive period Ps1, the level of the output signal Vout can be arisen, and the sensing can thus be performed in detail on the pixel electrodes PE to be subjected to the sensing.

Also, thereafter, in blanking periods Pb, the sensing drive is performed on the entire sensing area SA. Thereby, for example, the first detection unit DU1 (the control module CM) can detect as information, a fingerprint of a finger when the finger is contact with or proximity to the sensing area SA of the screen.

For example, as shown in FIG. 11, a predetermined voltage is applied to the capacitor of the pixel electrode PE (DE) by the auxiliary power source AC. After that, by connecting the switches as shown in FIG. 10, charge corresponding to charge that is charged in the capacitor of the pixel electrode PE (DE) is charged to the capacitor CON by the current mirror circuit.

If a size ratio between the first transistor TR1 and the second transistor TR2 is 1:1, charge equivalent to that accumulated in the pixel electrode PE is accumulated in the capacitor CON. If the ratio between the first transistor TR1 and the second transistor TR2 is 1:N, charge, which is N times the charge accumulated in a capacitance of the pixel electrode PE, is accumulated in the capacitor CON.

When the size ratio between the first transistor TR1 and the second transistor TR2 is 1:1, and a finger or the like is in proximity to the pixel electrode PE, a value of the capacitance is increased since a capacitance of the finger is added to the capacitance of the pixel electrode PE (DE). That is, charge accumulated in the capacitance of the pixel electrode PE and the capacitance of the finger is accumulated in the capacitor CON. Here, since a fingerprint has concavity and convexity, a capacitance produced by the finger added to the pixel electrode PE close to a convex portion of the fingerprint is greater than a capacitance produced by the finger added to the pixel electrode PE close to a concave portion of the fingerprint. In other words, the charge accumulated in the capacitor CON at the time of detection by the pixel electrode PE close to the convex portion of the fingerprint is greater than the charge accumulated in the capacitor CON at the time of detection by the pixel electrode PE close to the concave portion of the fingerprint. Thereby, the concavity and convexity of the fingerprint can be detected.

Figure 12:
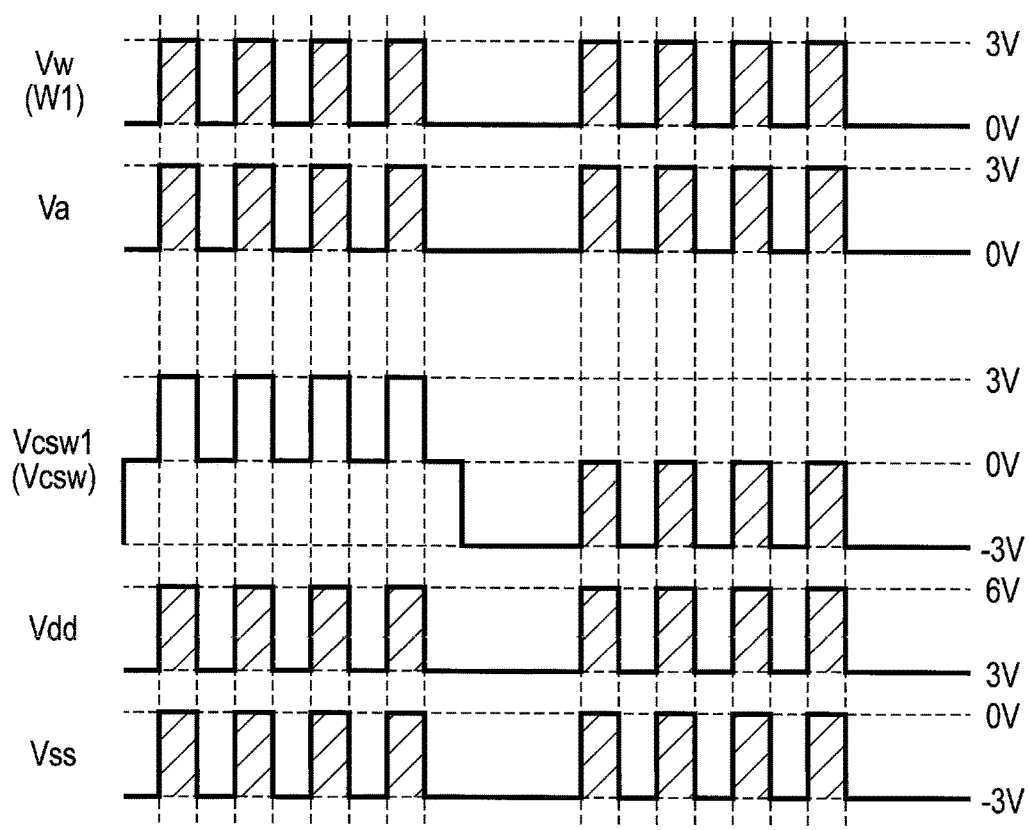
FIG. 12 is a timing chart for explaining various signals to be applied to driving of the sensor, and also illustrating a detection signal, a potential adjustment signal, a control signal and power supply voltages.

Next, various kinds of signals which are supplied by the first detection unit DU1 to the first substrate SUB1 will be explained. As described above, in the first embodiment, the above signals have respective characteristics. FIG. 12 is a timing chart for explaining various signals and voltages to be applied to driving of the sensor SE, and also a view illustrating the detection signal Vw, the potential adjustment signal Va, the control signal Vcsw1 (Vcsw), the power supply voltage Vdd and the power supply voltage Vss. It should be noted that the signals and voltages as illustrated in FIG. 12 are as examples.

As illustrated in FIG. 12, the detection signal Vw is a pulse signal; when the detection signal Vw is at high level, its potential is 3V, and when it is at low level, its potential is 0V; and the amplitude of the detection signal Vw is 3V. The following explanation is given by referring to by way of example the detection signal Vw supplied to the connection line W1 as illustrated in FIG. 6.

As the potential adjustment signal Va, a signal which synchronizes with the detection signal Vw and has the same phase and the same amplitude as the detection signal Vw is more proper than a constant voltage fixed to, for example, 0V. It suffices that the amplitude of the potential adjustment signal Va is 3V. In the example shown in FIG. 12, when the potential adjustment signal Va is at high level, its potential is 3V, and when it is at low level, its potential is 0V. Although the potential adjustment signal Va is substantially the same as the detection signal Vw, it is not limited to this; that is, it can be variously modified. In another example, it may be set that when the potential adjustment signal Va is at high level, its potential is 6V, and when it is at low level, its potential is 3V.

The timings at which the detection signal Vw changes to high level and to low level are the same as the timings at which the potential adjustment signal Va changes to high level and to low level. In the same time period, the area of each of hatched portions regarding the detection signal Vw is the same as that of each of hatched portions regarding the potential adjustment signal Va. Even if time elapses, the difference between the potential of the detection signal Vw and that of the potential adjustment signal Va is constant. In the first embodiment, the difference is 0V.

It is therefore possible to reduce variation of the difference in potential between the common electrode CE1 and the signal line S, which is supplied with the detection signal Vw or the potential adjustment signal Va, and also variation of the difference in potential between the common electrode CE1 and the pixel electrode PE, which is supplied with the detection signal Vw or the potential adjustment signal Va.

The potential of each of the control signals Vcsw can change to high and low levels. To be more specific, the potential of each control signal Vcsw changes to high level at which each control signal Vcsw causes the state of an associated pixel switch PS to be switched to the first switch state (in which the associated pixel switch PS causes the connection line W1 and the signal line S to be electrically connected to each other) or low level at which it causes the state of the associated pixel switch PS to be switched to the second switch state (in which the associated pixel switch PS causes the connection line W2 and the signal line S to be electrically connected to each other). In the first embodiment, when a control signal Vcsw is at high level, its potential is 3V, and when it is at low level, its potential is −3V.

However, as the control signal Vcsw, a superimposition signal superimposed on the above pulse signal is more proper than the pulse signal. The superimposition signal synchronizes with the potential adjustment signal Va, and is the same as the potential adjustment signal Va in phase and amplitude. Referring to FIG. 12, in periods corresponding to hatched portions regarding the control signal Vcsw as indicated in FIG. 12, the superimposition signal is superimposed on the control signal Vcsw. Thus, when the potential of the control signal Vcsw is high, the superimposition signal is not superimposed on the control signal Vcsw. On the other hand, when the potential of the control signal Vcsw is low, and then when the superimposition signal is superimposed on the control signal Vcsw, the potential of the control signal Vcsw is increased to 0V at most. Note that a waveform of the superimposition signal is substantially the same as that of the power supply voltage Vdd, and is substantially the same as that of the power supply voltage Vss.

Thereby, it is possible to reduce variation of the difference in potential between the common electrode CE1 and the control lines W3, W4, W5 and W6 supplied with the control signal Vcsw.

The power supply voltage Vdd is applied to the scanning-line drive circuit GD, and causes the state of the pixel switch PS to be switched to the first connection state (in which the pixel switch PS connects the signal line S and the pixel electrode PE). In the first embodiment, the power supply voltage Vdd which causes the state of the pixel switch PS to be switched to the first connection state is 3V.

However, as the power supply voltage Vdd, a superimposition signal superimposed on the above constant voltage is more proper than the constant voltage. Referring to FIG. 12, in periods corresponding to hatched portions as indicated in FIG. 12, the superimposition signal is superimposed on the power supply voltage Vdd. Thus, when the superimposition signal is superimposed on the contact voltage of the power supply voltage Vdd, the power supply voltage Vdd is increased to 6V at most.

Thereby, it is possible to reduce the variation of the difference in potential between the common electrode CE1 and lines (such as the high-potential power supply line Wd) to which the power supply voltage Vdd is applied.

The power supply voltage Vss is applied to the scanning-line drive circuit GD, and causes the state of the pixel switch PS to be switched to the second connection state (in which the pixel switch PS disconnects the signal line S and the pixel electrode PE from each other, and connects an associated auxiliary line A and the pixel electrode PE). In the first embodiment, the potential of the power supply voltage Vss which causes the state of the pixel switch PS to be switched to the second connection state is −3V.

However, as the power supply voltage Vss, a superimposition signal which is superimposed on the constant voltage when the constant voltage is low is more proper than the constant voltage. Referring to FIG. 12, in periods corresponding to hatched areas as indicated in FIG. 12, the superimposition signal is superimposed on the power supply voltage Vss. Thus, when the superimposition signal is superimposed on the contact voltage of the power supply voltage Vss, the power supply voltage Vdd is increased to 0V at most.

Thereby, it is possible to reduce the variation of the difference in potential between the common electrode CE1 and lines (such as the low-potential power supply line Ws) to which the power supply voltage Vss is applied.

The power supplied voltages to be applied to the liquid crystal display device DSP are not limited to +3V and −3V; that is, they can be set to other values. For example, in the case where the liquid crystal display device DSP is a mobile liquid crystal display device, power supply voltages of +5V, −5V and +3V may be applied.

According to the first embodiment, the sensor-equipped liquid crystal display device DSP having the above structure comprises the scanning lines G, the signal lines S, the pixel switches PS, the common electrode CE1, the pixel electrodes PE, the current mirror circuits CU and the integrators IN. The pixel electrodes PE also function as the detection electrodes DE. The current mirror circuits CU each include the first transistor TR1 and the second transistor TR2. The integrators IN each include the operational amplifier AMP and the capacitor CON.

Each current mirror circuit CU, etc., can be designed in structure such that the amount of current flowing in an associated pixel electrode PE is equal to that of current flowing in an associated capacitor CON. If the ratio between the amount of current flowing in the pixel electrode PE and that of current flowing in the capacitor CON is grasped, it is possible to monitor charging of the pixel electrodes PE with the current mirror circuit CU and the integrator IN.

Charge the amount of which corresponds to that of charging performed a plurality of times can be accumulated in the capacitor CON by repeating charging of the pixel electrode PE and the capacitor CON and discharging of the pixel electrode PE. During repeating of the above charging and discharging, the capacitor CON is in an electrically floating state. Thus, the charge in the capacitor CON is held. If the above charging is repeated N times (for example, four times), the value of the output signal Vout is increased N times greater than that in the case where the charging is not repeated. It is therefore possible to reduce digital noise which can be made in the data signal Vd, by subjecting the above increased output signal Vout to A/D conversion. In addition, in the liquid crystal display device DSP, such accumulation as described above can be performed without adding an accumulation circuit.

Furthermore, the lines, electrodes, switches, circuits, etc., for use in displaying an image are also used in the sensing. It is therefore possible to reduce addition of structural elements for the sensing to the liquid crystal display device DSP.

The common electrode CE1 is located above and opposite to the scanning lines G, the signal lines S, the pixel switches PS, the scanning-line drive circuit GD and the demultiplexer MU. The common electrode CE1 is not only provided in the display area DA, but also extends to the non-display area located outward of the display area DA. The pixel electrodes PE are located above and opposite to the common electrode CE1.

The common electrode CE1 can electrically shield not only the pixel electrodes PE provided in the display area DA but those in the non-display area located outward of the display area DA. That is, by virtue of the above structure, a parasitic capacitance is not easily generated in the pixel electrodes PE, and lowering of the sensitivity of the sensor can thus be reduced.

The first detection unit DU1 (the control module CM) can adjust a signal and a voltage to be applied to the first substrate SUB1 (FIG. 12). The potentials of conductive members (such as lines) located below the common electrode CE1 can be controlled such that a parasitic capacitance is not easily generated in the common electrode CE1, and variation of the potential of the common electrode CE1 is reduced. It is therefore possible to further reduce lowering of the sensitivity of the sensor.

By virtue of the above, it is possible to obtain a sensor-equipped liquid crystal display device DSP which can perform detection with a high accuracy.

(Modification 1 of the First Embodiment)

Figure 13:
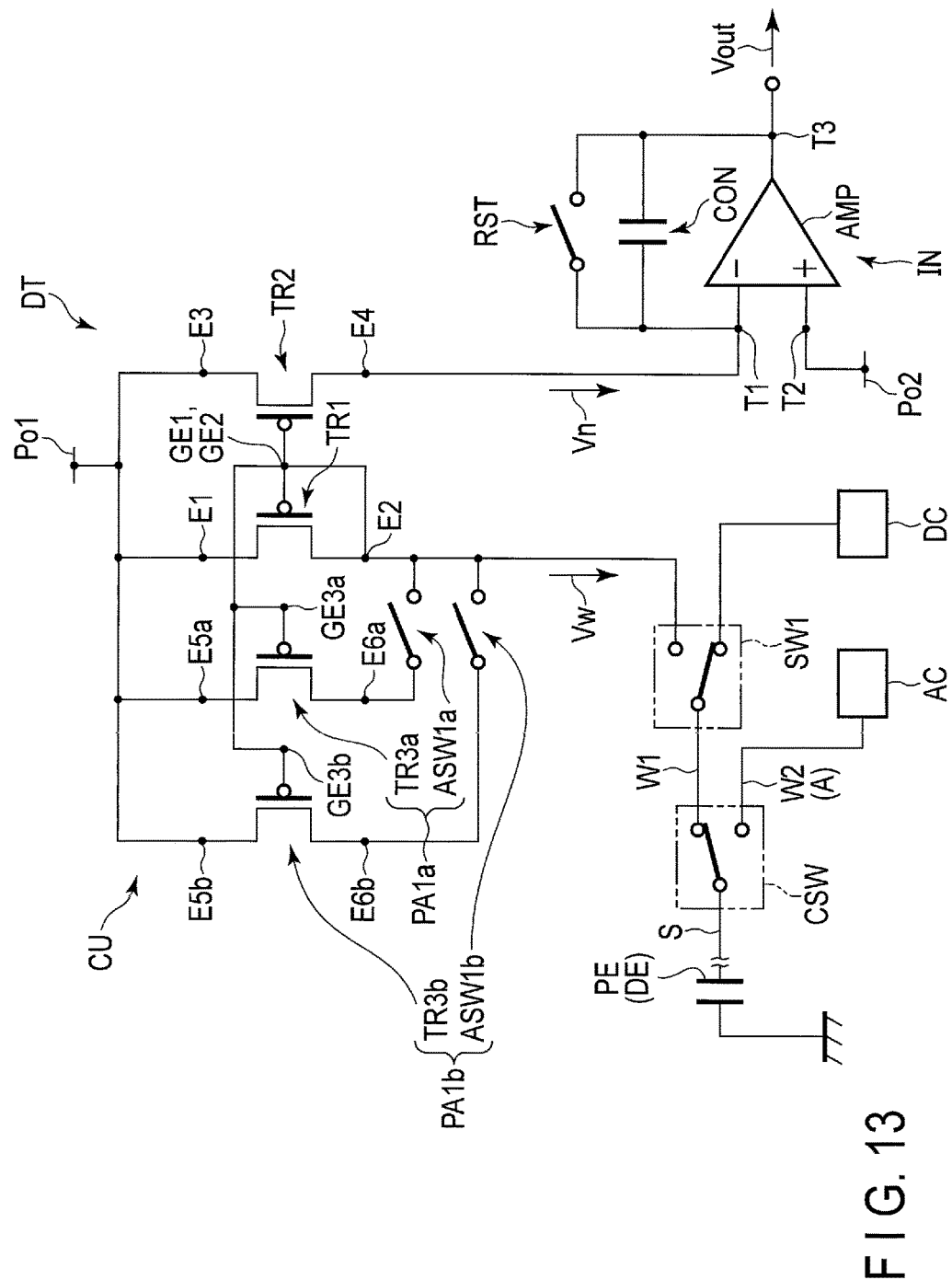
FIG. 13 is an equivalent circuit schematic illustrating part of a liquid crystal display device according to modification 1 of the first embodiment, and also illustrating the detector, the pixel electrode, etc.

A sensor-equipped liquid crystal display device DSP according to modification 1 of the first embodiment will be explained. FIG. 13 is an equivalent circuit schematic illustrating part of the liquid crystal display device DSP according to modification 1, and also a view illustrating a detector DT, a pixel electrode PE, etc.

As illustrated in FIG. 13, in the liquid crystal display device DSP according to modification 1, a single first parallel circuit or a plurality of first parallel circuits are added to the current mirror circuit CU. In this regard, the liquid crystal display device DSP according to modification 1 is different from the liquid crystal display device DSP according to the first embodiment. According to modification 1, the current mirror circuit CU further includes two first parallel circuits PA1a and PA1b.

The first parallel circuit PA1a includes a third transistor TR3a and a first adjustment switch ASW1a, and is connected in parallel with the first transistor TR1. The third transistor TR3a includes a third gate electrode GE3a connected to a first gate electrode GE1, a fifth electrode E5a connected to the first electrode E1 and a sixth electrode E6a. The first adjustment switch ASW1a is closed (conductive state) or opened (non-conductive state) to switch the state of the sixth electrode E6a and the second electrode E2 to one of a conductive state or a non-conductive state.

The first parallel circuit PA1b is formed to have the same structure as the first parallel circuit PA1a. The first parallel circuit PA1b includes a third transistor TR3b and a first adjustment switch ASW1b, and is connected in parallel with the first transistor TR1. In order that the structural elements of the first parallel circuit PA1b and those of the first parallel circuit PA1a be distinguished from each other, "a" is added to the ends of reference signs denoting signs structural elements of the first parallel circuit PA1a which are, for example, the third transistor TR3a, the first adjustment switch ASW1a, etc.), and "b" is added to the ends of reference signs denoting the first parallel circuit PA1b which are, for example, the third transistor TR3b, the first adjustment switch ASW1b).

The third transistors TR3a and TR3b are field-effect transistors. In modification 1, the third transistors TR3a and TR3b are P-channel transistors as well as the first transistor TR1 and the second transistor TR2. The third transistors TR3a and TR3b may have the same structure, i.e., the same electrical characteristics, as the first transistor TR1 and the second transistor TR2, or they may have a structure or electrical characteristics which are different from those of the first transistor TR1 and the second transistor TR2.

By adjusting the states of the first adjustment switches ASW1a and ASW1b, a first current amount, i.e., the amount of current flowing from the first power supply Pot toward the pixel electrode PE, can be made different from a second current amount, i.e., the amount of current flowing from the first power supply Po2 toward the inverting input terminal T1. The detection signal Vw and the write signal Vn can have different characteristics.

In modification 1, the third transistors TR3a and TR3b have the same structure, for example, the same channel width, as the first transistors TR1 and the second transistor TR2. Thereby, in the case where only one of the first adjustment switches ASW1a and ASW1b is made in the conductive state, the second current amount (the amount of current flowing toward the inverting input terminal T1) can be reduced to be half the first current amount (the amount of current flowing toward the pixel electrodes PE). In the case where both the first adjustment switches ASW1a and ASW1b are made in the conductive state, the second current amount can be reduced to be one third the first current amount.

Thus, for example, in the case where the capacitance of the capacitor CON is smaller than a capacitance coupled to the pixel electrode PE, the current mirror circuit CU according to modification 1 can be applied.

(Modification 2 of the First Embodiment)

A sensors-equipped liquid crystal display device DSP according to modification 2 of the first embodiment will be explained. FIG. 14 is an equivalent circuit schematic illustrating part of the liquid crystal display device DSP according to modification 2, and also a view illustrating a detector DT, a pixel electrode PE, etc.

As illustrated in FIG. 14, in the liquid crystal display device DSP according to modification 2, a single second parallel circuit or a plurality of second parallel circuits are added to a current mirror circuit CU. In this regard, the liquid crystal display device DSP according to modification 2 is different from the liquid crystal display device according to the first embodiment. According to modification 2, the current mirror circuit CU further includes two second parallel circuits PA2a and PA2b.

The second parallel circuit PA2a includes a fourth transistor TR4a and a second adjustment switch ASW2a, and is connected in parallel with the second transistor TR2. The fourth transistor TR4a includes a fourth gate electrode GE4a connected to a second gate electrode GE2, a seventh electrode E7a connected to the third electrode E3 and an eighth electrode E8a. The second adjustment switch ASW2a is closed (conductive state) or opened (non-conductive state) to switch the state of the eighth electrode E8a and the fourth electrode E4 to one of a conductive state or a non-conductive state.

The second parallel circuit PA2b is formed to have the same structure as the second parallel circuit PA2a. The first parallel circuit PA2b includes a fourth transistor TR4b and a second adjustment switch ASW2b, and is connected in parallel with the second transistor TR2. In order that the structural elements of the second parallel circuit PA2b and those of the second parallel circuit PA2a be distinguished from each other, "a" is added to the ends of reference signs denoting structural elements of the second parallel circuit PA2a, and "b" is added to the ends of reference signs denoting the second parallel circuit PA2b.

The fourth transistors TR4a and TR4b are field-effect transistors. In modification 2, the fourth transistors TR4a and TR4b are P-channel transistors as well as the first transistor TR1 and the second transistor TR2. The fourth transistors TR4a and TR4b may have the same structure, i.e., the same electrical characteristics, as the first transistor TR1 and the second transistor TR2, or they may have a structure or electrical characteristics which are different from those of the first transistor TR1 and the second transistor TR2.

By adjusting the states of the second adjustment switch ASW2a and ASW2b, a first current amount, i.e., the amount of current flowing from the first power supply Po1 toward the pixel electrode PE, can be made different from a second current amount, i.e., the amount of current flowing from the first power supply Po1 toward the inverting input terminal T1. The detection signal Vw and the write signal Vn can have different characteristics.

In modification 2, the fourth transistors TR4a and TR4b have the same structure, for example, the same channel width, as the first transistors TR1 and the second transistor TR2. Thereby, in the case where only one of the second adjustment switches ASW2a and ASW2b is made in the conductive state, the second current amount (the amount of current flowing toward the inverting input terminal T1) can be increased to be double the first current amount (the amount of current flowing toward the pixel electrodes PE). In the case where both the second adjustment switches ASW2a and ASW2b are made in the conductive state, the second current amount can be increased to be three times greater than the first current amount.

Thus, for example, in the case where the capacitance of the capacitor CON is greater than a capacitance coupled to the pixel electrode PE, or in the case where the number of times the capacitor CON is charged is decreased to obtain an output signal Vout in a shorter period, the current mirror circuit CU according to modification 2 can be applied.

(Modification 3 of the First Embodiment)

A sensor-equipped liquid crystal display device DSP according to modification 3 of the first embodiment will be explained. FIG. 15 is an equivalent circuit schematic illustrating part of the liquid crystal display device DSP according to modification 3, and also a view illustrating a detector DT, a pixel electrode PE, etc.

As illustrated in FIG. 15, in the liquid crystal display device DSP according to modification 3, the current mirror circuit CU further includes a single first parallel circuit or a plurality of first parallel circuits and a single second parallel circuit or a plurality of second parallel circuits. In this regard, the liquid crystal display device DSP according to modification 3 is different from the liquid crystal display device DSP according to the first embodiment. According to modification 3, the current mirror circuit CU further includes two first parallel circuits PA1a and PA1b and two second parallel circuits PA2a and PA2b.

Also, in modification 3, by adjusting the states of the first adjustment switches ASW1a and ASW1b and the second adjustment switches ASW2a and ASW2b, a first current amount, i.e., the amount of current flowing from the first power supply Po1 toward the pixel electrode PE, can be made different from a second current amount, i.e., the amount of current flowing from the first power supply Po1 toward the inverting input terminal T1; and it can be set that an optimal detection can be performed, by appropriately changing the size ratio of the current mirror circuit in accordance with an external object which will be in proximity to the liquid crystal display panel.

Second Embodiment

A liquid crystal display device DSP according to the second embodiment and a driving method thereof will be described. In the second embodiment, the liquid crystal display device is a sensor-equipped liquid crystal display device.

In the first embodiment, the display drive and the sensing drive are performed, and in the sensing drive, the area to be subjected to the sensing is limited to part of the display area DA. By contrast, in the second embodiment, in addition to the display drive and the sensing drive, a position detection drive for specifying the position of an object to be detected is performed. Thereby, after in the position detection drive, an area where the object to be detected is located is specified, in the sensing drive, sensing can be performed on the specified area. For example, it is possible that in the position detection drive, an area where the object to be detected is located is specified, and in the sensing drive, a concavo-convex pattern of the object to be detected is detected.

In order to specify the position of the objet to be detected, a position detection sensor PSE, which is provided in the display area DA of the liquid crystal display panel PNL, is used. The position detection sensor PSE is different from a sensor which detects the concavo-convex pattern of the object to be detected. The position detection sensor PSE is connected to a second detection unit DU2. The second detection unit DU2 drives the position detection sensor PSE at a position detection drive time for detecting the position of the object to be detected to detect the position thereof. The position detection sensor PSE is driven by the second detection unit DU2, not a first detection unit DU1. The first detection unit DU1 sets a plurality of pixel electrodes arranged in the area where the object to be detected is located, as pixel electrodes to be subjected to the sensing, based on position information on the position of the object to be detected, at a sensing drive time for detecting the concave-convex pattern of the object to be detected.

Electrodes of the position detection sensor PSE which are used in specifying the position of the object to be detected can be selected from various kinds of electrodes of the liquid crystal display device DSP.

For example, as an electrode of the position detection sensor PSE, a common electrode CE1 can be selected. In this case, the common electrode CE1 includes a plurality of divided electrodes. For example, the divided electrodes are arranged in a matrix. The second detection unit DU2 writes first signals Wr to the divided electrodes, and read from the divided electrodes, second signals Re representing variations of the first signals. As described above, in the self-capacitive sensing mode, the position of the object to be detected can be detected as position information.

Alternatively, as electrodes of the position detection sensor PSE, position detection electrodes Rx added to the liquid crystal display device DSP can be selected. For example, the position detection electrodes Rx are arranged in a matrix. The second detection unit DU2 writes first signals Wr to the position detection electrodes Rx, and read from the position detection electrodes Rx, second signals Re representing variations of the first signals. As described above, in the self-capacitive sensing mode, the position of the object to be detected can be detected as position information.

Alternatively, as the electrodes of the position detection sensor PSE, a combination of the divided electrodes of the common electrode CE1 and the position detection electrodes Rx added to the liquid crystal display device DSP can be selected. For example, the position detection electrodes Rx and the divided electrodes of the common electrode CE1 are provided to cross each other. The second detection unit DU2 writes the first signals Wr to the divided electrodes of the common electrode CE1, and reads the second signals Re from the position detection electrodes Rx. As described above, in the second mode, the position of the object to be detected can be detected as position information. In some cases, the second mode is referred to as a mutual-capacitive sensing mode.

With respect to the second embodiment, in the following explanation, it is assumed that as the electrodes of the position detection sensor PSE, a combination of the divided electrodes of the common electrode CE1 and the position detection electrodes Rx is selected, and in the mutual-capacitive sensing mode, the position of the object to be detected is detected as position information.

Figure 16:
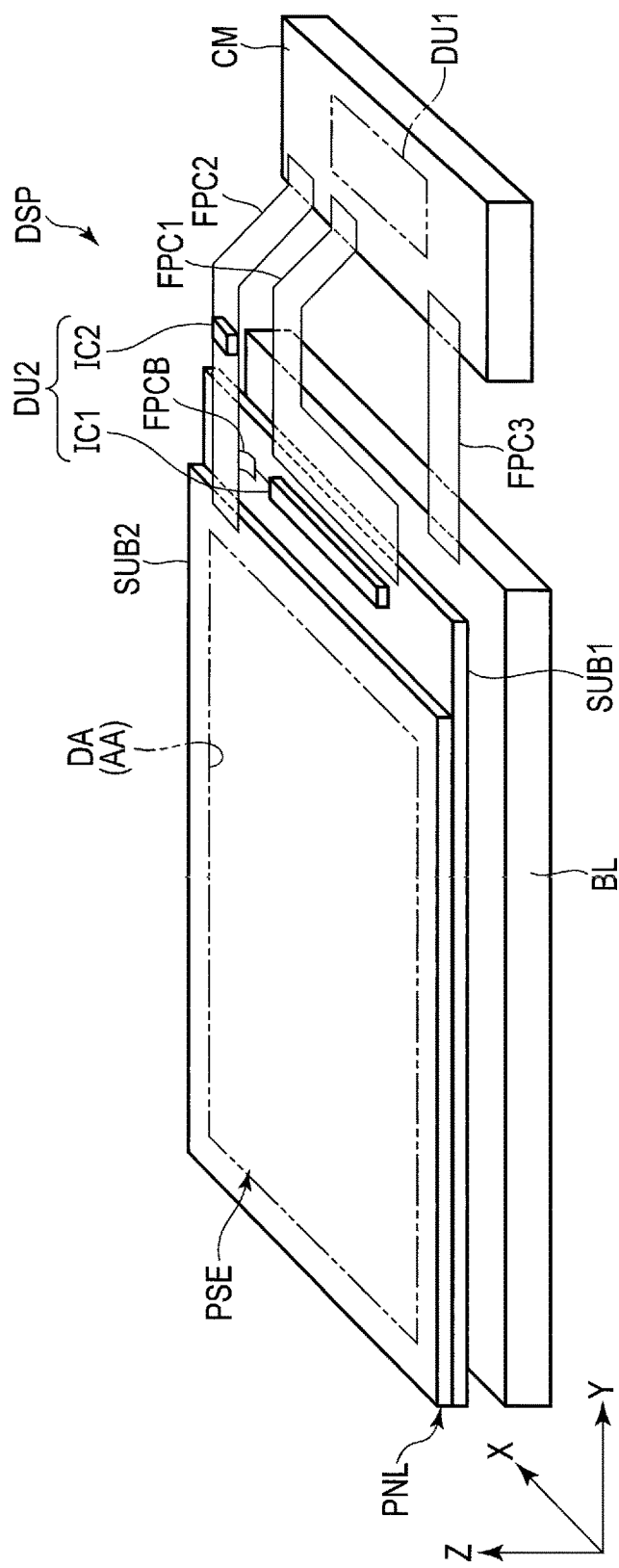
FIG. 16 is a perspective view illustrating a configuration of a liquid crystal display device according to a second embodiment.

First of all, the configuration of a liquid crystal display device according to the second embodiment will be described. FIG. 16 is a perspective view illustrating a configuration of the sensor-equipped liquid crystal display device DSP according to the second embodiment.

As illustrated in FIG. 16, the liquid crystal display device DSP comprises an active-matrix liquid crystal display panel PNL, a driver IC (IC1) which drives the liquid crystal display panel PNL, a capacitive position detection sensor PSE, a driver IC (IC2) which drives the position detection sensor PSE, a backlight unit BL, a control module CM, flexible printed circuits FPC1, FPC2 and FPC3, etc. In the second embodiment, the driver IC (IC1) and the driver IC (IC2) form the second detection unit DU2.

The driver IC (IC1) functions as a first drive unit, and is mounted on a first substrate SUB1 of the liquid crystal display panel PNL. The flexible printed circuit FPC1 connects the liquid crystal display panel PNL and the control module CM to each other. The flexible printed circuit FPC2 connects the position detection electrodes Rx of the position detection sensor PSE and the control module CM to each other. The driver IC (IC2) functions as a second drive unit, and is mounted on the flexible printed circuit FPC2.

The driver IC (IC1) and the driver IC (IC2) are connected to each other by the flexible printed circuit FPC2, etc. For example, in the case where the flexible printed circuit FPC2 includes a branch portion FPCB connected to the first substrate SUB1, the driver IC (IC1) and the driver IC (IC2) may be connected to each other by the branch portion FPCB and lines which are provided on the first substrate SUB1. Also, the driver IC (IC1) and the driver IC (IC2) may be connected to each other by the flexible printed circuits FPC1 and FPC2.

The driver IC (IC2) can supply the driver IC (IC1) with a timing signal indicating timing at which the position detection sensor PSE is to be driven. Alternatively, the driver IC (IC1) can supply the driver IC (IC2) with a timing signal indicating timing at which the common electrode CE1 is to be driven. Alternatively, the control module CM can supply the driver IC (IC1) and the driver IC (IC2) with timing signals. The above timing signals can cause driving by the driver IC (IC1) and that by the driver IC (IC2) to synchronize with each other.

Next, it will be explained how the liquid crystal display device DSP is operated at a position detection drive time at which position detection is performed to detect whether the object to be detected is in contact with or proximity to the screen of the liquid crystal display device DSP. That is, the common electrode CE1 is supplied with a position-detection-sensor drive signal from a common electrode drive circuit or the like. In such a state, upon reception of a sensor signal from the common electrode CE1, the position detection sensor PSE performs position detection.

A principle of an example of the position detection will be explained with reference to FIG. 17.

As illustrated in FIG. 17, the position detection sensor PSE includes the position detection electrodes Rx and the common electrode CE1. The common electrode CE1 includes a plurality of divided electrodes CEa. The position detection electrodes Rx are located at least in the display area DA. The locations of the position detection electrodes Rx are not limited to specific ones; however, the position detection electrodes Rx can be provided in a second substrate SUB2 or a cover member located above the second substrate SUB2. In this case, the position detection electrodes Rx may be formed of metallic narrow lines or meshy metal lines.

Capacitances Cc are present between the divided electrodes CEa and the position detection electrodes Rx. To be more specific, the position detection electrodes Rx are capacitive-coupled to the divided electrodes CEa (the common electrode CE1). The divided electrodes CEa are supplied with first signals (sensor drive signals) Wr in turn and at regular intervals, the first signals being pulse signals. In this case, it is assumed that a user's finger is in proximity to a position detection electrode Rx which intersects a divided electrode CEa. When the user's finger is in proximity to the position detection electrode Rx, a capacitance Cx is produced.

When a first signal Wr (pulse signal) is supplied to the divided electrode CEa, the level of a second signal (sensor output value) Re read from the above position detection electrode Rx (to which the finger is in proximity) is higher than those of second signals read from the other position detection electrodes Rx. The second signals Re are read through lead lines B1. To be more specific, in the case where the position of the user's finger with respect to the display area DA is detected as input position information, the driver IC (IC1) (the common electrode drive circuit) supplies the common electrode CE1 (the divided electrodes CEa) with first signals Wr, and causes sensor signals to be produced between the common electrode CE1 and the position detection electrodes Rx. The driver IC (IC2) is connected to the position detection electrodes Rx, and reads second signals Re representing variations of the sensor signals (for examples, capacitances produced at the position detection electrodes Rx).

The driver IC (IC2) or the control module CM can detect the position of the finger in an X-Y plane in the position detection sensor PSE as two-dimensional position information, based on the timings at which the first signals Wr are supplied to the divided electrodes CEa and the second signals Re read from the position detection electrodes Rx. Furthermore, the capacitance Cx between the finger and each of the position detection electrodes Rx varies in accordance with whether the finger is close to or far from each position detection electrode Rx. Thus, the level of a second signal Re read from each position detection electrode Rx also varies in accordance with whether the finger is close to or far from each position detection electrode Rx. Therefore, the driver IC (IC2) or the control module CM can also detect proximity of the finger to each position detection sensor PSE (i.e., a distance between the finger and each position detection sensor PSE in a third direction Z crossing the first direction X and the second direction Y) based on the level of the above second signal Re.

As described above, at the position detection drive time for detecting the position of the object to be detected, i.e., the finger in the above case, as position information, the second detection unit DU2 drives the position detection sensor PSE to detect the position of the finger as position information. It should be noted that at the position detection drive time, the pixel electrodes PE are caused to be in an electrically floating state.

Then, in a sensing drive time for detecting the fingerprint, the first detection unit DU1 sets a plurality of pixel electrodes PE arranged in an area where the finger is located, based on the above position information, as target pixel electrodes to be subjected to sensing. The first detection unit DU1 supplies a detection signal Vw to each of the above target pixel electrodes PE through the demultiplexer MU, an associated signal line S and an associated pixel switch PS, and supplies a potential adjustment signal Va to the common electrode CE1.

According to the second embodiment, in the liquid crystal display device DSP having the above structure and the driving method of the liquid crystal display device DSP, the same sensor SE and the same sensing drive as described regarding the first embodiment can be applied. Therefore, the second embodiment can obtain the same advantage as the first embodiment.

The liquid crystal display device DSP according to the second embodiment further comprises the position detection sensor PSE and the second detection unit DU2. Thereby, not all over the display area DA, sensing needs to be performed with a high definition corresponding to a pixel density, and the time required for the sensing can thus be shortened.

Therefore, it is possible to provide a sensor-equipped liquid crystal display device DSP having a high detection accuracy and a method of driving the sensor-equipped liquid crystal display device DSP.

(Modification 1 of Second Embodiment)

Figure 18:
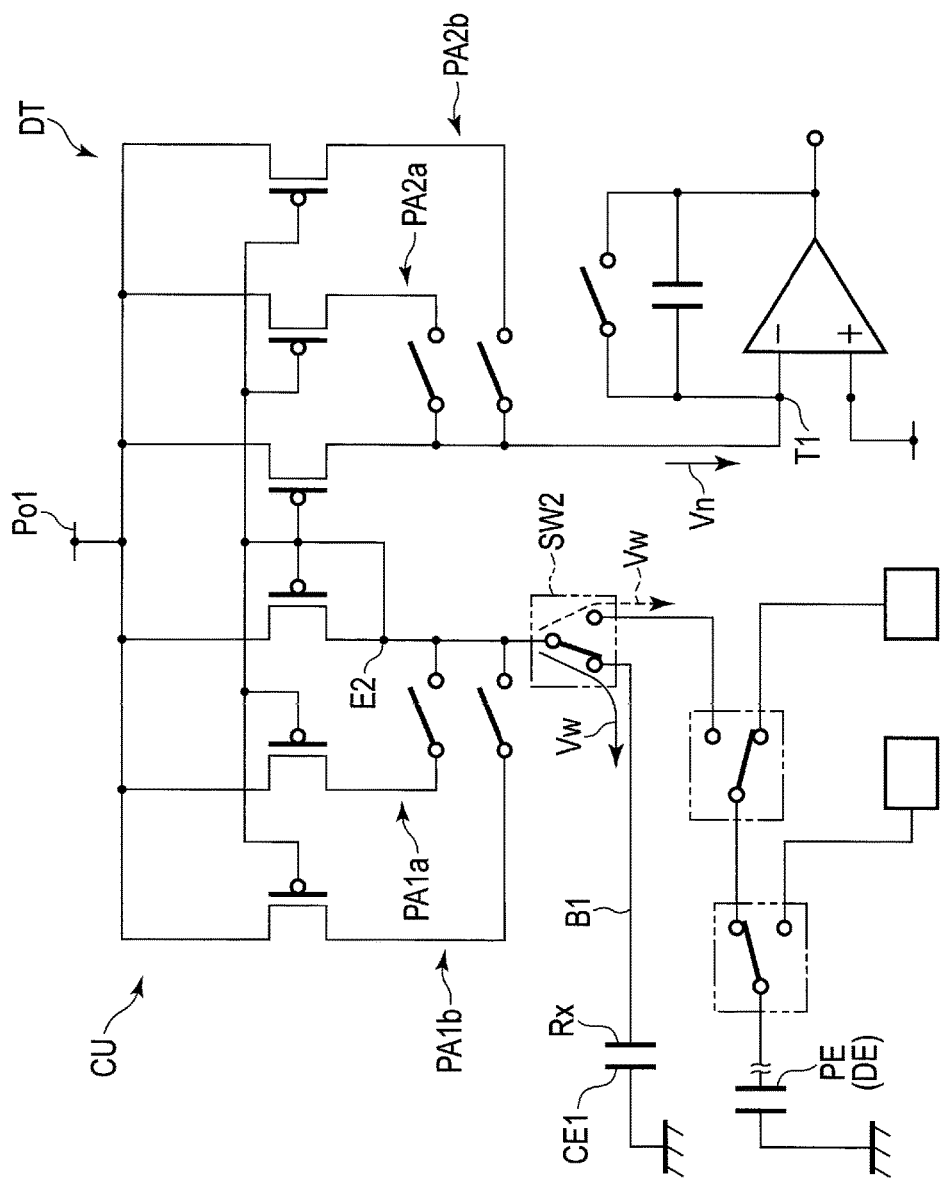
FIG. 18 is an equivalent circuit schematic illustrating part of a liquid crystal display device according to modification 1 of the second embodiment, and also illustrating a detector, a pixel electrode, etc.

A sensor-equipped liquid crystal display device DSP according to modification 1 of the second embodiment will be explained. FIG. 18 is an equivalent circuit schematic illustrating part of the liquid crystal display device DSP according to modification 1 of the second embodiment, and also a view illustrating a detector DT, a pixel electrode PE, a position detection electrodes Rx, etc.

As illustrated in FIG. 18, in the liquid crystal display device DSP according to modification 1 of the second embodiment, the current mirror circuit CU further includes a single first parallel circuit or a plurality of first parallel circuits and a single second parallel circuit or a plurality of second parallel circuits, and a selection switch SW2 is further added. In this regard, the liquid crystal display device DSP according to modification 1 of the second embodiment is different from the liquid crystal display device according to the second embodiment. According to modification 1 of the second embodiment, the current mirror circuit CU further includes two first parallel circuits PA1a and PA1b and two second parallel circuits PA2a and PA2b.

Under the control by a main controller MC, the state of the selection switch SW2 of the detector DT is switched to one of a first selection state in which the selection switch SW2 electrically connects an associated second electrode E2 and an associated pixel electrode PE to each other and a second selection state in which the selection switch SW2 electrically connects the second electrode E2 and an associated position detection electrode Rx to each other. In accordance with the state of the selection switch SW2, (1) a first current amount, i.e., the amount of current flowing from a first power supply Po1 to the pixel electrode PE, and a second current amount, i.e., the amount of current flowing from the first power supply Po1 toward an inverting input terminal T1, can be made different from each other; and (2) a third current amount, i.e., the amount of current flowing from the first power supply Po1 to the position detection electrodes Rx, and the second current amount, can be made different from each other.

For example, in the case where the capacitance of a capacitor CON is greater than a capacitance coupled to the pixel electrode PE, and smaller than a capacitance coupled to the position detection electrodes Rx, the detector DT according to modification 1 of the second embodiment can be applied.

For example, in the case where the state of the selection switch SW2 is switched to the first selection state (in which the selection switch SW2 electrically connects the second electrode E2 and the pixel electrode PE), the second current amount (the amount of current flowing toward the inverting input terminal T1) can be reduced to be one third the first current amount (flowing toward the pixel electrode PE). By contrast, in the case where the state of the selection switch SW2 is switched to the second selection state (in which the selection switch SW2 electrically connects the second electrode E2 and the position detection electrode Rx), the second current amount can be increased to be three times greater than the third current amount.

Third Embodiment

A liquid crystal display device DSP according to the third embodiment will be described.

FIG. 19 is an equivalent circuit schematic illustrating a relationship in electrical connection between lines and four pixels PX in the liquid crystal display device DSP according to the third embodiment. Also in the present embodiment, an object to be detected can be detected by using the above-described detector DT.

As illustrated in FIG. 19, in the liquid crystal display device DSP according to the third embodiment, no auxiliary lines A are provided, and each of pixel switches PS is provided without second switching elements (DS1b, DS2b, DS3b and DS4b). In this regard, the liquid crystal display device according to the third embodiment is different from the liquid crystal display device DSP according to the first embodiment. In the third embodiment, a shielding electrode SH may be provided in an electrically floating state, and a first substrate SUB1 may be provided without a shielding electrode SH. By switching the state of a pixel switch PS to the second connection state, an associated signal line S and an associated pixel electrode PE can be electrically disconnected from each other, and the pixel electrode PE can be caused to be in an electrically floating state. Alternatively, in a period in which a given signal line S and a given pixel electrode PE are supplied with a detection signal Vw, the other signal lines S and the other pixel electrodes PE arranged in the same column as the above given pixel electrode PE may be supplied with superimposition signals.

In the third embodiment also, a common electrode CE1 can be supplied with a potential adjustment signal Va. For example, through a line provided outward of the display area DA, the common electrode CE1 can be supplied with the potential adjustment signal Va.

It should be noted that as the method of driving the liquid crystal display device DSP according to the third embodiment, the method of driving the liquid crystal display device DSP according to the first embodiment can be applied.

Also, in the liquid crystal display device DSP having the above structure according to the third embodiment and the driving method of the liquid crystal display device DSP, the same advantage as in the first embodiment can be obtained. In the sensing drive time, pixel electrodes PE other than the pixel electrode PE to be supplied with the detection signal Vw can be switched to be in an electrically floating state. In this case also, a parasitic capacitance is not easily produced in the common electrode CE1, and it is possible to reduce variation of the potential of the common electrode CE1. It is therefore possible to reduce lowering of the sensitivity of the sensor.

Therefore, it is possible to provide a sensor-equipped liquid crystal display device DSP having a high detection accuracy and a method of driving the sensor-equipped liquid crystal display device DSP.

Fourth Embodiment

A liquid crystal display device DSP according to the fourth embodiment will be described. In the fourth embodiment, the liquid crystal display device is a sensor-equipped liquid crystal display device.

As illustrated in FIG. 20, unlike the first embodiment (FIG. 1), a sensing area SA is located outward the display area DA. A display drive in the display area DA and a sensing drive in the sensing area SA can be performed independent of each other. For example, a sensing drive period can be set independent of a display drive. Furthermore, it is possible to reduce lowering of the display quality, as compared with the case where the sensing area SA is provided in part of the display area DA.

Control lines C, detection lines L, detection switches DS, detection electrodes DE and a common electrode CE2 are provided independent of scanning lines G, signal lines S, pixel switches PS, pixel electrodes PE and a common electrode CE1. It should be noted that the common electrode CE2 may be formed integral with the common electrode CE1.

Figure 21:
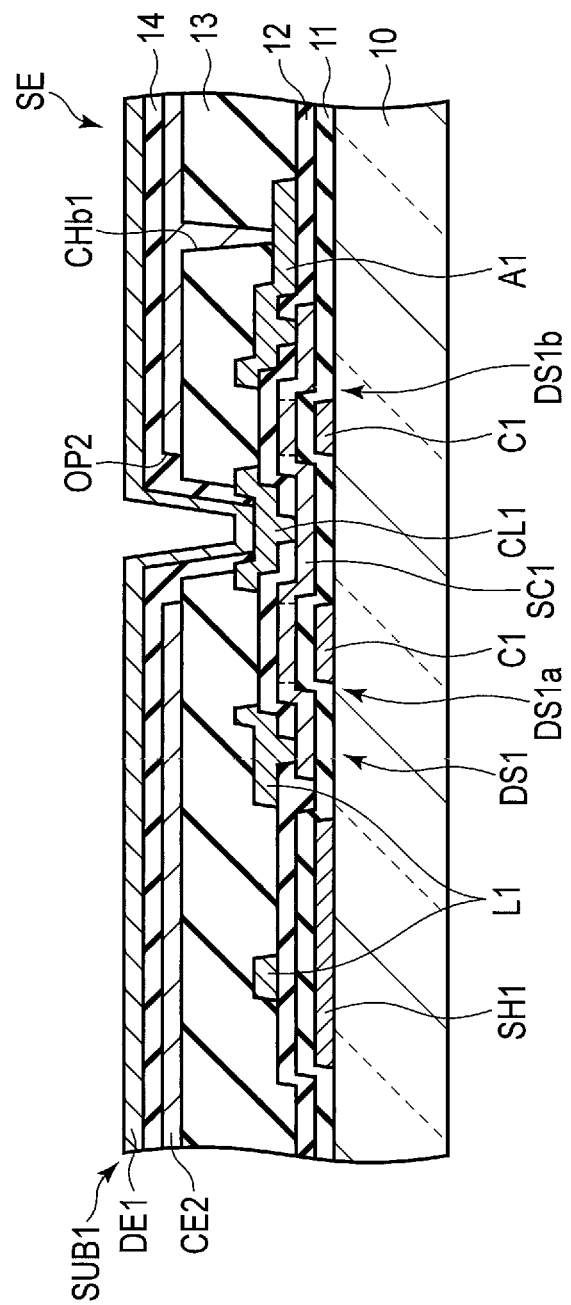
FIG. 21 is a cross-sectional view illustrating a sensing area of a first substrate in a liquid crystal display device according to the fourth embodiment.

For example, in the example illustrated in FIG. 21, the common electrode CE2 is provided on a third insulating film 13. The common electrode CE2 is connected to a first auxiliary line A1 through a contact hole CHb1 formed in a third insulating film 13. A first detection electrode DE1 is provided on a fourth insulating film 14 and opposite to a second opening OP2. Unlike the above pixel electrodes PE, the first detection electrodes DE1 include no slits. A first pixel electrode PE1 is connected to a first conductive layer CL1 through a second opening OP2 and a contact hole formed in a fourth insulating film 14. The first pixel electrode PE1 is connected to a first detection switch DS1, with a first conductive layer CL1 interposed between them.

In the case of forming a first substrate SUB1, the display area DA and the sensing area SA can be formed in the same manufacturing process. Referring to FIGS. 5 and 21, for example, pixel electrodes PE in the display area DA and detection electrodes DE in the sensing area SA can be provided in the same layer. In the fourth embodiment, the detection electrodes DE may be formed of the same layer as the pixel electrodes PE in the display area DA. In addition, the common electrode CE2 may be omitted.

It should be noted that in the fourth embodiment also, in the first mode (self-capacitive sensing mode), sensing can be performed using a sensor SE, etc.

Therefore, in the fourth embodiment also, it is possible to provide a sensor-equipped liquid crystal display device DSP having a high detection accuracy and a method of driving the sensor-equipped liquid crystal display device DSP.

Fifth Embodiment

A liquid crystal display device DSP according to the fifth embodiment will be described. In the fifth embodiment, the liquid crystal display device is a sensor-equipped liquid crystal display device.

It should be noted that with respect to the above second embodiment, it is explained that as electrodes of a position detection sensor PSE, a combination of the common electrode CE1 and the position detection electrodes Rx is selected, and in the mutual-capacitive sensing mode, the position of an object to be detected is detected as position information. By contrast, in the fifth embodiment, the electrode of the position detection sensor PSE is a common electrode CE1, and in a self-capacitive sensing mode, the position of an object to be detected is detected as position information. Therefore, in the fifth embodiment, a position detection sensor PSE can be formed without adding thereto position detection electrodes Rx.

It should be noted that in the fifth embodiment, control lines C, detection lines L, detection switches DS, detection electrodes DE and a common electrode CE2 are provided independent of scanning lines G, signal lines S, pixel switches PS, pixel electrodes PE and a common electrode CE1.

FIG. 22 is a plan view illustrating a configuration of a liquid crystal display panel PNL of a liquid crystal display device DSP according to the fifth embodiment, and also a view illustrating common electrodes CE1 and CE2, etc.

As illustrated in FIG. 22, the common electrode CE1 includes divided electrodes CEa arranged in a matrix, and a peripheral electrode CEb. The divided electrodes CEa are located in the display area DA. The size of each of the divided electrodes CEa is not limited to a specific one. It suffices that each of the divided electrodes CEa is located opposite to a plurality of pixel electrodes PE. Lead lines B2 are connected to the divided electrodes CEa, respectively, and extend to positions located outward of the display area DA. The peripheral electrode CEb is rectangular frame, and separated from the divided electrodes CEa by a given distance. The peripheral electrode CEb covers a scanning-line drive circuit GD, a demultiplexer MU, etc.

FIG. 23 is an equivalent circuit schematic illustrating part of the liquid crystal display device DSP according to the fifth embodiment, and also a view illustrating a detection electrode DT, a pixel electrode PE, divided electrodes CEa, etc.

As illustrated in FIG. 23, in the liquid crystal display device DSP according to the fifth embodiment, the current mirror circuit CU further includes a single first parallel circuit or a plurality of first parallel circuits and a single second parallel circuit or a plurality of second parallel circuits, and a selection switch SW2 is further added. In this regard, the liquid crystal display device DSP according to the fifth embodiment is different from the liquid crystal display device according to the second embodiment. In the fifth embodiment, the current mirror circuit CU further includes two first parallel circuits PA1a and PA1b and two second parallel circuits PA2a and PA2b.

To be more specific, under a control by a main controller MC, the state of a selection switch SW2 of a detector DT is switched to one of a first selection state in which the selection switch SW2 electrically connects an associated second electrode E2 and an associated pixel electrode PE to each other and a second selection state in which the selection switch SW2 electrically connects the second electrode E2 and an associated divided electrode CEa (common electrode CE1) to each other. In accordance with the state of the selection switch SW2, (1) a first current amount, i.e., the amount of current flowing from a first power supply Po1 to the pixel electrode PE, and a second current amount, i.e., the amount of current flowing from the first power supply Po1 toward an inverting input terminal T1, can be made different from each other; and (2) a third current amount, i.e., the amount of current flowing from the first power supply Po1 to the divided electrode CEa, and the second current amount can be made different from each other.

For example, the capacitance of the capacitor CON is greater than a capacitance coupled to the pixel electrodes PE, and smaller than a capacitance coupled to the divided electrode CEa, the detector DT according to the fifth embodiment can be applied.

For example, in the case where the state of the selection switch SW2 is switched to the first selection state (in which the selection switch SW2 electrically connects the second electrode E2 and the pixel electrode PE), the second current amount (the amount of current flowing toward the inverting input terminal T1) can be reduced to be one third the first current amount (flowing toward the pixel electrode PE). By contrast, in the case where the state of the selection switch SW2 is switched to the second selection state (in which the selection switch SW2 electrically connects the second electrode E2 and the divided electrode CEa), the second current amount (flowing toward the noninverting input terminal T1) can be increased to be three times greater than the third current amount (flowing toward the divided electrode CEa).

Also, in the liquid crystal display device DSP having the above structure according to the fifth embodiment and the method of driving the liquid crystal display device DSP, the same advantage as in the second embodiment can be obtained. In the liquid crystal display device DSP according to the fifth embodiment, as the position detection sensor PSE, the common electrode CE1 can be applied. It is possible to detect the position of the object to be objected as position information without using electrodes only for the position detection sensor PSE.

Therefore, it is possible to provide a sensor-equipped liquid crystal display device DSP having a high detection accuracy and a method of driving the sensor-equipped liquid crystal display device DSP.

Sixth Embodiment

A liquid crystal display device DSP according to the sixth embodiment will be described. In the sixth embodiment, the liquid crystal display device is a sensor-equipped liquid crystal display device.

Figure 24:
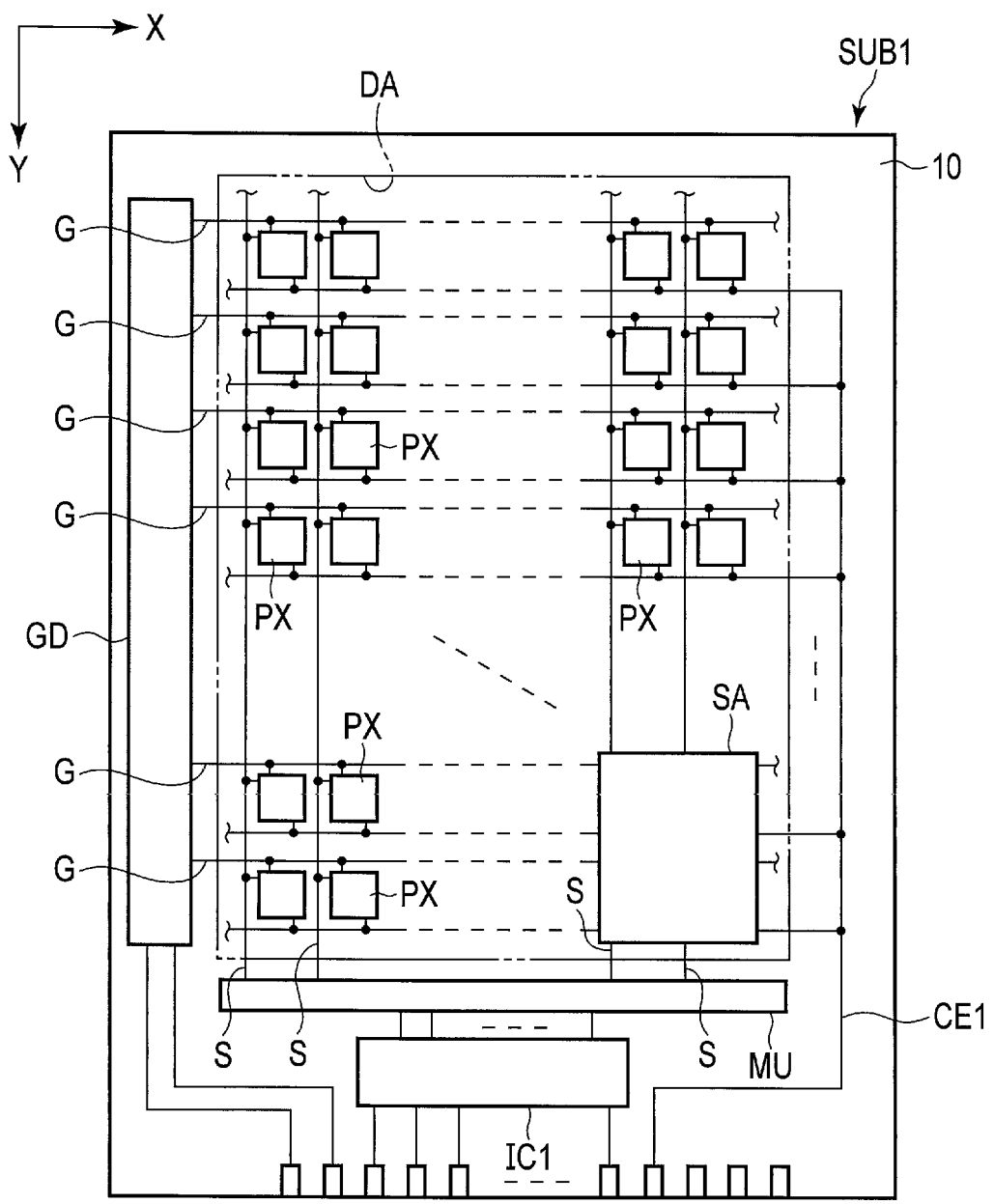
FIG. 24 is a plan view illustrating a configuration of a first substrate in a liquid crystal display device according to a sixth embodiment.

As illustrated in FIG. 24, in the display area DA, a plurality of pixels PX are arranged in a matrix. These pixels PX are surrounded by a plurality of scanning lines G connected to a scanning-line drive circuit GD and a plurality of signal lines S connected to a demultiplexer MU.

In part of the display area DA, a sensing area SA is provided. The inside of the sensing area SA is configured in the same manner as that of the active area AA as illustrated in FIG. 1. Also, in the sixth embodiment, pixel electrodes PE in the display area DA and detection electrodes DE in the sensing area SA can be provided in the same layer.

Therefore, in the sixth embodiment also, it is possible to provide a sensor-equipped liquid crystal display device DSP having a high detection accuracy and a method of driving the sensor-equipped liquid crystal display device DSP.

Seventh Embodiment

A sensor SE according to the seventh embodiment and a method of driving the sensor SE will be described. FIG. 25 is a plan view illustrating the sensor SE according to the seventh embodiment.

As illustrated in FIG. 25, the sensor SE comprises a first substrate SUB1 formed in the shape of a flat plate, a control module CM, a flexible printed circuit FPC1, etc. The first substrate SUB1 includes an active area AA. In the seventh embodiment, the active area AA is a detection area provided to detect an object to be detected. Also, in the seventh embodiment, the first substrate SUB1 includes a rectangular non-detection area located outward of the active area AA. As the first substrate SUB1, the first substrate SUB1 according to each of the above embodiments can be applied.

However, in the seventh embodiment, the structural elements of the first substrate SUB1 can be changed as occasion demands, since the first substrate SUB1 is not applied to a liquid crystal display panel PNL. For example, the first substrate SUB1 does not need to include an alignment film. A common electrode CE2 is not only provided in the active area AA, but also extends to the area outward of the active area AA, and provided opposite to a demultiplexer MU, the control-line drive circuit CD, etc. In addition, there is a case where structural elements included in the first substrate SUB1 are different in function from those of the above embodiments.

FIG. 26 is an equivalent circuit schematic illustrating part of the sensor SE, and also a view illustrating a detector DT, a detection electrode DE, etc.

As illustrated in FIG. 26, the sensor SE comprises detection electrodes DE, detection lines L, control switches CSW, connection lines W1 and W2, detectors DT and auxiliary circuits AC. In the seventh embodiment, the detectors DT and the auxiliary circuits AC are provided in the analog front end AFE. The detectors DT each comprise a current mirror circuit CU, an integrator IN and a reset switch RST.

The state of each of the control switches CSW is switched to either a first switch state in which the control switch CSW electrically connects an associated detection line L and an associated connection line W1 or in a second switch state which the control switch CSW electrically connects the detection line L and an associated connection line W2. When the state of a control switch CSW is switched to the first switch state, the control switch CSW enables a detection signal Vw to be transmitted through the detection line L. Also, when the state of the control switch CSW is switched to the second switch state, the control switch CSW enables a potential adjustment signal Va to be transmitted through the detection line L. In such a manner, each control switch CSW is used to cause the detection signal Vw and the potential adjustment signal Va to be selectively transmitted through the detection line L.

In the sensor SE having the above structure according to the seventh embodiment and a method of driving the sensor SE, the sensor SE comprises the control lines C, the detection lines L, detection switches DS, the common electrode CE2, the detection electrodes DE, a control-line drive circuit CD serving as a first circuit, current mirror circuits CU and integrators IN. Each of the detection switches DS is connected to an associated control line C and an associated detection line L. The common electrode CE2 is located above the control lines C, the detection lines L and the detection switches DS and opposite to the control lines C, the detection lines L and the detection switches DS, and includes openings OP2 located opposite to the detection switches DS. The detection electrodes DE are located above the common electrode CE2 and opposite to the openings OP2, and connected to the detection switches DS through the openings OP2.

The control-line drive circuit CD is connected to the control lines C, and supplies a drive signal CS to each of the control lines C. When the drive signal CS is supplied to a detection switch DS, the state thereof is switched to either a first connection state in which the detection switch DS electrically connects an associated detection line L and an associated detection electrode DE or a second connection state in which the detection switch DS electrically disconnects the detection line L and the detection electrode DE from each other.

The current mirror circuits CU each include a first transistor TR1 and a second transistor TR2. The first transistor TR1 includes a first gate electrode GE1, a first electrode E1 connected to a first power supply Po1, and a second electrode E2 connected to a detection electrode DE and the first gate electrode GE1. The second transistor TR2 includes a second gate electrode GE2 connected to the first gate electrode GE1, a third electrode E3 connected to the first power supply Po1 and a fourth electrode E4.

The integrator IN comprises an operational amplifier AMP and a capacitor CON, the operational amplifier AMP including an inverting input terminal T1 connected to the fourth electrode E4, and a noninverting input terminal T2 connected to a second power supply Po2, the capacitor CON being connected between an output terminal T3 of the operational amplifier AMP and the inverting input terminal T1 thereof.

The sensor SE further includes auxiliary lines A and the demultiplexer MU, which functions as a second circuit. The demultiplexer MU includes control switches CSW each of which is switched to be in either a first switch state in which the control switch CSW electrically connects an associated detection line L and the second electrode E2 of an associated first transistor TR1 to each other or a second switch state in which the control switch CSW electrically connects the detection line L and an associated auxiliary line A (connection line W2) to each other. When the demultiplexer MU causes a control switch CSW to be in the first switch state, an associated detection electrode DE and an associated capacitor CON are charged, and when the demultiplexer MU causes the control switch CSW to be in the second switch state, the detection electrode DE is discharged. By repeating such charging and discharging, it is possible to accumulate in the capacitor CON, charge corresponding to charging performed a number of times.

In the seventh embodiment, using the current mirror circuit CU and the integrator IN, it is possible to monitor charging of the detection electrode DE. Therefore, the seventh embodiment can also obtain the same advantage as the above embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. It is possible to combine two or more embodiments if needed.

For example, as illustrated in FIG. 27, unlike the first embodiment, the detector DT may be formed without including the current mirror circuit CU. It should be noted that in the example illustrated in FIG. 27, the scanning line G is the control line C, the signal line S is the detection line L, the pixel switch PS is the detection switch DS, the pixel electrode PE is the detection electrode DE, and the common electrode CE1 is the common electrode CE2.

The detector DT further includes an integrator IN, a reset switch RST and a drive switch SW3. The drive switch SW3 is switched to be in either a write state in which it electrically connects an associated first power supply Po1 and an associated signal line S (switch SW1) to each other, or a read state in which it electrically connects an associated inverting input terminal T1 and the signal line S.

When the drive switch SW3 is switched to be in the write state, the pixel electrode PE is charged, and when the drive switch SW3 is switched to be in the read state, the pixel electrode PE is discharged and the capacitor CON is charged. By repeating such charging and discharging, it is possible to accumulate in the capacitor CON, charge corresponding to charging performed a number of times. It should be noted that while charge is being accumulated in the capacitor CON, the first control switch CSW1 is kept in the first switch state (in which it electrically connects the connection line W1 and the signal line S.

As described above, even in the case where the drive switch SW3 is used in place of the current mirror circuit CU, it is also possible to accumulate charge as explained above.

Figure 28:
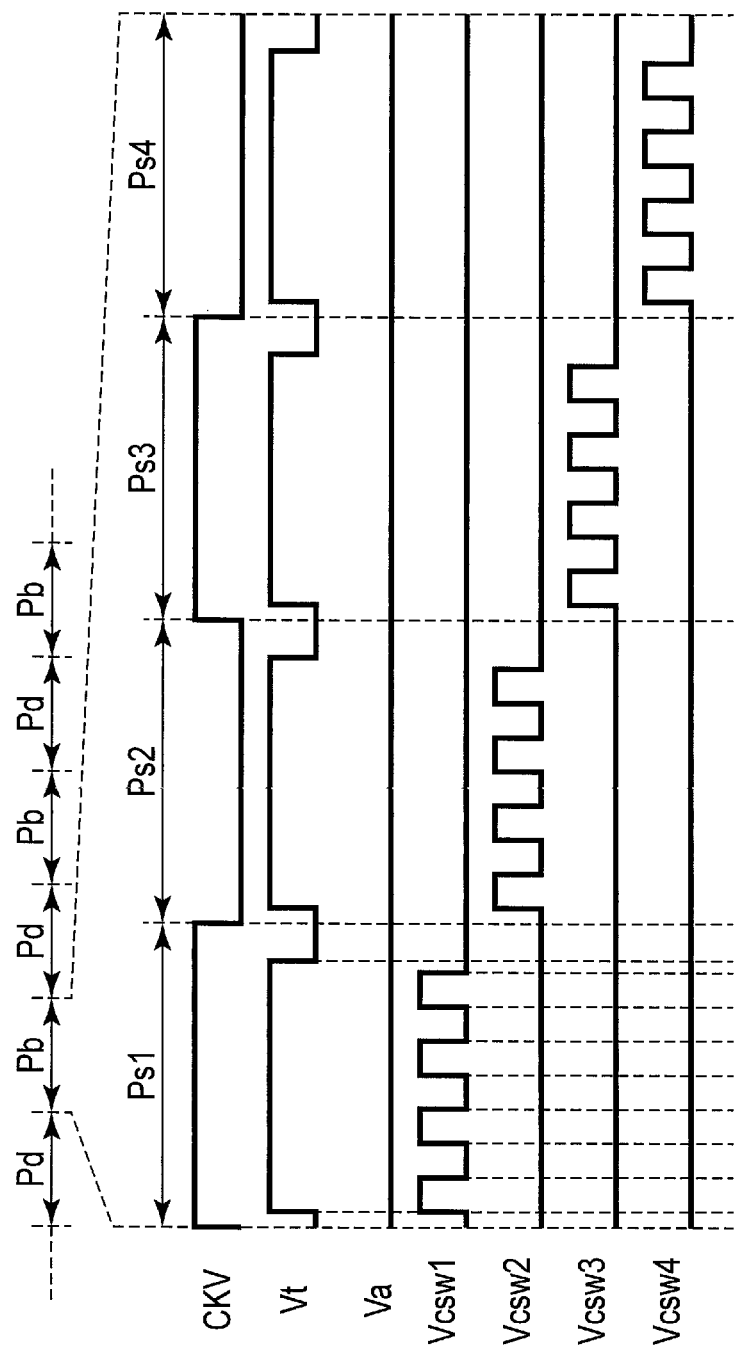
FIG. 28 is a timing chart for explaining a modification of the potential adjustment signal referred to with respect to the first embodiment, and also showing the clock signal, the timing signal, the potential adjustment signal and the control signals in an arbitrary sensing period.
Figure 29:
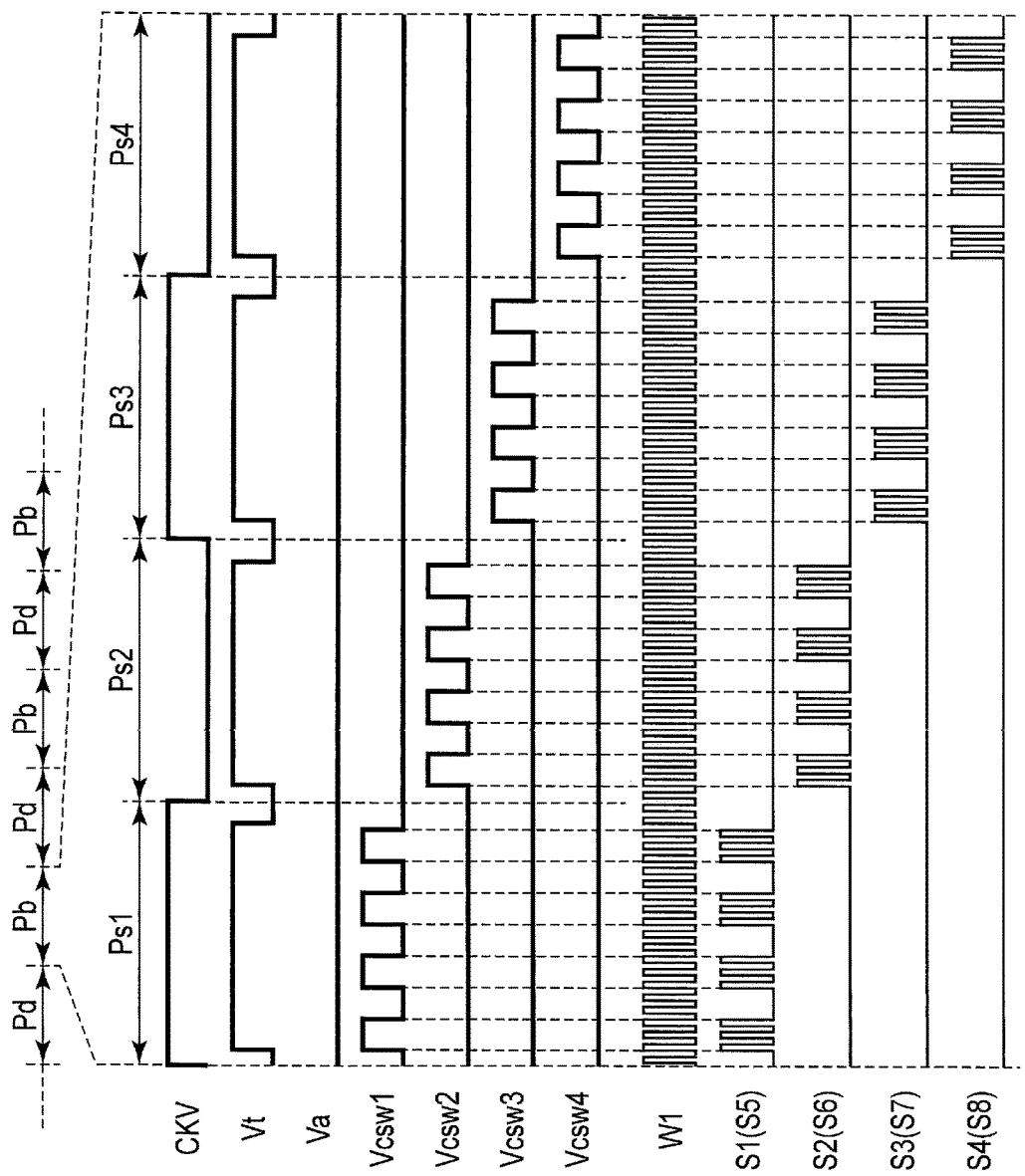
FIG. 29 is a timing chart for explaining another modification of the potential adjustment signal and modification of a driving for a connection line referred to with respect to the first embodiment, and also showing the clock signal, the timing signal, the potential adjustment signal and the control signals, the variation of the potential of the connection line and the variation of the potential of a signal line in an arbitrary sensing period.

As illustrated in FIGS. 28 and 29, the potential adjustment signal Va may be a constant voltage fixed to 0V, not such a pulse signal as described above with respect to the first embodiment (FIG. 9). As illustrated in FIG. 29, in a period in which the control signal Vcsw is at high level, a pulse signal may be supplied to the signal line S (detection electrode DE) a number of times. Thus, in the example illustrated in FIG. 29, in a blanking period Pb, a short-cycle pulse signal is continuously supplied to the connection line W1. For example, in each of periods in which the control signal Vcsw1 is at high level, the pulse signal can be supplied to the signal lines Si and S5, etc., a number of times. In each of periods in which the control signal Vcsw2 is at high level, the pulse signal can be supplied to the signal lines S2 and S6, etc., a number of times. In each of periods in which the control signal Vcsw3 is at high level, the pulse signal can be supplied to the signal lines S3 and S7, etc., a number of times. In each of periods in which the control signal Vcsw4 is at high level, the pulse signal can be supplied to the signal lines S4 and S8, etc., a number of times.

The connection lines W1, the signal lines and the detection electrodes DE may be driven as described above.

The driver IC (IC1) and the driver IC (IC2) may be formed as a single body. To be more specific, the driver IC (IC1) and the driver IC (IC2) may be combined into a single driver IC.

The controllers such as the above circuit, the drivers IC and the control module are not limited to the following elements: the control-line drive circuit CD (the scanning-line drive circuit GD); the demultiplexer MU; the control module CM; the driver IC (IC1) and the driver IC (IC2). That is, they can be variously modified, and any controllers can be applied as long as they can electrically control the first substrate SUB1 (the liquid crystal display panel PNL) or the position detection electrodes Rx (the position detection sensor PSE).

With respect to each of the above embodiments, as the display device, the liquid crystal display device is explained by way of example as described above. However, the above embodiments are applicable to all kinds of flat-panel display devices, such as organic electroluminescent (EL) display devices, self-luminous display devices, and electronic paper-type display devices including electrophoresis elements, etc. Needless to say, the above embodiments can be applied to middle or small display devices and large display devices without particular limitation.

What is claimed is:

1. A sensor-equipped display device comprising:
   a scanning line;
   a signal line;
   a pixel switch connected to the scanning line and the signal line;
   a pixel electrode connected to the pixel switch;
   a first common electrode;

a detection electrode;
a current mirror circuit including a first transistor and a second transistor, the first transistor including a first gate electrode, a first electrode connected to a first power supply and a second electrode electrically connected to the detection electrode and the first gate electrode, the second transistor including a second gate electrode connected to the first gate electrode, a third electrode connected to the first power supply, and a fourth electrode; and
an integrator including an operational amplifier and a capacitor, the operational amplifier including an inverting input terminal electrically connected to the fourth electrode and a noninverting input terminal connected to a second power supply, the capacitor being connected between an output terminal and the inverting input terminal of the operational amplifier.

2. The sensor-equipped display device of claim 1, further comprising:
a control line;
a detection line;
a detection switch connected to the control line and the detection line;
a second common electrode located above the control line, the detection line and the detection switch and opposite to the control line, the detection line and the detection switch, the second common electrode including an opening; and
a first circuit connected to the control line to supply the control line with a drive signal for switching a state of the detection switch to one of a first connection state in which the detection switch electrically connects the detection line and the detection electrode to each other and a second connection state in which the detection switch electrically disconnects the detection line and the detection electrode from each other,
wherein the detection electrode is located above the second common electrode and opposite to the opening, and connected to the detection switch through the opening.

3. The sensor-equipped display device of claim 2, further comprising:
an auxiliary line; and
a second circuit including a control switch a state of which is switched to one of a first switch state and a second switch state, the first switch state being a state in which the control switch electrically connects the detection line and the second electrode of the first transistor, the second switch state being a state in which the control switch electrically connects the detection line and the auxiliary line,
wherein the second circuit repeatedly switches a state of the control switch from the second switch state to the first switch state and from the first switch state to the second switch state, to thereby accumulate in the capacitor, charge an amount of which corresponds to that of charging performed a number of times, the state of the control switch being switched to the first switch state to charge the detection electrode and the capacitor, and being switched to the second switch state to discharge the detection electrode.

4. The sensor-equipped display device of claim 3, wherein in a sensing drive period, the second common electrode is supplied with a potential adjustment signal, the auxiliary line is supplied with the potential adjustment signal, and the detection line is supplied with a detection signal when the state of the control switch is switched; and the potential adjustment signal synchronizes with the detection signal, and has the same phase and amplitude as the detection signal.

5. The sensor-equipped display device of claim 4, wherein the first circuit switches the state of the detection switch to the second connection state to connect the detection electrode to the auxiliary line and to supply the detection electrode with the potential adjustment signal.

6. The sensor-equipped display device of claim 2, wherein the scanning line is the control line, the signal line is the detection line, the pixel switch is the detection switch, and the pixel electrode is the detection electrode, and the first common electrode is the second common electrode.

7. The sensor-equipped display device of claim 2, wherein the control line, the detection line, the detection switch, the detection electrode and the second common electrode are provided independent of the scanning line, the signal line, the pixel switch, the pixel electrode and the first common electrode.

8. The sensor-equipped display device of claim 1, wherein the current mirror circuit further includes at least one of a first parallel circuit and a second parallel circuit,
the first parallel circuit including a third transistor and a first adjustment switch, and being connected in parallel with the first transistor, the third transistor including a third gate electrode connected to the first gate electrode, a fifth electrode connected to the first electrode, and a sixth electrode, the first adjustment switch being provided to switch a state of the sixth electrode and second electrode to one of a conductive state and a non-conductive state,
the second parallel circuit including a fourth transistor and a second adjustment switch, and being connected in parallel with the second transistor, the fourth transistor including a fourth gate electrode connected to the second gate electrode, a seventh electrode connected to the third electrode, and an eighth electrode, the second adjustment switch being provided to switch a state of the eighth electrode and fourth electrode to one of a conductive state and a non-conductive state.

9. The sensor-equipped display device of claim 8, wherein in the sensing drive period, a state of each of the first adjustment switch and the second adjustment switch is adjusted to cause a first current amount and a second current amount to differ from each other, the first current amount being an amount of current flowing from the first power supply to the detection electrode, the second current amount being an amount of current flowing from the first power supply to the inverting input terminal.

10. The sensor-equipped display device of claim 9, further comprising a selection switch,
wherein the first common electrode including a plurality of divided electrodes arranged in a matrix,
in the sensing drive period, a state of the selection switch is switched to one of a first selection state in which the selection switch electrically connects the second electrode and associated detection electrode and a second selection state in which the selection switch electrically connects the second electrode and the divided electrodes, and
in accordance with the state of the selection switch, one of the first current amount and a third current amount is caused to differ from the second current amount, the third current amount being an amount of current flowing from the first power supply to the divided electrodes.

11. The sensor-equipped display device of claim 10, further comprises:
a controller;
a control line;
a detection line;
a detection switch connected to the control line and the detection line; and
a second common electrode provided above the control line, the detection line and the detection switch and opposite to the control line, the detection line and the detection switch, the second common electrode including an opening,
wherein the detection electrode is provided above the second common electrode and opposite to the opening, and connected to the detection switches through the opening,
the control line, the detection line, the detection switch, the detection electrode and the second common electrode are provided independent of the scanning line, the signal line, the pixel switch, the pixel electrode and the first common electrode, and
in the sensing drive period, the controller switches the state of the selection switch to one of the first selection state and the second selection state.

12. A sensor comprising:
a control line;
a detection line;
a detection switch connected to the control line and the detection line;
a common electrode provided above the control line, the detection line and the detection switch and opposite to the control line, the detection line and the detection switch, the common electrode including an opening;
a detection electrode provided above the common electrode and opposite to the opening, and connected to the detection switch through the opening;
a first circuit connected to the control line, and supplies the control line with a drive signal for causing a state of the detection switch to be switched to one of a first connection state and a second connection state, the first connection state being a state in which the detection switch electrically connects the detection line and the detection electrode, the second connection state being a state in which the detection switch electrically disconnects the detection line and the detection electrode from each other;
a current mirror circuit including a first transistor and a second transistor, the first transistor including a first gate electrode, a first electrode connected to a first power supply and a second electrode electrically connected to the detection electrode and the first gate electrode, the second transistor including a second gate electrode connected to the first gate electrode, a third electrode connected to the first power supply, and a fourth electrode; and
an integrator including an operational amplifier and a capacitor, the operational amplifier including an inverting input terminal electrically connected to the fourth electrode and a non-inverting input terminal connected to a second power supply, the capacitor connected between an output terminal and the inverting input terminal of the operational amplifier.

13. The sensor of claim 12, further comprising:
an auxiliary line; and
a second circuit including a control switch a state of which is switched to one of a first switch state in which the control switch electrically connects the detection line and the second electrode of the first transistor to each other and a second switch state in which the control switch electrically connects the detection line and the auxiliary line to each other,
wherein the second circuit repeatedly switches the state of the control switch from the second switch state to the first switch state and from the first switch state to the second switch state, to thereby accumulate in the capacitor, charge an amount of which corresponds to that of charging performed a number of times, the state of the control switch being switched to the first switch state to charge the detection electrode and the capacitor, and being switched to the second switch state to discharge the detection electrode.

* * * * *